(12) United States Patent
Luby et al.

(10) Patent No.: US 9,253,233 B2
(45) Date of Patent: Feb. 2, 2016

(54) SWITCH SIGNALING METHODS PROVIDING IMPROVED SWITCHING BETWEEN REPRESENTATIONS FOR ADAPTIVE HTTP STREAMING

(75) Inventors: Michael George Luby, Berkeley, CA (US); Lorenz Christoph Minder, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/545,697

(22) Filed: Jul. 10, 2012

(65) Prior Publication Data

US 2013/0246643 A1 Sep. 19, 2013

Related U.S. Application Data

(60) Provisional application No. 61/529,656, filed on Aug. 31, 2011.

(51) Int. Cl.

| | |
|---|---|
| *G06F 15/16* | (2006.01) |
| *H04L 29/06* | (2006.01) |
| *H04N 21/2343* | (2011.01) |
| *H04N 21/845* | (2011.01) |
| *H04L 29/08* | (2006.01) |

(52) U.S. Cl.
CPC ............ *H04L 65/60* (2013.01); *H04L 65/4084* (2013.01); *H04L 65/602* (2013.01);
(Continued)

(58) Field of Classification Search
CPC .. H04N 1/00; H04N 2101/00; H04N 2201/00
USPC .................................. 709/231, 232
See application file for complete search history.

(56) References Cited

U.S. PATENT DOCUMENTS

| 3,909,721 A | 9/1975 | Bussgang et al. |
|---|---|---|
| 4,365,338 A | 12/1982 | McRae et al. |

(Continued)

FOREIGN PATENT DOCUMENTS

| CN | 1338839 A | 3/2002 |
|---|---|---|
| CN | 1425228 A | 6/2003 |

(Continued)

OTHER PUBLICATIONS

Supplementary European Search Report—EP06772990—Search Authority—Munich—Sep. 28, 2011.

(Continued)

*Primary Examiner* — Vivek Srivastava
*Assistant Examiner* — Hermon Asres
(74) *Attorney, Agent, or Firm* — Campbell C. Chiang

(57) ABSTRACT

The switch signaling methods providing improved switching between representations for adaptive HTTP streaming described herein enable user experience and bandwidth efficiency improvements for adaptive HTTP streaming solutions, even when segment data is encrypted. The signaling methods include associating segment maps with segments of a representation, wherein a segment map comprises both temporal entry and temporal exit points within associated segments together with byte offset information and potentially other segment information, wherein segment maps may be generated with predictable time span patterns that are independent of the time spans of the associated segments. These embodiments can be used to enhance existing deployments in such a way that there is no need to change existing content encoding and formatting processes, and such that existing clients that receive and play out content are unaffected.

21 Claims, 28 Drawing Sheets

(52) U.S. Cl.
CPC ............ *H04L65/607* (2013.01); *H04L 65/608* (2013.01); *H04L 65/80* (2013.01); *H04L 67/02* (2013.01); *H04N 21/23439* (2013.01); *H04N 21/8455* (2013.01); *H04N 21/8456* (2013.01)

(56) References Cited

U.S. PATENT DOCUMENTS

| | | |
|---|---|---|
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,329,369 A | 7/1994 | Willis et al. |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,852,565 A | 12/1998 | Demos |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | DesJardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |

(56) References Cited

U.S. PATENT DOCUMENTS

| | | |
|---|---|---|
| 7,110,412 B2 | 9/2006 | Costa et al. |
| 7,113,773 B2 | 9/2006 | Quick, Jr. et al. |
| 7,139,660 B2 | 11/2006 | Sarkar et al. |
| 7,139,960 B2 | 11/2006 | Shokrollahi et al. |
| 7,143,433 B1 | 11/2006 | Duan et al. |
| 7,151,754 B1 | 12/2006 | Boyce et al. |
| 7,154,951 B2 | 12/2006 | Wang |
| 7,164,370 B1 | 1/2007 | Mishra |
| 7,164,882 B2 | 1/2007 | Poltorak |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |
| 7,240,236 B2 | 7/2007 | Cutts et al. |
| 7,240,358 B2 | 7/2007 | Horn et al. |
| 7,243,285 B2 | 7/2007 | Foisy et al. |
| 7,249,291 B2 | 7/2007 | Rasmussen et al. |
| 7,254,754 B2 | 8/2007 | Hetzler et al. |
| 7,257,764 B2 | 8/2007 | Suzuki et al. |
| 7,265,688 B2 | 9/2007 | Shokrollahi et al. |
| 7,293,222 B2 | 11/2007 | Shokrollahi et al. |
| 7,295,573 B2 | 11/2007 | Yi et al. |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 | 4/2008 | Cheng et al. |
| 7,391,717 B2 | 6/2008 | Klemets et al. |
| 7,394,407 B2 | 7/2008 | Shokrollahi et al. |
| 7,398,454 B2 | 7/2008 | Cai et al. |
| 7,409,626 B1 | 8/2008 | Schelstraete |
| 7,412,641 B2 | 8/2008 | Shokrollahi et al. |
| 7,418,651 B2 | 8/2008 | Luby et al. |
| 7,451,377 B2 | 11/2008 | Shokrollahi et al. |
| 7,483,447 B2 | 1/2009 | Chang et al. |
| 7,483,489 B2 | 1/2009 | Gentric et al. |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,574,706 B2 | 8/2009 | Meulemans et al. |
| 7,590,118 B2 | 9/2009 | Giesberts et al. |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | Van Kampen et al. |
| 7,644,335 B2 | 1/2010 | Luby et al. |
| 7,650,036 B2 | 1/2010 | Lei et al. |
| 7,668,198 B2 | 2/2010 | Yi et al. |
| 7,676,735 B2 | 3/2010 | Luby et al. |
| 7,711,068 B2 | 5/2010 | Shokrollahi et al. |
| 7,720,096 B2 | 5/2010 | Klemets |
| 7,720,174 B2 | 5/2010 | Shokrollahi et al. |
| 7,721,184 B2 | 5/2010 | Luby et al. |
| 7,812,743 B2 | 10/2010 | Luby |
| 7,831,896 B2 | 11/2010 | Amram et al. |
| 7,924,913 B2 | 4/2011 | Sullivan et al. |
| 7,956,772 B2 | 6/2011 | Shokrollahi et al. |
| 7,961,700 B2 | 6/2011 | Malladi et al. |
| 7,971,129 B2 | 6/2011 | Watson et al. |
| 7,979,769 B2 | 7/2011 | Chun et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,331,445 B2 | 12/2012 | Garudadri et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 8,812,735 B2 | 8/2014 | Igarashi |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0037299 A1 | 2/2003 | Smith |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0066854 A1 | 4/2004 | Hannuksela |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0162071 A1 | 8/2004 | Grilli et al. |
| 2004/0207548 A1 | 10/2004 | Kilbank |
| 2004/0231004 A1 | 11/2004 | Seo |
| 2004/0240382 A1 | 12/2004 | Ido et al. |
| 2004/0255328 A1 | 12/2004 | Baldwin et al. |
| 2005/0018635 A1 | 1/2005 | Proctor |
| 2005/0028067 A1 | 2/2005 | Weirauch |
| 2005/0041736 A1 | 2/2005 | Butler-Smith et al. |
| 2005/0071491 A1 | 3/2005 | Seo |
| 2005/0084006 A1 | 4/2005 | Lei et al. |
| 2005/0091697 A1 | 4/2005 | Tanaka et al. |
| 2005/0097213 A1 | 5/2005 | Barrett et al. |
| 2005/0102371 A1 | 5/2005 | Aksu |
| 2005/0105371 A1 | 5/2005 | Johnson et al. |
| 2005/0123058 A1 | 6/2005 | Greenbaum et al. |
| 2005/0138286 A1 | 6/2005 | Franklin et al. |
| 2005/0160272 A1 | 7/2005 | Teppler |
| 2005/0163468 A1 | 7/2005 | Takahashi et al. |
| 2005/0169379 A1 | 8/2005 | Shin et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0195899 A1 | 9/2005 | Han |
| 2005/0195900 A1 | 9/2005 | Han |
| 2005/0207392 A1 | 9/2005 | Sivalingham et al. |
| 2005/0216472 A1 | 9/2005 | Leon et al. |
| 2005/0216951 A1 | 9/2005 | MacInnis |
| 2005/0254575 A1 | 11/2005 | Hannuksela et al. |
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0037057 A1 | 2/2006 | Xu |
| 2006/0087456 A1 | 4/2006 | Luby |
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0193524 A1 | 8/2006 | Tarumoto et al. |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |

(56) References Cited

U.S. PATENT DOCUMENTS

| | | |
|---|---|---|
| 2006/0256851 A1 | 11/2006 | Wang et al. |
| 2006/0262856 A1 | 11/2006 | Wu et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0081586 A1 | 4/2007 | Raveendran et al. |
| 2007/0110074 A1 | 5/2007 | Bradley et al. |
| 2007/0127576 A1 | 6/2007 | Henocq et al. |
| 2007/0134005 A1 | 6/2007 | Myong, II et al. |
| 2007/0140369 A1 | 6/2007 | Limberg et al. |
| 2007/0157267 A1 | 7/2007 | Lopez-Estrada |
| 2007/0162568 A1 | 7/2007 | Gupta et al. |
| 2007/0162611 A1 | 7/2007 | Yu et al. |
| 2007/0176800 A1 | 8/2007 | Rijavec |
| 2007/0177811 A1 | 8/2007 | Yang |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | ORourke et al. |
| 2007/0255844 A1 | 11/2007 | Shen et al. |
| 2007/0277209 A1 | 11/2007 | Yousef |
| 2008/0010153 A1 | 1/2008 | Pugh-O'Connor et al. |
| 2008/0034273 A1 | 2/2008 | Luby |
| 2008/0036751 A1* | 2/2008 | Yamazaki .................. 345/205 |
| 2008/0052753 A1 | 2/2008 | Huang et al. |
| 2008/0058958 A1 | 3/2008 | Cheng |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0152241 A1 | 6/2008 | Itoi et al. |
| 2008/0168133 A1 | 7/2008 | Osborne |
| 2008/0168516 A1 | 7/2008 | Flick et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0186288 A1* | 8/2008 | Chang ..................... 345/174 |
| 2008/0189419 A1 | 8/2008 | Girle et al. |
| 2008/0192818 A1 | 8/2008 | DiPietro et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0278415 A1* | 11/2008 | Itakura et al. .............. 345/60 |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0303896 A1 | 12/2008 | Lipton et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0195640 A1 | 8/2009 | Kim et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1* | 12/2009 | Virdi et al. .................. 709/231 |
| 2009/0300204 A1 | 12/2009 | Zhang et al. |
| 2009/0307565 A1 | 12/2009 | Luby et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0046906 A1 | 2/2010 | Kanamori et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van et al. |
| 2010/0165077 A1 | 7/2010 | Yin et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0258510 A1 | 10/2011 | Watson et al. |
| 2011/0268178 A1* | 11/2011 | Park et al. ................ 375/240.02 |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1* | 12/2011 | Bouazizi ..................... 709/203 |
| 2011/0307581 A1 | 12/2011 | Furbeck et al. |
| 2012/0013746 A1 | 1/2012 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0207068 A1 | 8/2012 | Watson et al. |
| 2012/0208580 A1 | 8/2012 | Luby et al. |
| 2012/0210190 A1 | 8/2012 | Luby et al. |
| 2012/0317305 A1* | 12/2012 | Einarsson et al. ........... 709/231 |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0254634 A1 | 9/2013 | Luby |

(56) References Cited

U.S. PATENT DOCUMENTS

| | | | |
|---|---|---|---|
| 2013/0287023 A1 | 10/2013 | Bims | |
| 2014/0009578 A1 | 1/2014 | Chen et al. | |
| 2014/0380113 A1 | 12/2014 | Luby | |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1792056 A | 6/2006 |
| CN | 1806392 A | 7/2006 |
| CN | 1819661 A | 8/2006 |
| CN | 1868157 A | 11/2006 |
| CN | 101390399 A | 3/2009 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1024672 A1 | 8/2000 |
| EP | 1051027 A1 | 11/2000 |
| EP | 1124344 A1 | 8/2001 |
| EP | 1241795 A2 | 9/2002 |
| EP | 1298931 A2 | 4/2003 |
| EP | 1406452 A2 | 4/2004 |
| EP | 1455504 A2 | 9/2004 |
| EP | 1468497 A1 | 10/2004 |
| EP | 1501318 A1 | 1/2005 |
| EP | 1670256 A2 | 6/2006 |
| EP | 1755248 A1 | 2/2007 |
| EP | 2046044 A1 | 4/2009 |
| EP | 2071827 A2 | 6/2009 |
| EP | 2096870 A2 | 9/2009 |
| EP | 1700410 B1 | 4/2010 |
| EP | 2323390 A2 | 5/2011 |
| EP | 1665539 | 4/2013 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001223655 A | 8/2001 |
| JP | 2001251287 A | 9/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 A | 12/2002 |
| JP | 2003018568 A | 1/2003 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004516717 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007089137 A | 4/2007 |
| JP | 3976163 | 6/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2008546361 A | 12/2008 |
| JP | 2009027598 A | 2/2009 |
| JP | 2009522921 A | 6/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010539832 A | 12/2010 |
| JP | 2008502212 A | 1/2011 |
| JP | 2001189665 A | 2/2011 |
| JP | 2011087103 A | 4/2011 |
| JP | 4773356 B2 | 9/2011 |
| JP | 4971144 B2 | 7/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| KR | 20100028156 A | 3/2010 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | 1246841 B | 1/2006 |
| TW | 1354908 | 12/2011 |
| TW | 1355168 | 12/2011 |
| WO | 9634463 A1 | 10/1996 |
| WO | WO-9750183 A1 | 12/1997 |
| WO | 9804973 A1 | 2/1998 |
| WO | 98032231 | 7/1998 |
| WO | WO-9832256 A1 | 7/1998 |
| WO | 0014921 A1 | 3/2000 |

(56) References Cited

FOREIGN PATENT DOCUMENTS

| WO | 0018017 | | 3/2000 |
|---|---|---|---|
| WO | 0052600 | A1 | 9/2000 |
| WO | 0120786 | A1 | 3/2001 |
| WO | 0157667 | A1 | 8/2001 |
| WO | 0158130 | A2 | 8/2001 |
| WO | 0158131 | A2 | 8/2001 |
| WO | 0227988 | A2 | 4/2002 |
| WO | 02047391 | | 6/2002 |
| WO | 02063461 | A1 | 8/2002 |
| WO | 03046742 | A1 | 6/2003 |
| WO | 03056703 | | 7/2003 |
| WO | 03105350 | | 12/2003 |
| WO | 03105484 | A1 | 12/2003 |
| WO | 2004008735 | A2 | 1/2004 |
| WO | 2004015948 | A1 | 2/2004 |
| WO | 2004019521 | A1 | 3/2004 |
| WO | 2004030273 | A1 | 4/2004 |
| WO | 2004034589 | A2 | 4/2004 |
| WO | 2004036824 | A1 | 4/2004 |
| WO | 2004040831 | A1 | 5/2004 |
| WO | 2004047455 | A1 | 6/2004 |
| WO | WO-2004047019 | A2 | 6/2004 |
| WO | 2004088988 | A1 | 10/2004 |
| WO | 2004109538 | A1 | 12/2004 |
| WO | 2005036753 | A2 | 4/2005 |
| WO | 2005041421 | A1 | 5/2005 |
| WO | 2005078982 | A1 | 8/2005 |
| WO | 2005112250 | A2 | 11/2005 |
| WO | WO-2005107123 | | 11/2005 |
| WO | 2006013459 | A1 | 2/2006 |
| WO | 2006020826 | A2 | 2/2006 |
| WO | 2006036276 | | 4/2006 |
| WO | 2006060036 | A1 | 6/2006 |
| WO | WO-2006057938 | A2 | 6/2006 |
| WO | 2006084503 | A1 | 8/2006 |
| WO | 2006116102 | A2 | 11/2006 |
| WO | WO-2006135878 | A2 | 12/2006 |
| WO | 2007042916 | | 4/2007 |
| WO | 2007078253 | A2 | 7/2007 |
| WO | 2007090834 | A2 | 8/2007 |
| WO | 2007098480 | A1 | 8/2007 |
| WO | WO-2007098397 | A2 | 8/2007 |
| WO | 2008011549 | A2 | 1/2008 |
| WO | 2008023328 | A3 | 4/2008 |
| WO | 2008054100 | A1 | 5/2008 |
| WO | 2008085013 | A1 | 7/2008 |
| WO | 2008086313 | A1 | 7/2008 |
| WO | 2008131023 | A1 | 10/2008 |
| WO | 2008144004 | A1 | 11/2008 |
| WO | 2008148708 | A1 | 12/2008 |
| WO | 2008156390 | A1 | 12/2008 |
| WO | 2009065526 | A1 | 5/2009 |
| WO | 2009137705 | A2 | 11/2009 |
| WO | 2009143741 | A1 | 12/2009 |
| WO | 2010085361 | A2 | 7/2010 |
| WO | 2010088420 | A1 | 8/2010 |
| WO | 2010120804 | A1 | 10/2010 |
| WO | 2011038013 | | 3/2011 |
| WO | 2011038034 | A1 | 3/2011 |
| WO | 2011059286 | A2 | 5/2011 |
| WO | 2011070552 | A1 | 6/2011 |
| WO | 2011102792 | A1 | 8/2011 |
| WO | 2012021540 | | 2/2012 |
| WO | 2012109614 | A1 | 8/2012 |

OTHER PUBLICATIONS

Supplementary European Search Report—EP07757111—Search Authority—The Hague—Jan. 22, 2013.
Supplementry European Search Report—EP08746007—Search Authority—Munich—Sep. 27, 2012.
Telefon AB LM Ericsson, et al., "Media Presentation Description in httpstreaming", 3GPP Draft; S4-100080-MPD, 3RD Generation Partnership Project (3GPP), Mobile Competence Centre; 650, Route Des Lucioles; F-06921 Sophia-Antipolis Cedex; France, vol. SA WG4, No. St Julians, Malta; 20100125, Jan. 20, 2010, XP050437773, [retrieved on Jan. 20, 2010].
Thomas Wiegand, et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29,-Jul. 5, 2007, pp. 1-559.
Todd, "Error Correction Coding: Mathematical Methods and Algorithms", Mathematical Methods and Algorithms, Jan. 1, 2005, pp. 451-534, Wiley, XP002618913.
Tsunoda T., et al., "Reliable Streaming Contents Delivery by Using Multiple Paths," Technical Report of The Institute of Electronics, Information and Communication Engineers, Japan, Mar. 2004, vol. 103, No. 692, pp. 187-190, N52003-331, 1N2003-286.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
U.S. Appl. No. 13/082,051, by Ying Chen et al., filed Apr. 7, 2011.
U.S. Appl. No. 13/205,559, by Ying Chen et al., filed Aug. 8 2011.
U.S. Appl. No. 13/205,565, by Ying Chen et al., filed Aug. 8, 2011.
U.S. Appl. No. 13/205,574, by Ying Chen et al., filed Aug. 8, 2011.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010, XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs.
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan,Subramaniyam R., "Publishing in Wireless and Wireline Environments," Ph. D Thesis, Rutgers, The State University of New Jersey (Nov. 1994), 180pages.
Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.
Wang,"On Random Access", Joint Video Team (JVT) of ISO/IEC MPEG & ITU-T VCEG (ISO/IEC JTC1ISC29/WG11 and ITU-T SG16 Q.6), 4th Meeting: Klagenfurt, Austria, Jul. 22-26, 2002, p. 13.
Watson, M., et, al. "Asynchronous Layered Coding (ALC) Protocol Instantiation", IETF RFC 5775, pp. 1-23, (Apr. 2010).
Wenger, et al., RFC 3984, "RTP Payload Format for H.264 Video," Feb. 2005, 84 pp.
Wiegand, T., et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvcsite/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Wong, J.W., "Broadcast delivery", Proceedings of the IEEE, 76(12): 1566-1577, (1988).
Written Opinion, PCT/US06/022913—International Search Authority—US, Jul. 18, 2008.
Written Opinion, PCT/US2006/022914—International Search Authority—US, Feb. 9, 2007.
Written Opinion, PCT/US2007/062086—International Search Authority—European Patent Office, Nov. 1, 2007.
Written Opinion, PCT/US2007/062302—International Search Authority—US, Dec. 21, 2007.

(56) References Cited

OTHER PUBLICATIONS

Written Opinion, PCT/US2007/068713—International Search Authority—US, Jan. 7, 2008.
Written Opinion, PCT/US2008/060510—International Search Authority—Aug. 1, 2008.
Yamanouchi N., et al., "Internet Multimedia Transmission with Packet Recovery by Using Forward Error Correction," Proceedings of DPS Workshop, The Information Processing Society of Japan, Dec. 6, 2000, vol. 2000, No. 15, pp. 145-150.
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.
Zorzi, et al.: "On the Statistics of Block Errors in Bursty Channels," IEEE Transactions on Communications, vol. 45, No. 6, Jun. 1997, pp. 660-667.
Mimnaugh, A et, al. "Enabling Mobile Coverage for DVB-T" Digital Fountain Whitepaper Jan. 29, 2008, pp. 1-9, XP002581808 Retrieved from the Internet: URL:http://www.digitalfountain.com/ufiles/library/DVB-T-whitepaper.pdf> [retrieved on May 10, 2010].
Min-Goo Kim: "On systematic punctured convolutional codes", IEEE Trans on Communications, vol. 45, No. 2, Feb. 1997, XP002628272, the whole document, pp. 133-139.
Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_Channel_Mapping_to_BCAST_File_Delivery, Open Mobile Alliance (OMA), 4330 La Jolla Village Dr., Suite 110 San Diego, CA 92122; USA Oct. 2, 2007, pp. 1-13, XP064036903.
Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Naguib, Ayman, et al., "Applications of Space-Time Block Codes and Interference Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.
Nokia: "Reed-Solomon Code Specification for. MBMS Download and Streaming Services", 3GPP Draft; S4-050265_RS_SPEC, 3rd Generation Partnership Project (3GPP), Mobile Competence Centre; 650, Route Des Lucioles; F-06921 Sophia-Antipolis Cedex; France, vol. SA WG4, No. San Diego, USA; 20050415, Apr. 15, 2005, XP050287675, [retrieved on Apr. 15, 2005].
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Nonnenmacher, et al., "Parity-Based Loss Recovery for Reliable Multicast Transmission", IEEE/ACM Transactions on Networking, IEEE Inc. New York, US, Vol. 6, No. 4, Aug. 1, 1998, pp. 349-361.
Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Ozden, B. et al.: "A Low-Cost Storage Service for Movie on Demand Databases," Proceedings of the 20th Very Large DataBases (VLDB) Conference, Santiago, Chile (1994).

PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Pantos R et al., "HTTP Live Streaming; draft-pantos-http-live-streaming-OT.txt ", HTTP Live Streaming; Draft-Pantos-HTTP-Live-Streaming-01.TXT, Internet Engineering Task Force, IETF; Standardworkingdraft, Internet Society (ISOC) 4, Rue Des Falaises CH- 1205 Geneva, Switzerland, No. 1, Jun. 8, 2009, XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Plank J. S., "A Tutorial on Reed-Solomon Coding for Fault-Tolerance in Raid-Like Systems", Software Practice & Experience, Wiley & Sons, Bognor Regis, GB, vol. 27, No. 9, Sep. 1, 1997, pp. 995-1012, XP00069594.
Pless and WC Huffman EDS V S: Algebraic geometry codes, Handbook of Coding Theory, 1998, pp. 871-961, XP002300927.
Pursley, et al.: "Variable-Rate Coding for Meteor-Burst Communications," IEEE Transactions on Communications, US, IEEE Inc. New York (1989) vol. 37, No. 11, pp. 1105-1112 XP000074533.
Pursley, M. et al.: "A Correction and an Addendum for Variable-Rate Coding for Meteor-Burst Communications," IEEE Transactions on Communications, vol. 43, No. 12 pp. 2866-2867 (Dec. 1995).
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/.5CE29/WG11), No. M17902, Jul. 22, 2010, XP030046492.
Qualcomm Europe S A R L: "Baseline Architecture and Definitions for HTTP Streaming", 3GPP Draft; S4-090603_HTTP_Streaming_Architecture, 3rd Generation Partnership Project (3GPP) Mobile Competence Centre; 650, Route Des Lucioles; F-06921 Sophia-Antipolis Cedex; France, no. Kista; 20090812, Aug. 12, 2009, XP050356889.
Qualcomm Incorporated: "Use Cases and Examples for Adaptive httpstreaming", 3GPP Draft; S4-100408-Usecases-HSD, 3rd Generation Partnership Project (JGPP), Mobile Competence Centre; 650, Route Des Lucioles; F-06921 Sophia-Antipolis Cedex; France, vol. SA WG4, No. Prague, Czech Republic; 20100621, Jun. 17, 2010, XP050438085, [retrieved on Jun. 17, 2010].
Rangan, et al., "Designing an On-Demand Multimedia Service," IEEE Communication Magazine, vol. 30, pp. 56-64, (Jul. 1992).
Realnetworks Inc et al., "Format for HTTP Streaming Media Presentation Description", 3GPP Draft; S4-100020, 3RD Generation Partnership Project (3GPP), Mobile Competence Centre; 650, Route Des Lucioles; F-06921 Sophia-Anti Polis Cedex; France vol. SA WG4, No. St Julians, Malta; 20100125, Jan. 20, 2010, XP050437753, [retrieved on Jan. 20, 2010].
Research in Motion UK Limited: "An MPD delta file for httpstreaming", 3GPP Draft; S4-100453, 3RD Generation Partnership Project (SGPP), Mobile Competence Centre; 650, Route Des Lucioles; F-06921 Sophia-Antipolis Cedex; France, vol. SA WG4, No. Prague, Czech Republic; 20100621, Jun. 16, 2010, XP050438066, [retrieved on Jun. 16, 2010].
Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010, XP030046369.
Rizzo L. "Effective Erasure Codes for Reliable Computer Communication Protocols," Computer Communication Review, 27 (2) pp. 24-36 (Apr. 1, 1997), XP000696916.

(56) References Cited

OTHER PUBLICATIONS

Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Roca, V. et, al. "Low Density Parity Check (LDPC) Staircase and Triangle Forward Error Correction (FEC) Schemes", IETF RFC 5170 (Jun. 2008), pp. 1-34.
Rost, S. et al., "The Cyclone Server Architecture: streaming delivery of popular content," 2002, Computer Communications, vol. 25, No. 4, pp. 1-10.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Roumy A., et al., "Unequal Erasure Protection and Object Bundle Protection with the Generalized Object Encoding Approach", Inria-00612583, Version 1, Jul. 29, 2011, 25 pages.
Schulzrinne, et al., "Real Time Streaming Protocol (RTSP)" Network Working Group, Request for Comments: 2326, Apr. 1998, pp. 1-92.
Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, IEEE Service Center, XP011193019, ISSN: 1051-8215, DOI: 10.1109/TCSVT.2007.905532.
Seshan, S. et al., "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction In High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T REC. H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm"id=1148681>.
Shokrollahi et al., "Design of Efficient Easure Codes with Differential Evolution", IEEE International Symposium on Information Theory, Jun. 25, 2000, pp. 5-5.
Sincoskie, W. D., "System Architecture for Large Scale Video on Demand Service," Computer Network and ISDN Systems, pp. 155-162, (1991).
Smolic et al., "Development of a new MPEG standard for advanced 3D video applications", Proceedings of 6th International Symposium on Image and Signal Processing and Analysis (ISPA), Sep. 16, 2009, pp. 400-407, IEEE, XP031552049, ISBN: 978-953-184-135-1.
Stockhammer T., et al., "DASH: Improvements on Representation Access Points and related flags", 97. MPEG Meeting; Jul. 18, 2011-Jul. 22, 2011; TORINO; (Motion Picture Expert Group or ISO/IEC JTC1/SC29/WG11) No. m20339, Jul. 24, 2011, XP030048903.
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form),"
Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29,-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Supplementary European Search Report—EP06772989—Search Authority—Munich—Nov. 4, 2011.
(091798) European Search Report—EP02007488—Search Authority—Munich Patent Office—Mar. 24, 2003.
(091798) International Search Report, PCT/US1999/021574—International Search Authority—European Patent Office, Jan. 28, 2000.
(091798B1) International Preliminary Examination Report—PCT/US00/025405—Oct. 29, 2001.
(091798B1) International Search Report, PCT/US2000/025405—International Search Authority—European Patent Office, Mar. 1, 2001.
(091826) International Preliminary Examination Report, PCT/US2002/041615—International Preliminary Examining Authority—US, May 12, 2004.
(091826) International Search Report, PCT/US2002/041615—International Search Authority—US, Mar. 26, 2003.
(091826EP) Supplementary European Search Report, EP02794439—European Search Authority—The Hague, Jan. 13, 2005.
(091841) International Preliminary Report on Patentability, PCT/US2005/016334—The International Bureau of WIPO—Geneva, Switzerland, Nov. 7, 2006.
(091841) International Search Report, PCT/US2005/016334—International Search Authority—European Patent Office, Sep. 12, 2006.
(091841) Written Opinion, PCT/US2005/016334—International Search Authority—European Patent Office, Sep. 12, 2006.
(091841EP) Supplementary European Search Report, EP05747947—European Search Authority—Munich, Mar. 19, 2007.
(091843) International Preliminary Report on Patentability, PCT/US2005/028668—The International Bureau of WIPO—Geneva, Switzerland, Jun. 26, 2007.
(091843) International Search Report, PCT/US2005/028668—International Search Authority—US, Jun. 7, 2007.
(091843) Written Opinion, PCT/US2005/028668—International Search Authority—European Patent Office, Jun. 7, 2007.
3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet: URL:http://www.etsi.org/deliver/etsi_ts/126300_126399/126346/06.01.00_60/ts_126346v060100p.pdf.
3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
3GPP Ts 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.
3rd Generation Partnership Project, Technical Specification Group Services and System Aspects Transparent end-to- end packet switched streaming service (PSS), 3GPP file format (3GP) (Release 9) , 3GPP Standard, 3GPP TS.26.244, 3rd Generation Partnership Project (3GPP), Mobile Competence Centre , 650, Route Des Lucioles , F-06921 Sophia-Antipolis Cedex , France, No. V8.1.0, Jun. 1, 2009, pp. 1-52, XP050370199.
3rd Generation Partnership Project; Technical Specification Group Services and System Aspects; Transparent end-to-end packet switched streaming service (PSS); 3GPP file format (3GP) (Release 9), 3GPP Standard; 3GPP TS.26.244, 3rd Generation Partnership

(56) References Cited

OTHER PUBLICATIONS

Project (3GPP), Mobile Competence Centre; 650, Route Des Lucioles; F-06921 Sophia-Antipolis Cedex; France, No. V9.2.0, Jun. 9, 2010, pp. 1-55, XP050441544, [retrieved on Jun. 9, 2010].

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3rd Generation Partnership Project (3GPP), Mobile Competence Centre ; 650, Route Des Lucioles ; F-06921 Sophia-Antipolis Cedex ; France, vol. SA WG4, No. V10.0.0, Jun. 17, 2011, pp. 1-94, XP050553206, [retrieved on Jun. 17, 2011].

Afzal, et al., "Video Streaming over MBMS: A System Design Approach", Journal of Multimedia, vol. 1, No. 5, Aug. 2006, pp. 25-35.

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, (Nov. 1996).

Alex Zambelli,"IIS Smooth Streaming Technical Overview", Microsoft Mar. 25, 2009, XP002620446, Retrieved from the Internet: URL:http://www.microsoft.com/downloads/en/ details. aspx"FamilyID=03d22583-3ed6-44da-8464-b1b4b5ca7520, [retrieved on Jan. 21, 2011].

Almeroth,et al., "The use of multicast delivery to provide a scalable and interactive video-on-demand service", IEEE Journal on Selected Areas in Communication, 14(6): 1110-1122, (1996).

Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.

Amin Shokrollahi: "LDPC Codes: An Introduction" Internet Citation 2 Apr. 1, 2003, XP002360065 Retrieved from the Internet: URL : http ://www . ipm. ac . ir/IPM/homepage/Amin 2. pdf [retrieved on Dec. 19, 2005].

Amon P. et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

Anonymous: [Gruneberg, K., Narasimhan, S. and Chen, Y., editors] "Text of ISO/IEC 13818-1:2007/PDAM 6 MVC operation point descriptor", 90 MPEG Meeting; Oct. 26, 2009-Oct. 30, 2009; XIAN; (Motion Picture Expertgroup or ISO/IEC JTC1/SC29/WG11), No. N10942, Nov. 19, 2009, XP030017441.

Anonymous: "Technologies under Consideration", 100. MPEG Meeting; Apr. 30, 2012-Apr. 5, 2012; Geneva; (Motion Picture Expert Group or ISO/IEC JTC1 /SC29/WG11) No. N12682, Jun. 7, 2012, XP030019156.

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-12:2008/PDAM 2 Sub-track selection & switching", 91. Mpeg Meeting; Jan. 18, 2010-Jan. 22, 2010; Kyoto; (Motion Picture Expertgroup or ISO/IEC JTC1/SC29/WG11), No. N11137, Jan. 22, 2010, XP030017634, ISSN: 0000-0030.

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11) No. N11139, Jan. 22, 2010, XP030017636, ISSN: 0000-0030 the whole document.

Apple Inc., "On the time-stamps in the segment-inbox for httpstreaming (26.244, R9)", TSG-SA4#58 meeting, Vancouver, Canada, Apr. 2010, p. 5.

Atis: "PTV Content on Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2012].

Bar-Noy, et al., "Competitive on-line stream merging algorithms for media-on-demand", Draft (Jul. 2000), pp. 1-34.

Bar-Noy, et al., "Efficient algorithms for optimal stream merging for media-on-demand", Draft (Aug. 2000), pp. 1-43.

Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jan. 6, 1994) pp. 889-893, XP000464977.

Bitner, J.R., et al.: "Efficient Generation of the Binary Reflected Gray code and Its Applications," Communications of the ACM, pp. 517-521, vol. 19 (9), 1976.

Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].

Bouazizi I., et al., "Proposals for ALC/FLUTE server file format (14496-12Amd.2)", 77. MPEG Meeting; Jul. 17, 2006-Jul. 21, 2006; Klagenfurt; (Motion Pictureexpert Group or ISO/IEC JTC1/SC29/WG11), No. M13675, Jul. 12, 2006, XP030042344, ISSN: 0000-0236.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27,-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "WD4: Working Draft 4 of High-Efficiency Video Coding," JCTVC-F803_d2, (JCT-VC) of ITU-T SG16.WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16.WP3 and ISO/IEC jtc1/sc29/wg11 Joint Collaborative Team on Video Coding, 7th Meeting, Geneva, Switzerland (Nov. 2011), 214 pages.

Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.

Byers, J.W. et al.: "Accessing multiple mirror sites in parallel: using Tornado codes to speed up downloads," 1999, Eighteenth Annual Joint Conference of the IEEE Comupter and Communications Socities, pp. 275-283, Mar. 21, 1999, XP000868811.

Anonymous: "Technologies under Consideration", 98. MPEG Meeting; Nov. 28, 2011-Feb. 12, 2011; Geneva; (Motion Picture Expert Group or ISO/IEC JTC1/SC29/WG11) No. N12330, Dec. 3, 2011, XP030018825.

Anonymous: "Text of ISO/IEC IS 23009-1 Media Presentation Description and Segment Formats", 98. MPEG Meeting; Nov. 28, 2011-Feb. 12, 2012; Geneva; (Motion Picture Expert Group or ISO/IEC JTC1/SC29/ WG11) No. N12329, Jan. 6, 2012, XP030018824.

"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, 10 Jan. 2009.

Kim J., et al., "Enhanced Adaptive Modulation and Coding Schemes Based on Multiple Channel Reportings for Wireless Multicast Systems", 62nd IEEE Vehicular Technology Conference, VTC-2005-FALL, Sep. 25-28, 2005, vol. 2, pp. 725-729, XP010878578, DOI: 1 0.11 09/VETECF.2005.1558019, ISBN: 978-0/7803-9152-9.

Moriyama, S., "5. Present Situation of Terrestrial Digital Broadcasting in Europe and USA", Journal of the Institute of Image Information and Television Engineers, Nov. 20, 1999, vol. 53, No. 11, pp. 1476-1478.

(56) References Cited

OTHER PUBLICATIONS

Qualcomm Incorporated: "RaptorQ Technical Overview", pp. 1-12, Oct. 1, 2010.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29NVG11, 8th Meeting: San Jose, CA, USA, Feb. 1-10, 2012, 259 pp.
Miller G., et al., "Bounds on the maximum likelihood decoding error probability of low density parity check codes", Information Theory, 2000. Proceedings. IEEE International Symposium on, 2000, p. 290.
Muramatsu J., et al., "Low density parity check matrices for coding of multiple access networks", Information Theory Workshop, 2003. Proceedings. 2003 IEEE, Apr. 4, 2003, pp. 304-307.
Hannuksela M.M., et al., "DASH: Indication of Subsegments Starting with SAP", 97. MPEG Meeting; Jul. 18, 2011-Jul. 22, 2011; Torino; (Motion Picture Expert Group or ISO/IEC JTC1/SC29/WG11) No. m21096, Jul. 21, 2011, XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011, XP030049998.
He Wenge et al., "Asymmetric Stereoscopic Video Encoding Algorithm Based on Joint Compensation Prediction", IEEE International Conference on Communications and Mobile Computing, Jan. 6, 2009, pp. 191-194, XP031434775, ISBN: 978-0/7695-3501-2.
Hershey, et al., "Random Parity Coding (RPC)", 1996 IEEE International Conference on Communications (ICC). Converging Technologies for Tomorrows Applications. Dallas, Jun. 23-27, 1996, IEEE International Conference on Communications (ICC), New York, IEEE, US, vol. 1, Jun. 23, 1996, pp. 122-126, XP000625654.
Hitachi Ltd. et al., "High-Definition Multimedia Interface," Specification Version 1.3a, Nov. 10, 2006, 276 pp.
Hitachi Ltd. et al., "High-Definition Multimedia Interface," Specification Version 1.4, Jun. 5, 2009, 425 pp.
Hua, et al., "Skyscraper broadcasting: A new broadcasting system for metropolitan video-on-demand systems", Proc. ACM SIGCOMM, pp. 89-100 (Cannes, France, 1997).
Huawei et al., "Implict mapping between CCE and PUCCH for ACK/NACK TDD", 3GPP Draft; R1-082359, 3RD Generation Partnership Project (3GPP), Mobile Competence Centre; 650, Route Des Lucioles ; F-06921 Sophia-Antipolis Cedex ; France, vol. RAN WG1, No. Warsaw, Poland, Jun. 24, 2008, XP050110650, [retrieved on Jun. 24, 2008].
Ian Trow, "Is 3D Event Coverage Using Existing Broadcast Infrastructure Technically Possible", International Broadcasting Conference, Sep. 9, 2009-Sep. 13, 2009, XP030081671, pp. 4-5, "3D transmission over broadcast infrastructure" pp. 7-8, "Screen signaling"—Conclusions on 3D systems.
IETF RFC 2733: Rosenberg, J. et al. "An RTP Payload Format for Generic Forward Error Correction," Network Working Group, RFC 2733 (Dec. 1999).
Information Technology—Generic Coding of Moving Pictures and Audio: Systems, Amendment 4: Transport of Multiview Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.
International Preliminary Examination Report, PCT/US2001/048114—International Preliminary Examining Authority—US, Oct. 17, 2003.
International Preliminary Examination Report, PCT/US2003/031108—International Preliminary Examining Authority—US, Sep. 22, 2004.
International Preliminary Report on Patentability—PCT/US2008/060510, International Search Authority—European Patent Office—Oct. 29, 2009.
"International Preliminary Report on Patentability—PCT/US2011/044284—The International Bureau of WIPO—Geneva, Switzerland, Oct. 8, 2012".
International Preliminary Report on Patentability—PCT/US2011/047121—The International Bureau of WIPO Geneva, Switzerland, Nov. 21, 2012.
International Preliminary Report on Patentability—PCT/US2011/047125—The International Bureau of WIPO Geneva, Switzerland, Nov. 21, 2012.
International Preliminary Report on Patentability—PCT/US2011/047128—The International Bureau of WIPO Geneva, Switzerland, Nov. 21, 2012.
International Preliminary Report on Patentability—PCT/US2011/063995, The International Bureau of WIPO—Geneva, Switzerland, Mar. 18, 2013.
International Preliminary Report on Patentability, PCT/US06/022913—The International Bureau of WIPO—Geneva, Switzerland, Aug. 26, 2008.
International Preliminary Report on Patentability, PCT/US2007/062086—The International Bureau of WIPO—Geneva, Switzerland, Aug. 19, 2008.
International Preliminary Report on Patentability, PCT/US2007/062302—The International Bureau of WIPO—Geneva, Switzerland, Aug. 26, 2008.
International Preliminary Report on Patentability, PCT/US2007/068713—The International Bureau of WIPO—Geneva, Switzerland, Nov. 11, 2008.
International Search Report—PCT/US03/018353—International Search Authority—EPO—Sep. 26, 2003.
International Search Report—PCT/US2007/068713—International Search Authority, European Patent Office, Jan. 8, 2008.
International Search Report—PCT/US2007/62086, International Search Authority—European Patent Office—Nov. 1, 2007.
International Search Report and Written Opinion—PCT/US2004/033222, International Search Authority—European Patent Office—Sep. 13, 2006.
International Search Report and Written Opinion—PCT/US2008/076299, International Search Authority—European Patent Office—Nov. 28, 2008.
International Search Report and Written Opinion—PCT/US2010/025699—ISA/EPO—Jun. 18, 2010.
International Search Report and Written Opinion—PCT/US2010/046027, ISA/EPO—Aug. 17, 2011.
International Search Report and Written Opinion—PCT/US2010/049842, ISA/EPO—Jun. 28, 2011.
International Search Report and Written Opinion—PCT/US2010/049852, International Search Authority—European Patent Office—Feb. 17, 2011.
International Search Report and Written Opinion—PCT/US2010/049862, ISA/EPO—Jun. 27, 2011.
International Search Report and Written Opinion—PCT/US2010/049874, International Search Authority—European Patent Office—Feb. 16, 2011.
International Search Report and Written Opinion—PCT/US2011/036499, ISA/EPO—Aug. 29, 2011.
International Search Report and Written Opinion—PCT/US2011/042444, ISA/EPO—Oct. 5, 2011.
International Search Report and Written Opinion—PCT/US2011/042447, ISA/EPO—Oct. 7, 2011.
International Search Report and Written Opinion—PCT/US2011/043885—ISA/EPO—Dec. 9, 2011.
International Search Report and Written Opinion—PCT/US2011/044284, ISA/EPO—Oct. 21, 2011.
International Search Report and Written Opinion—PCT/US2011/044745—ISA/EPO—Dec. 21, 2011.
International Search Report and Written Opinion—PCT/US2011/047121—ISA/EPO—Oct. 26, 2011.
International Search Report and Written Opinion—PCT/US2011/047125—ISA/EPO—Oct. 26, 2011.
International Search Report and Written Opinion—PCT/US2011/047128—ISA/EPO—Oct. 26, 2011.
International Search Report and Written Opinion—PCT/US2011/057382—ISAEPO—May 3, 2012.
International Search Report and Written Opinion—PCT/US2011/063995—ISAEPO—May 27, 2012.

(56) References Cited

OTHER PUBLICATIONS

International Search Report and Written Opinion—PCT/US2012/024737—ISA/EPO—May 11, 2012.
International Search Report and Written Opinion—PCT/US2012/024743—ISAEPO—Apr. 19, 2012.
International Search Report and Written Opinion—PCT/US2012/024755—ISAEPO—Apr. 23, 2012.
International Search Report and Written Opinion—PCT/US2012/053394—ISA/EPO—Feb. 6, 2013.
International Search Report and Written Opinion—PCT/US2012/058922—ISA/EPO—Dec. 7, 2012.
Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.
Charles Lee L.H, "Error-Control Block Codes for Communications Engineers", 2000, Artech House, XP002642221 pp. 39-45.
Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Chen, et al., U.S. Patent Application titled "Frame Packing for Asymmetric Stereo Video", filed Feb. 25, 2011.
Chen, et al., U.S. Patent Application titled "One-Stream Coding for Asymmetric Stereo Video", filed Feb. 25, 2011.
Chen Ying et al., "Coding techniques in Multiview Video Coding and Joint Multiview Video Model", Picture Coding Symposium, 2009, PCS 2009, IEEE, Piscataway, NJ, USA, May 6, 2009, pp. 1-4, XP031491747, ISBN: 978-1-4244-4593-6.
Choi S: "Temporally enhanced erasure codes for reliable communication protocols" Computer Networks, Elsevier Science Publishers B.V., Amsterdam, NL, vol . 38, No. 6, Apr. 22, 2002, pp. 713-730, XP004345778, ISSN: 1389-1286, DOI:10.1016/S1389-1286(01)00280-8.
Clark G.C., et al., "Error Correction Coding for Digital Communications, System Applications," Error Correction Coding for Digital Communications, New York, Plenum Press, US, Jan. 1, 1981, pp. 331-341.
D. Gozalvez et,al. "AL-FEC for Improved Mobile Reception of MPEG-2 DVB-Transport Streams" Hindawi Publishing Corporation, International Journal of Digital Multimedia Broadcasting vol. 2009, Dec. 31, 2009, pp. 1-10, XP002582035 Retrieved from the Internet: URL:http://www.hindawi.com/journals/ijdmb/ 2009/614178.html> [retrieved on May 12, 2010].
Dan, A. et al.: "Scheduling Policies for an On-Demand Video Server with Batching," Proc. ACM Multimedia, pp. 15-23 (Oct. 1998).
Davey, M.C. et al.: "Low Density Parity Check Codes over GF(q)" IEEE Communications Letters, vol. 2, No. 6 pp. 165-167 (1998).
David Singer, et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.
Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from the Internet: URL:http://www.3gpp.org/ftp/tsg_sa/WG4_CODEC/TSGS4_34/Docs.
Digital Fountain: "Raptor code specification for MBMS file download," 3GPP SA4 PSM AD-HOC #31 (May 21, 2004) XP002355055 pp. 1-6.
"Digital Video Broadcasting (DVB); Guidelines for the implementation of DVB-IP Phase 1 specifications; ETSI TS 102 542" ETSI Standards, LIS, Sophia Antipoliscedex, France, vol. BC, No. V1.2.1, Apr. 1, 2008, XP014041619 ISSN: 0000-0001 p. 43 p. 66 pp. 70, 71.
DVB-IPI Standard: DVB BlueBook A086r4 (Mar. 2007) Transport of MPEG 2 Transport Streatm (TS) Based DVB Services over IP Based Networks, ETSI Technical Specification 102 034 v1.3.1.
Eager, et al. "Minimizing bandwidth requirements for on-demand data delivery," Proceedings of the International Workshop on Advances in Multimedia Information Systems, p. 80-87 (Indian Wells, CA Oct. 1999).
Eager, et al., "Optimal and efficient merging schedules for video-on-demand servers", Proc. ACM Multimedia, vol. 7, pp. 199-202 (1999).
Esaki, et al.: "Reliable IP Multicast Communication Over ATM Networks Using Forward Error Correction Policy," IEICE Transactions on Communications, JP, Institute of Electronics Information and Comm. ENG. Tokyo, vol. E78-V, No. 12, (Dec. 1995), pp. 1622-1637, XP000556183.
European Search Report—EP04794541,Search Authority—Munich Patent Office, Oct. 25, 2010.
European Search Report—EP09007850, Search Authority—Munich Patent Office, Jun. 17, 2010.
European Search Report—EP09007850, Search Authority—Munich Patent Office, Aug. 9, 2010.
European Search Report—EP10002379, Search Authority—Munich Patent Office, May 5, 2010.
European Search Report—EP10011741—Search Authority—Munich—Feb. 28, 2011.
European Search Report—EP10013219—Search Authority—Hague—Jun. 20, 2011.
European Search Report—EP10013220—Search Authority—The Hague—Jun. 15, 2011.
European Search Report—EP10013221—Search Authority—The Hague—Jun. 29, 2011.
European Search Report—EP10013222—Search Authority—Hague—Jun. 28, 2011.
European Search Report—EP10013224—Search Authority—Munich—Feb. 17, 2011.
European Search Report—EP10013225—Search Authority—Munich—Feb. 21, 2011.
European Search Report—EP10013226—Search Authority—Munich—Feb. 17, 2011.
European Search Report—EP10013227—Search Authority—Munich—Feb. 17, 2011.
European Search Report—EP10013231, Search Authority—Hague Patent Office, Mar. 15, 2011.
European Search Report—EP10013232—Search Authority—The Hague—Feb. 28, 2013.
European Search Report—EP10013235—Search Authority—The Hague—Aug. 20, 2012.
European Search Report—EP10013236—Search Authority—The Hague—Jul. 12, 2012.
Feng, G., Error Correcting Codes over Z2m for Algorithm-Based Fault-Tolerance, IEEE Transactions on Computers, vol. 43, No. 3, Mar. 1994, pp. 370-374.
Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010, XP030046346.
Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].
Frojdh, et al., "File format sub-track selection and switching," ISO/IEC JTC1/SC29/WG11 MPEG2009 M16665, London UK., Jul. 2009, 14 pp.
Frojdh P., et al., "Study on 14496-12:2005/PDAM2 ALU/FLUTE Server File Format", 78.MPEG Meeting; Oct. 23, 2006-Oct. 27, 2006; Hangzhou: (Motion Picturexpert Group or ISO/IEC JTC1/SC29/WG11), No. M13855, Oct. 13, 2006, XP030042523, ISSN: 0000-0233.
Gao, L. et al.: "Efficient Schemes for Broadcasting Popular Videos," Proc. Inter. Workshop on Network and Operating System Support for Digital Audio and Video, pp. 1-13 (1998).
Gasiba, Tiago et al., "System Design and Advanced Receiver Techniques for MBMS Broadcast Services" Proc. 2006 International Conference on Communications (ICC 2006), Jun. 1, 2006, pp. 5444-5450, XP031025781 ISBN: 978-1-4244-0354-7.
Gemmell, et al., "A Scalable Multicast Architecture for One-To-Many Telepresentations", Multimedia Computing and Systems,

(56) References Cited

OTHER PUBLICATIONS

1998/ Proceedings. IEEE International Conference on Austin, TX, USA Jun. 28,-Jul. 1, 1998, Los Alamitos, CA USA, IEEE Comput. Soc, US, Jun. 28, 1998, pp. 128-139, XP010291559.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Goyal: "Multiple Description Coding: Compression Meets the Network,"In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].
Gozalvez D et, al: "Mobile reception of DVB-T services by means of AL-FEC protection" Proc. IEEE Intern Symposium on Broadband Multimedia Systems and Broadcasting (BMSB '09), IEEE, Piscataway, NJ, USA, May 13, 2009, pp. 1-5, XP031480155 ISBN: 978-1-4244-2590-7.
Gracie et al., "Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPROC.2007.895197.
Grineberg, et al., "Deliverable D3.2 MVC/SVC storage formet" Jan. 29, 2009, XP002599508 Retrieved from the Internet: URL:http://www.ist-sea.eu/Public/SEA_D3.2_HHIFF_20090129.pdf [retrieved on Sep. 1, 2010] paragraph [02.3].
Hagenauer, J. : "Soft is better than hard" Communications, Coding and Cryptology, Kluwer Publication May 1994, XP002606615 Retrieved from the Internet : URL: http://www. Int . ei .turn.de/veroeffentlic hungen/1994/ccc94h. pdf [retrieved on Oct. 25, 2010].
International Search Report and Written Opinion—PCT/U S2010/024207, International Search Authority—European Patent Office—Jul. 21, 2010.
International Search Report and Written Opinion—PCT/US2010/049869—ISA EPO—Aug. 4, 2011.
International Search Report, PCT/US06/022913—International Search Authority—US, Jul. 18, 2008.
International Search Report, PCT/US2001/048114—International Search Authority—US, May 9, 2002.
International Search Report, PCT/US2003/031108—International Search Authority—European Patent Office, Apr. 13, 2004.
International Search Report, PCT/US2006/022914—International Search Authority—US, Feb. 9, 2007.
International Search Report, PCT/US2007/062302—International Search Authority—US Dec. 21, 2007.
International Search Report, PCT/US2008/060510—International Search Authority—Aug. 1, 2008.
International Standard ISO/IEC 13818-1:2000(E), "Information Technology—Generic Coding of Moving Pictures and Associated Audio Information: Systems," Second edition, Dec. 1, 2000, pp. 1-174.
International Standard ISO/IEC 14496-12, Information Technology—Coding of audio-visual objects—Part 12: ISO base media file format, Third Edition, Oct. 15, 2008, 120 pp.
International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.
ISO/IEC 14996-12 International Standard, "Information technology-Coding of audio-visual objects Part 12: ISO base media file format," Oct. 1, 2005, 94 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
ISO/IEC JTC1/SC29/WG11: "Requirements on HTTP Streaming of MPEG Media", 92. MPEG Meeting; Apr. 19, 2010-Apr. 23, 2010; DRESDEN; No. N11340, May 14, 2010, XP030017837, ISSN: 0000-0029.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol. 3, Mar. 18, 2005, pp. 1097-1100, XP010792442, DOI: 10.1109/ICASSP.2005.1415905 ISBN: 978-0/7803-8874-1.
"Joint Draft 8.0 on Multiview Video Coding", 28th JVT meeting, Hannover, Germany, Document: JVT-AB204 (rev.1), Jul. 2008. available from http:// wftp3. itu.int/av-arch/jvt-site/2008_07_Hannover/JVT-AB204.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, vol. 43, No. 6, Jun. 1, 1995, pp. 2005-2009.
Kimata H et al., "Inter-View Prediction With Downsampled Reference Pictures", ITU Study Group 16-Video Coding Experts Group-ISO/IEC MPEG & ITU-T VCEG(ISO/IEC JTC1/SC29/WG11 and ITU-T SG16 Q6), No. JVT-W079, Apr. 19, 2007, XP030007039.
Kimura et al., "A Highly Mobile SDM-0FDM System Using Reduced-Complexity-and-Latency Processing", IEEE International Symposium on Personal, Indoor and Mobile Radio Communications (PIMRC), Sep. 1, 2007, pp. 1-5, IEEE, XP031168836, ISBN: 978-1-4244-1143-6, DOI: 10.1109/PIMRC.2007.4394758.
Kozamernik F: "Media streaming over the Internet", Internet Citation, Oct. 2002, XP002266291, Retrieved from the Internet: URL: http://www.ebu.ch/trev_292-kozamerni k. pdf [retrieved on Jan. 8, 2004] section "Video codecs for scalable streaming".
Lee L., et al., "VLSI implementation for low density parity check decoder", Proceedings of the 8th IEEE International Conference on Elecctronics, Circuits and Systems, 2001. ICECS 2001, Sep. 2, 2001, vol. 3, pp. 1223-1226.
Li, M., et al., "Playout Buffer and Rate Optimization for Streaming over IEEE 802.11 Wireless Networks", Aug. 2009, Worcester Polytechnic Institute, USA.
Lin, S. et al.: "Error Control Coding-Fundamentals and Applications," 1983, Englewood Cliffs, pp. 288, XP002305226.
Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007, XP015055125, ISSN: 0000-0003.
Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.
Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].
Luby, et al., "FLUTE-File Delivery over Unidirectional Transport", IETF RFC 3926, Oct. 2004, pp. 1-35.
Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, pp. 1-9, New York, NY, USA, IEEE, US Aug. 16, 199.
Luby et, al. "Layered Coding Transport (LCT) Building Block", IETF RFC 5651, pp. 1-42, (Oct. 2009).
Luby et al., RaptorQ Forward Error Correction Scheme for Object Delivery draft-ietf-rmt-bb-fec-raptorq-00, Qualcomm, Inc. Jan. 28, 2010.
Luby, M. et al.: "Efficient Erasure Correction Codes," 2001, IEEE Transactions on Information Theory, Vo. 47, No. 2, pp. 569-584, XP002305225.

(56) References Cited

OTHER PUBLICATIONS

Luby, M., et, al. "Forward Error Correction (FEC) Building Block", IETF RFC 5052, pp. 1-31, (Aug. 2007).
Luby M et al: "IPTV Systems, Standards and Architectures: Part II—Application Layer FEC In IPTV Services" IEEE Communications Magazine, IEEE Service Center, Piscataway, US LNKDDOI: 10.1109/mcom.2008.4511656, vol. 46, No. 5, May 1, 2008, pp. 94-101, XP011226858 ISSN: 0163-6804.
Luby, M. et al.: "Pairwise Independence and Derandomization," Foundations and Trends in Theoretical Computer Science, vol. 1, Issue 4, 2005, Print ISSN 1551-305X, Online ISSN 1551-3068.
Luby, M. et al., "Practical Loss-Resilient Codes: Tornado Codes," 29th Annual ACM Symposium on Theory of Computing, vol. SYMP. 29, May 4, 1997, pp. 150-159, XP002271229.
Luby, M., et al., "Raptor Forward Error Correction Scheme for Object Delivery", IETF RFC5053, pp. 1-46 (Sep. 2007).
Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].
Luby, M., et al., "Request for Comments: 3453: The Use of Forward Error Correction (FEC) in Reliable Multicast," Internet Article, [Online] Dec. 2002, pp. 1-19.
Luby, Michael G. "Analysis of Random Processes via And-Or Tree Evaluation," Proceedings of the 9th Annual ACM-SIAM Symposium on Discrete Algorithms,TR-97-0, 1998, pp. 364-373, (search date: Jan. 25, 2010) URL: <http://portal.acm.prg.citation.cfm"id=314722>.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].
Mackay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-COM:20050237.
Mandelbaum D.M., "An Adaptive-Feedback Coding Scheme Using Incremental Redundancy", IEEE Trans on Information Theory, vol. May 1974, May 1974, pp. 388-389, XP002628271, the whole document.
Marpe, et al., "The H.264/MPEG4 Advanced Video Coding Standard and its Applications," Standards Report, IEEE Communications Magazine, Aug. 2006, pp. 134-143.
Matsuoka H., et al., "Low-Density Parity-Check Code Extensions Applied for Broadcast-Communication Integrated Content Delivery", Research Laboratories, NTT DOCOMO, Inc., 3-6, Hikari-No-Oka, Yokosuka, Kanagawa, 239-8536, Japan, ITC-SS21, 2010 IEICE, pp. 59-63.
McCanne, et al., "Low-Complexity Video Coding for Receiver-Driven Layered Multicast", IEEE Journal on Selected Areas in Communication IEEE Service Center, Aug. 1, 1997, vol. 15, No. 6, pp. 983-1001, Piscataway, US, XP011054678, ISSN: 0733-8716.
Michael G et al., "Improved low-density parity-check codes using irregular graphs", Information Theory, IEEE Transactions on, Feb. 2001,vol. 47, No. 2, pp. 585-598.

3GPP TSG-SA4 #57 S4-100015, IMS based PSS and MBMS User Service extensions, Jan. 19, 2010, URL : http://www.3gpp.org/ftp/tsg_sa/WG4_CODEC/TSGS4_57/docs/S4-100015.zip.
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 P.85-102,URL,http://www.3gpp.org/ftp/TSG_SA/WG4_CODEC/TSGS4_59/Docs/54-100511.zip,26234-930.zip.
Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.
Luby M., "Simple Forward Error Correction (FEC) Schemes," draft-luby-rmt-bb-fec-supp-simple-00.txt, pp. 1-14, Jun. 2004.
Luby M., "LT Codes", Foundations of Computer Science, 2002, Proceedings, The 43rd Annual IEEE Symposium on, 2002.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Morioka S., "A Verification Methodology for Error Correction Circuits over Galois Fields", Tokyo Research Laboratory, IBM Japan Ltd, pp. 275-280, Apr. 22-23, 2002.
Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AH1/54-AH1170.zip, S4-AH170_CR_AdaptiveHT-TPStreaming-Full.doc.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.
Samukawa, H. "Blocked Algorithm for LU Decomposition" Journal of the Information Processing Society of Japan, Mar. 15, 1993, vol. 34, No. 3, pp. 398-408.
Qualcomm Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.
Ramsey B, "HTTP Status: 206 Partial Content and Range Requests," May 5, 2008 obtained at http://benramsey.com/blog/2008/05/206-partial-content-and-range-requests/.
Chikara S., et al., "Add-on Download Scheme for Multicast Content Distribution Using LT Codes", IEICE. B, Communications, Aug. 1, 2006, J89-B (8), pp. 1379-1389.
Gerard F., et al., "HTTP Streaming MPEG media—Response to CFP", 93. MPEG Meeting, Geneva Jul. 26, 2010 to Jul. 30, 2010.
Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995, pp. 938-942, XP000525729, ISSN: 0018-9340, DOI: 10.1109/12.392853.
Tetsuo M., et al., "Comparison of Loss Resilient Ability between Multi-Stage and Reed-Solomon Coding ", Technical report of IEICE. CQ, Communication Quality, vol. 103 (178), Jul. 4, 2003, pp. 19-24.
Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.
Watson M., et al., "Raptor FEC Schemes for FECFRAME draft-ietf-fecframe-raptor-04," 2010, pp. 1-21, URL, http://tools.ietf.org/pdf/draft-ietf-fecframe-raptor-04.pdf.

* cited by examiner

| File format order | | P.T. entry points list | | B.O. entry points list | | Major entry points list | |
|---|---|---|---|---|---|---|---|
| Frame number | Byte offset | Entry P.T. | Entry B.O. | Entry P.T. | Entry B.O. | Entry P.T. | Entry B.O. |
| 1 | 0 | 1 | 0 | 1 | 0 | 1 | 0 |
| 5 | 13,244 | 2 | 0 | 9 | 13,244 | 9 | 27,537 |
| 2 | 18,394 | 3 | 0 | 9 | 18,394 | 17 | 54,523 |
| 3 | 19,236 | 4 | 0 | 9 | 19,236 | | |
| 4 | 20,854 | 5 | 0 | 9 | 20,854 | | |
| 6 | 22,031 | 6 | 0 | 9 | 22,031 | | |
| 7 | 23,433 | 7 | 0 | 9 | 23,433 | | |
| 8 | 26,285 | 8 | 0 | 9 | 26,285 | | |
| 9 | 27,537 | 9 | 27,537 | 9 | 27,537 | | |
| 13 | 34,800 | 10 | 27,537 | 17 | 34,800 | | |
| 10 | 42,075 | 11 | 27,537 | 17 | 42,075 | | |
| 11 | 44,934 | 12 | 27,537 | 17 | 44,934 | | |
| 12 | 46,056 | 13 | 27,537 | 17 | 46,056 | | |
| 14 | 48,303 | 14 | 27,537 | 17 | 48,303 | | |
| 15 | 51,032 | 15 | 27,537 | 17 | 51,032 | | |
| 16 | 52,983 | 16 | 27,537 | 17 | 52,983 | | |
| 17 | 54,523 | 17 | 54,523 | 17 | 54,523 | | |

Fig. 5

| File format order | | P.T. entry points list | | B.O. entry points list | | Major entry points list | |
|---|---|---|---|---|---|---|---|
| Frame number | Byte offset. | Entry P.T. | Entry B.O. | Entry P.T. | Entry B.O. | Entry P.T. | Entry B.O. |
| 1 | 0 | 1 | 0 | 1 | 0 | 1 | 0 |
| 5 | 13,244 | 2 | 0 | 9 | 13,244 | 9 | 22,033 |
| 2 | 18,394 | 3 | 0 | 9 | 18,394 | 17 | 41,993 |
| 3 | 19,236 | 4 | 0 | 9 | 19,236 | | |
| 4 | 20,854 | 5 | 0 | 9 | 20,854 | | |
| 9 | 22,003 | 6 | 0 | 9 | 22,003 | | |
| 6 | 28,033 | 7 | 0 | 17 | 28,033 | | |
| 7 | 29,100 | 8 | 0 | 17 | 29,100 | | |
| 8 | 30,101 | 9 | 22,003 | 17 | 30,101 | | |
| 13 | 31,043 | 10 | 22,003 | 17 | 31,043 | | |
| 10 | 38,056 | 11 | 22,003 | 17 | 38,056 | | |
| 11 | 39,078 | 12 | 22,003 | 17 | 39,078 | | |
| 12 | 40,563 | 13 | 22,003 | 17 | 40,563 | | |
| 17 | 41,993 | 14 | 22,003 | 17 | 41,993 | | |
| 14 | 46,357 | 15 | 22,003 | | | | |
| 15 | 47,184 | 16 | 22,003 | | | | |
| 16 | 48,004 | 17 | 41,993 | | | | |

Fig. 6(a)

| File format order | | P.T. entry points list | | B.O. entry points list | | Major entry points list | |
|---|---|---|---|---|---|---|---|
| Frame number | Byte offset. | Entry P.T. | Entry B.O. | Entry P.T. | Entry B.O. | Entry P.T. | Entry B.O. |
| 1 | 0 | 1 | 0 | 1 | 0 | 1 | 0 |
| 2 | 13,244 | 2 | 0 | 9 | 13,244 | 9 | 25,013 |
| 3 | 14,086 | 3 | 0 | 9 | 14,086 | 17 | 44,840 |
| 4 | 15,704 | 4 | 0 | 9 | 15,704 | | |
| 5 | 16,583 | 5 | 0 | 9 | 16,583 | | |
| 6 | 22,003 | 6 | 0 | 9 | 22,003 | | |
| 7 | 23,070 | 7 | 0 | 9 | 23,070 | | |
| 8 | 24,071 | 8 | 0 | 9 | 24,071 | | |
| 9 | 25,013 | 9 | 25,013 | 9 | 25,013 | | |
| 10 | 31,043 | 10 | 25,013 | 17 | 31,043 | | |
| 11 | 32,065 | 11 | 25,013 | 17 | 32,065 | | |
| 12 | 33,550 | 12 | 25,013 | 17 | 33,550 | | |
| 13 | 34,980 | 13 | 25,013 | 17 | 34,980 | | |
| 14 | 41,993 | 14 | 25,013 | 17 | 41,993 | | |
| 15 | 42,820 | 15 | 25,013 | 17 | 42,820 | | |
| 16 | 43,640 | 16 | 25,013 | 17 | 43,640 | | |
| 17 | 44,840 | 17 | 44,840 | 17 | 44,840 | | |

Fig. 6(b)

| File format order | | P.T. entry points list | | B.O. entry points list | | Major entry points list | |
|---|---|---|---|---|---|---|---|
| Frame number | Byte offset | Entry P.T. | Entry B.O. | Entry P.T. | Entry B.O. | Entry P.T. | Entry B.O. |
| 1 | 0 | 1 | 0 | 1 | 0 | 1 | 0 |
| 5 | 13,244 | 2 | 0 | 9 | 13,244 | 9 | 22,031 |
| 2 | 18,394 | 3 | 0 | 9 | 18,394 | 17 | 48,303 |
| 3 | 19,236 | 4 | 0 | 9 | 19,236 | | |
| 4 | 20,854 | 5 | 0 | 9 | 20,854 | | |
| 13 | 22,031 | 6 | 0 | 9 | 22,031 | | |
| 6 | 30,001 | 7 | 0 | 17 | 30,001 | | |
| 7 | 31,956 | 8 | 0 | 17 | 31,956 | | |
| 8 | 33,057 | 9 | 22,031 | 17 | 33,057 | | |
| 9 | 34,800 | 10 | 22,031 | 17 | 34,800 | | |
| 10 | 42,075 | 11 | 22,031 | 17 | 42,075 | | |
| 11 | 44,934 | 12 | 22,031 | 17 | 44,934 | | |
| 12 | 46,056 | 13 | 22,031 | 17 | 46,056 | | |
| 17 | 48,303 | 14 | 22,031 | 17 | 48,303 | | |
| 14 | 56,065 | 15 | 22,031 | | | | |
| 15 | 57,555 | 16 | 22,031 | | | | |
| 16 | 58,923 | 17 | 48,303 | | | | |

Fig. 7

| File format order | | P.T. entry points list | | B.O. entry points list | | Major entry points list | |
|---|---|---|---|---|---|---|---|
| Frame number | Byte offset | Entry P.T. | Entry B.O. | Entry P.T. | Entry B.O. | Entry P.T. | Entry B.O. |
| 1 | 0 | 1 | 0 | 1 | 0 | 1 | 0 |
| 5 | 13,244 | 2 | 0 | 9 | 13,244 | 9 | 27,537 |
| 2 | 18,394 | 3 | 0 | 9 | 18,394 | 14 | 48,303 |
| 3 | 19,236 | 4 | 0 | 9 | 19,236 | | |
| 4 | 20,854 | 5 | 0 | 9 | 20,854 | | |
| 6 | 22,031 | 6 | 0 | 9 | 22,031 | | |
| 7 | 23,433 | 7 | 0 | 9 | 23,433 | | |
| 8 | 26,285 | 8 | 0 | 9 | 26,285 | | |
| 9 | 27,537 | 9 | 27,537 | 9 | 27,537 | | |
| 13 | 34,800 | 10 | 27,537 | 14 | 34,800 | | |
| 10 | 42,075 | 11 | 27,537 | 14 | 42,075 | | |
| 11 | 44,934 | 12 | 27,537 | 14 | 44,934 | | |
| 12 | 46,056 | 13 | 27,537 | 14 | 46,056 | | |
| 17 | 48,303 | 14 | 48,303 | 14 | 48,303 | | |
| 14 | 56,303 | 15 | 48,303 | | | | |
| 15 | 59,032 | 16 | 48,303 | | | | |
| 16 | 62,523 | 17 | 48,303 | | | | |

Fig. 8

| File format order | | P.T. exit points list | | B.O. exit points list | | Major exit points list | |
| --- | --- | --- | --- | --- | --- | --- | --- |
| Frame number | Byte offset | Exit P.T. | Exit B.O. | Exit P.T. | Exit B.O. | Exit P.T. | Exit B.O. |
| 1 | 0 | 1 | 13,244 | 1 | 13,244 | 1 | 13,244 |
| 5 | 13,244 | 2 | 19,236 | 1 | 18,394 | 2 | 19,236 |
| 2 | 18,394 | 3 | 20,854 | 2 | 19,236 | 3 | 20,854 |
| 3 | 19,236 | 4 | 22,031 | 3 | 20,854 | 5 | 22,031 |
| 4 | 20,854 | 5 | 22,031 | 5 | 22,031 | 6 | 23,433 |
| 6 | 22,031 | 6 | 23,433 | 6 | 23,433 | 7 | 26,285 |
| 7 | 23,433 | 7 | 26,285 | 7 | 26,285 | 8 | 27,537 |
| 8 | 26,285 | 8 | 27,537 | 8 | 27,537 | 9 | 34,800 |
| 9 | 27,537 | 9 | 34,800 | 9 | 34,800 | 10 | 44,934 |
| 13 | 34,800 | 10 | 44,934 | 9 | 42,075 | 11 | 46,056 |
| 10 | 42,075 | 11 | 46,056 | 10 | 44,934 | 13 | 48,303 |
| 11 | 44,934 | 12 | 48,303 | 11 | 46,056 | 14 | 51,032 |
| 12 | 46,056 | 13 | 48,303 | 13 | 48,303 | 15 | 52,983 |
| 14 | 48,303 | 14 | 51,032 | 14 | 51,032 | 16 | 54,523 |
| 15 | 51,032 | 15 | 52,983 | 15 | 52,983 | | |
| 16 | 52,983 | 16 | 54,523 | 16 | 54,523 | | |
| 17 | 54,523 | | | | | | |

Fig. 9

| File format order | | P.T. exit points list | | B.O. exit points list | | Major exit points list | |
|---|---|---|---|---|---|---|---|
| Frame number | Byte offset | Exit P.T. | Exit B.O. | Exit P.T. | Exit B.O. | Exit P.T. | Exit B.O. |
| 1 | 0 | 1 | 13,244 | 1 | 13,244 | 1 | 13,244 |
| 5 | 13,244 | 2 | 19,236 | 1 | 18,394 | 2 | 19,236 |
| 2 | 18,394 | 3 | 20,854 | 2 | 19,236 | 3 | 20,854 |
| 3 | 19,236 | 4 | 22,003 | 3 | 20,854 | 5 | 22,003 |
| 4 | 20,854 | 5 | 22,003 | 5 | 22,003 | 6 | 29,100 |
| 9 | 22,003 | 6 | 29,100 | 5 | 28,033 | 7 | 30,101 |
| 6 | 28,033 | 7 | 30,101 | 6 | 29,100 | 9 | 31,043 |
| 7 | 29,100 | 8 | 31,043 | 7 | 30,101 | 10 | 39,078 |
| 8 | 30,101 | 9 | 31,043 | 9 | 31,043 | 11 | 40,563 |
| 13 | 31,043 | 10 | 39,078 | 9 | 38,056 | 13 | 41,993 |
| 10 | 38,056 | 11 | 40,563 | 10 | 39,078 | 14 | 47,184 |
| 11 | 39,078 | 12 | 41,993 | 11 | 40,563 | 15 | 48,004 |
| 12 | 40,563 | 13 | 41,993 | 13 | 41,993 | | |
| 17 | 41,993 | 14 | 47,184 | 13 | 46,357 | | |
| 14 | 46,357 | 15 | 48,004 | 14 | 47,184 | | |
| 15 | 47,184 | | | 15 | 48,004 | | |
| 16 | 48,004 | | | | | | |

Fig. 10(a)

| File format order | | P.T. exit points list | | B.O. exit points list | | Major exit points list | |
|---|---|---|---|---|---|---|---|
| Frame number | Byte offset | Exit P.T. | Exit B.O. | Exit P.T. | Exit B.O. | Exit P.T. | Exit B.O. |
| 1 | 0 | 1 | 13,244 | 1 | 13,244 | 1 | 13,244 |
| 2 | 13,244 | 2 | 22,003 | 1 | 14,086 | 5 | 22,003 |
| 3 | 14,086 | 3 | 22,003 | 1 | 15,704 | 9 | 31,043 |
| 4 | 15,704 | 4 | 22,003 | 1 | 16,583 | 13 | 41,993 |
| 5 | 16,583 | 5 | 22,003 | 5 | 22,003 | 17 | 49,204 |
| 6 | 22,003 | 6 | 31,043 | 5 | 23,070 | | |
| 7 | 23,070 | 7 | 31,043 | 5 | 24,071 | | |
| 8 | 24,071 | 8 | 31,043 | 5 | 25,013 | | |
| 9 | 25,013 | 9 | 31,043 | 9 | 31,043 | | |
| 10 | 31,043 | 10 | 41,993 | 9 | 32,065 | | |
| 11 | 32,065 | 11 | 41,993 | 9 | 33,550 | | |
| 12 | 33,550 | 12 | 41,993 | 9 | 34,980 | | |
| 13 | 34,980 | 13 | 41,993 | 13 | 41,993 | | |
| 14 | 41,993 | 14 | 49,204 | 13 | 42,820 | | |
| 15 | 42,820 | 15 | 49,204 | 13 | 43,640 | | |
| 16 | 43,640 | 16 | 49,204 | 13 | 44,840 | | |
| 17 | 44,840 | 17 | 49,204 | 17 | 49,204 | | |

Fig. 10(b)

| File format order | | P.T. exit points list | | B.O. exit points list | | Major exit Points | |
| --- | --- | --- | --- | --- | --- | --- | --- |
| Frame number | Byte offset | Exit P.T. | Exit B.O. | Exit P.T. | Exit B.O. | Exit P.T. | Exit B.O. |
| 1 | 0 | 1 | 13,244 | 1 | 13,244 | 1 | 13,244 |
| 5 | 13,244 | 2 | 19,236 | 1 | 18,394 | 2 | 19,236 |
| 2 | 18,394 | 3 | 20,854 | 2 | 19,236 | 3 | 20,854 |
| 3 | 19,236 | 4 | 22,031 | 3 | 20,854 | 5 | 22,031 |
| 4 | 20,854 | 5 | 22,031 | 5 | 22,031 | 6 | 31,956 |
| 13 | 22,031 | 6 | 31,956 | 5 | 30,001 | 7 | 33,057 |
| 6 | 30,001 | 7 | 33,057 | 6 | 31,956 | 8 | 34,800 |
| 7 | 31,956 | 8 | 34,800 | 7 | 33,057 | 9 | 42,075 |
| 8 | 33,057 | 9 | 42,075 | 8 | 34,800 | 10 | 44,934 |
| 9 | 34,800 | 10 | 44,934 | 9 | 42,075 | 11 | 46,056 |
| 10 | 42,075 | 11 | 46,056 | 10 | 44,934 | 13 | 48,303 |
| 11 | 44,934 | 12 | 48,303 | 11 | 46,056 | 14 | 57,555 |
| 12 | 46,056 | 13 | 48,303 | 13 | 48,303 | 15 | 58,923 |
| 17 | 48,303 | 14 | 57,555 | 13 | 56,065 | | |
| 14 | 56,065 | 15 | 58,923 | 14 | 57,555 | | |
| 15 | 57,555 | | | 15 | 58,923 | | |
| 16 | 58,923 | | | | | | |

Fig. 11

| File format order | | P.T. exit points list | | B.O. exit points list | | Major exit points list | |
|---|---|---|---|---|---|---|---|
| Frame number | Byte offset | Exit P.T. | Exit B.O. | Exit P.T. | Exit B.O. | Exit P.T. | Exit B.O. |
| 1 | 0 | 1 | 13,244 | 1 | 13,244 | 1 | 13,244 |
| 5 | 13,244 | 2 | 19,236 | 1 | 18,394 | 2 | 19,236 |
| 2 | 18,394 | 3 | 20,854 | 2 | 19,236 | 3 | 20,854 |
| 3 | 19,236 | 4 | 22,031 | 3 | 20,854 | 5 | 22,031 |
| 4 | 20,854 | 5 | 22,031 | 5 | 22,031 | 6 | 23,433 |
| 6 | 22,031 | 6 | 23,433 | 6 | 23,433 | 7 | 26,285 |
| 7 | 23,433 | 7 | 26,285 | 7 | 26,285 | 8 | 27,537 |
| 8 | 26,285 | 8 | 27,537 | 8 | 27,537 | 9 | 34,800 |
| 9 | 27,537 | 9 | 34,800 | 9 | 34,800 | 10 | 44,934 |
| 13 | 34,800 | 10 | 44,934 | 9 | 42,075 | 11 | 46,056 |
| 10 | 42,075 | 11 | 46,056 | 10 | 44,934 | 13 | 48,303 |
| 11 | 44,934 | 12 | 48,303 | 11 | 46,056 | 14 | 59,032 |
| 12 | 46,056 | 13 | 48,303 | 13 | 48,303 | 15 | 62,523 |
| 17 | 48,303 | 14 | 59,032 | 13 | 56,303 | | |
| 14 | 56,303 | 15 | 62,523 | 14 | 59,032 | | |
| 15 | 59,032 | | | 15 | 62,523 | | |
| 16 | 62,523 | | | | | | |

Fig. 12

| File format order | | P.T. entry points list | | B.O. entry points list | | Major entry points list | |
|---|---|---|---|---|---|---|---|
| Frame number | Byte offset | Entry P.T. | Entry B.O. | Entry P.T. | Entry B.O. | Entry P.T. | Entry B.O. |
| 1 | 0 | 1 | 0 | 1 | 0 | 1 | 0 |
| 2 | 13,244 | 2 | 0 | 9 | 13,244 | 9 | 27,537 |
| 3 | 14,086 | 3 | 0 | 9 | 14,086 | 14 | 48,303 |
| 4 | 15,704 | 4 | 0 | 9 | 15,704 | 15 | 51,032 |
| 5 | 16,881 | 5 | 0 | 9 | 16,881 | 16 | 54,523 |
| 6 | 22,031 | 6 | 0 | 9 | 22,031 | 17 | 56,035 |
| 7 | 23,433 | 7 | 0 | 9 | 23,433 | | |
| 8 | 26,285 | 8 | 0 | 9 | 26,285 | | |
| 9 | 27,537 | 9 | 27,537 | 9 | 27,537 | | |
| 10 | 34,800 | 10 | 27,537 | 14 | 34,800 | | |
| 11 | 37,659 | 11 | 27,537 | 14 | 37,659 | | |
| 12 | 38,781 | 12 | 27,537 | 14 | 38,781 | | |
| 13 | 41,028 | 13 | 27,537 | 14 | 41,028 | | |
| 14 | 48,303 | 14 | 48,303 | 14 | 48,303 | | |
| 15 | 51,032 | 15 | 51,032 | 15 | 51,032 | | |
| 16 | 54,523 | 16 | 54,523 | 16 | 54,523 | | |
| 17 | 56,035 | 17 | 56,035 | 17 | 56,035 | | |

Fig. 13

| File format order | | P.T. exit points list | | B.O. exit points list | | Major exit points list | |
|---|---|---|---|---|---|---|---|
| Frame number | Byte offset | Exit P.T. | Exit B.O. | Exit P.T. | Exit B.O. | Exit P.T. | Exit B.O. |
| 1 | 0 | 1 | 13,244 | 1 | 13,244 | 1 | 13,244 |
| 2 | 13,244 | 2 | 22,031 | 1 | 14,086 | 5 | 22,031 |
| 3 | 14,086 | 3 | 22,031 | 1 | 15,704 | 6 | 23,433 |
| 4 | 15,704 | 4 | 22,031 | 1 | 16,881 | 7 | 26,285 |
| 5 | 16,881 | 5 | 22,031 | 5 | 22,031 | 8 | 27,537 |
| 6 | 22,031 | 6 | 23,433 | 6 | 23,433 | 9 | 34,800 |
| 7 | 23,433 | 7 | 26,285 | 7 | 26,285 | 13 | 48,303 |
| 8 | 26,285 | 8 | 27,537 | 8 | 27,537 | | |
| 9 | 27,537 | 9 | 34,800 | 9 | 34,800 | | |
| 10 | 34,800 | 10 | 48,303 | 9 | 37,659 | | |
| 11 | 37,659 | 11 | 48,303 | 9 | 38,781 | | |
| 12 | 38,781 | 12 | 48,303 | 9 | 41,028 | | |
| 13 | 41,028 | 13 | 48,303 | 13 | 48,303 | | |
| 14 | 48,303 | | | 13 | 51,032 | | |
| 15 | 51,032 | | | 13 | 54,523 | | |
| 16 | 54,523 | | | 13 | 56,035 | | |
| 17 | 56,035 | | | | | | |

MPD
...
Period,
• start=100
• baseURL=http://www.e.com/
...

Representation 1
• bandwidth=500kbit/s
• width 640, height 480

Segment Timeline Info
Timescale: 1
URL Template: ./ahs-5-DUR4.EPT$2*Tind$.time

Segment Info
Timescale: 30000
URL Template: ./ahs-5-$Sind$.3gs

Representation 2
• bandwidth=250kbit/s
• width 640, height 480

Segment Timeline Info
Timescale: 1
URL Template: ./ahs-2-DUR7.EPT$3*Tind$.time

Segment Info
Timescale: 30000
URL Template: ./ahs-2-$Sind$.3gs

---

Segment Timeline files for Representation 1

Segment Timeline 1
URL: http://www.e.com/ahs-5-DUR4.EPT2.time
Contains:
Sind = 1: SPT = 0
Sind = 2: SPT = 10010
Sind = 3: SPT = 19019
Sind = 4: SPT = 49049

Segment Timeline 2
URL: http://www.e.com/ahs-5-DUR4.EPT4.time
Contains:
Sind = 1: SPT = 0
Sind = 2: SPT = 10010
Sind = 3: SPT = 19019
Sind = 4: SPT = 49049
Sind = 5: SPT = 79079

Segment Timeline 3
URL: http://www.e.com/ahs-5-DUR4.EPT6.time
Contains:
Sind = 5: SPT = 79079
Sind = 6: SPT = 125125
Sind = 7: SPT = 145145
Sind = 8: SPT = 175175

Segment Timeline 4
URL: http://www.e.com/ahs-5-DUR4.EPT8.time
Contains:
Sind = 6: SPT = 125125
Sind = 7: SPT = 145145
Sind = 8: SPT = 175175
Sind = 9: SPT = 200200
Sind = 10: SPT = 230230

---

Segment files For Representation 1

Segment 1
http://www.e.com/ahs-5-1.3gs
SPT = 0

Segment 2
http://www.e.com/ahs-5-2.3gs
SPT = 10010

Segment 3
http://www.e.com/ahs-5-3.3gs
SPT = 19019

Segment 4
http://www.e.com/ahs-5-4.3gs
SPT = 49049

Segment 5
http://www.e.com/ahs-5-5.3gs
SPT = 79079

Segment 6
http://www.e.com/ahs-5-6.3gs
SPT = 125125

Segment 7
http://www.e.com/ahs-5-7.3gs
SPT = 145145

Segment 8
http://www.e.com/ahs-5-8.3gs
SPT = 175175

Segment 9
http://www.e.com/ahs-5-9.3gs
SPT = 200200

Segment 10
http://www.e.com/ahs-5-10.3gs
SPT = 230230

**Segment files
For Representation 1**

Segment 1
http://www.e.com/ahs-5-1.1.3gs
SPT = 0

Segment 2
http://www.e.com/ahs-5-1.2.3gs
SPT = 10010

Segment 3
http://www.e.com/ahs-5-1.3.3gs
SPT = 19019

Segment 4
http://www.e.com/ahs-5-1.4.3gs
SPT = 49049

Segment 5
http://www.e.com/ahs-5-2.1.3gs
SPT = 79079

Segment 6
http://www.e.com/ahs-5-2.2.3gs
SPT = 125125

Segment 7
http://www.e.com/ahs-5-3.1.3gs
SPT = 145145

Segment 8
http://www.e.com/ahs-5-3.2.3gs
SPT = 175175

Segment 9
http://www.e.com/ahs-5-4.1.3gs
SPT = 200200

Segment 10
http://www.e.com/ahs-5-4.2.3gs
SPT = 230230

**Segment files
For Representation 2**

Segment 1
http://www.e.com/ahs-2-1.1.3gs
SPT = 0

Segment 2
http://www.e.com/ahs-2-1.2.3gs
SPT = 11011

Segment 3
http://www.e.com/ahs-2-1.3.3gs
SPT = 31031

Segment 4
http://www.e.com/ahs-2-2.1.3gs
SPT = 50050

Segment 5
http://www.e.com/ahs-2-2.2.3gs
SPT = 81081

Segment 6
http://www.e.com/ahs-2-3.1.3gs
SPT = 110110

Segment 7
http://www.e.com/ahs-2-4.1.3gs
SPT = 145145

Segment 8
http://www.e.com/ahs-2-4.2.3gs
SPT = 175175

Segment 9
http://www.e.com/ahs-2-5.1.3gs
SPT = 210210

Segment 10
http://www.e.com/ahs-2-6.1.3gs
SPT = 230230

MPD
...
Period,
• start=100
• baseURL=http://www.e.com/
...

Representation 1
• bandwidth=500kbit/s
• width 640, height 480

Segment Info
TimescaleSegURL: 10
TimescaleSeg: 30000
TM: 22
URL Template: ./ahs-5-$Tind$.$Sind$.3gs

Representation 2
• bandwidth=250kbit/s
• width 640, height 480

Segment Info
TimescaleSegURL: 20
TimescaleSeg: 30000
TM: 30
URL Template: ./ahs-2-$Tind$.$Sind$.3gs

Fig. 16

Continuous timing across segments
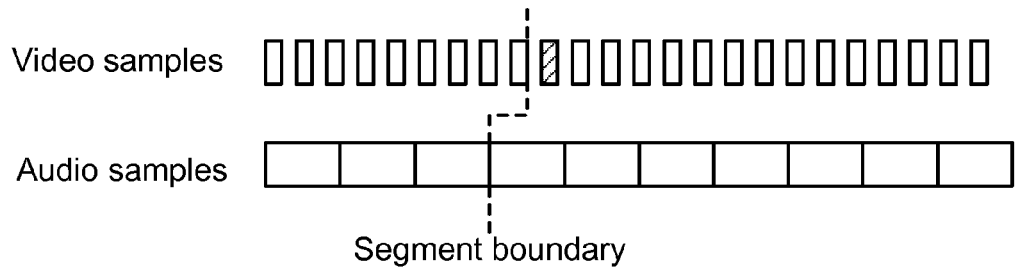
Discontinuous timing across segments
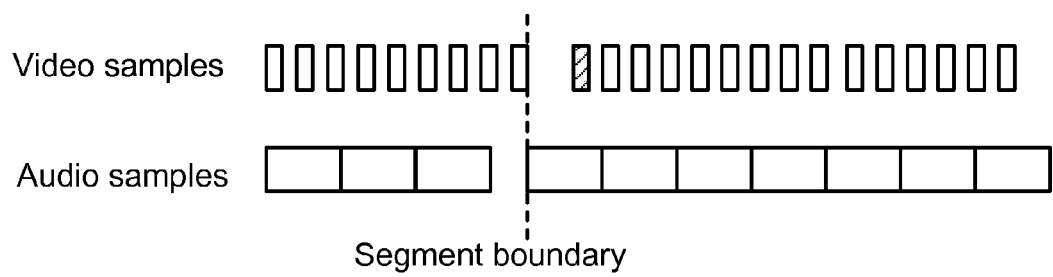
Assumptions:
- Hatched frame chosen as boundary point for independent reasons
- Audio must never begin later than video
Notes:
- In continuous case, second segment is the *same content* as the first
- In discontinuous case, second segment is *different content* from the first
Fig. 27

SWITCH SIGNALING METHODS PROVIDING IMPROVED SWITCHING BETWEEN REPRESENTATIONS FOR ADAPTIVE HTTP STREAMING

REFERENCE TO CO-PENDING APPLICATIONS FOR PATENT

This application claims priority from and is a non-provisional of U.S. Provisional Patent Application No. 61/529,656 filed Aug. 31, 2011 entitled "Switch Signaling Methods Providing Improved Switching Between Representations For Adaptive HTTP Streaming", the entire disclosure of which is incorporated by reference herein for all purposes.

The present disclosure incorporates by reference, as if set forth in full in this document, for all purposes, the following commonly assigned applications/patents:

U.S. Patent Application No. 61/244,767 filed Sep. 22, 2009 entitled "Enhanced Block-Request Streaming System" (hereinafter "Luby A1");

U.S. Patent Application No. 61/257,719 filed Nov. 3, 2009 entitled "Enhanced Block-Request Streaming System" (hereinafter "Luby A2");

U.S. Patent Application No. 61/258,088 filed Nov. 4, 2009 entitled "Enhanced Block-Request Streaming System" (hereinafter "Luby A3");

U.S. Patent Application No. 61/285,779 filed Dec. 11, 2009 entitled "Enhanced Block-Request Streaming System" (hereinafter "Luby A4");

U.S. Patent Application No. 61/296,725 filed Jan. 20, 2010 entitled "Enhanced Block-Request Streaming System" (hereinafter "Luby A5");

U.S. patent application Ser. No. 12/887,476 filed Sep. 21, 2010 entitled "Enhanced Block-Request Streaming System" (hereinafter "Luby B");

U.S. patent application Ser. No. 12/103,605 filed Apr. 15, 2008 entitled "Dynamic Stream Interleaving and Sub-Stream Based Delivery" naming Luby, et al.; and U.S. patent application Ser. No. 12/705,202 filed Feb. 12, 2010 entitled "Block Partitioning for a Data Stream" naming Pakzad, et al. (hereinafter "Pakzad").

TECHNICAL FIELD

The present invention relates to improved media streaming systems and methods, more particularly to systems and methods that are adaptive to network and buffer conditions in order to optimize a presentation of streamed media and provide for efficient concurrent, or timely-distributed, delivery of streamed media data.

BACKGROUND

Streaming media delivery may become increasingly important as it becomes more common for high quality audio and video to be delivered over packet-based networks, such as the Internet, cellular and wireless networks, powerline networks, and other types of networks. The quality with which the delivered streaming media can be presented may depend on a number of factors, including the resolution (or other attributes) of the original content, the encoding quality of the original content, the capabilities of the receiving devices to decode and present the media, timeliness and quality of the signal received at the receivers, etc. To create a perceived good streaming media experience, transport and timeliness of the signal received at receivers may be especially important. Good transport may provide fidelity of the stream received at the receiver relative to what a sender sends, while timeliness may represent how quickly a receiver can start playing out the content after an initial request for that content.

A media delivery system can be characterized as a system having media sources, media destinations, and channels (in time and/or space) separating sources and destinations. Typically, a source includes a transmitter with access to media in electronically manageable form, and a receiver with an ability to electronically control receipt of the media (or an approximation thereof) and provide it to a media consumer (e.g., a user having a display device coupled in some way to the receiver, a storage device or element, another channel, etc.).

"Consumption" is a process at a destination that uses the media being consumed in some way, such as for presentation. For example, a mobile video player "consumes" video data, often at the playout rate of the video. Where the media has a playout rate, such as video that has a normal speed playout rate, a "presentation time" can be defined. For example, the point in a media stream that a viewer would reach after 2:00.00 minutes of normal, uninterrupted playing from the beginning of a media presentation is referred to as having a presentation time ("PT") of 2:00.00.

While many variations are possible, in a common example, a media delivery system has one or more servers that have access to media content in electronic form, and one or more client systems or devices make requests for media to the servers, and the servers convey the media using a transmitter as part of the server, transmitting to a receiver at the client so that the received media can be consumed by the client in some way. In a simple example, there is one server and one client, for a given request and response, but that need not be the case.

Traditionally, media delivery systems may be characterized into either a "download" model or "streaming" model. The "download" model might be characterized by timing independence between the delivery of the media data and the playout of the media to the user or recipient device.

As an example, in a download model or configuration, a receiver that is coupled to a media player or other media consumer and the media is downloaded far enough in advance of when it is needed by the player/consumer or will be used. When the media is used (consumed), as much as is needed is preferably already available at the recipient. Delivery in the download context is often performed using a file transport protocol, such as HTTP, FTP or File Delivery over Unidirectional Transport ("FLUTE") and the delivery rate might be determined by an underlying flow and/or congestion control protocol, such as TCP/IP. The operation of the flow or congestion control protocol may be independent of the playout of the media to the user or destination device, which may take place concurrently with the download or at some other time.

The "streaming" mode might be characterized by a tight coupling between the timing of the delivery of the media data and the playout of the media to the user or recipient device. Delivery in this context is often performed using a streaming protocol, such as the Real Time Streaming Protocol ("RTSP") for control and the Real Time Transport Protocol ("RTP") for the media data. The delivery rate might be determined by a streaming server, often matching the playout rate of the data.

Some disadvantages of the "download" model may be that, due to the timing independence of the delivery and playout, either media data may not be available when it is needed for playout (for example due to the available bandwidth being less than the media data rate), causing playout to stop momentarily ("stalling"), which results in a poor user experience, or media data may be required to be downloaded very far in advance of playout (for example due to the available bandwidth being greater than the media data rate), consuming storage resources on the receiving device, which may be scarce, and consuming valuable network resources for the delivery which may be wasted if the content is not, eventually, played out or otherwise used. In addition, the most pleasing user experience in many cases is to be able to view the video almost immediately after the user decides what to view, as opposed to the model where the user has to order a video after deciding what to view and then having to wait minutes, hours, or potentially days before viewing is possible.

An advantage of the "download" model may be that the technology needed to perform such downloads, for example HTTP, is very mature, widely deployed, and applicable across a wide range of applications. Download servers and solutions for massive scalability of such file downloads (for example, HTTP Web Servers and Content Delivery Networks) may be readily available, making deployment of services based on this technology simple and low in cost.

Some disadvantages of the "streaming" model may be that generally the rate of delivery of media data is not adapted to the available bandwidth on the connection from server to client and that specialized streaming servers or more complex network architecture providing bandwidth and delay guarantees are required. Although streaming systems exist which support variation of the delivery data rate according to available bandwidth (for example Adobe Flash Adaptive Streaming), these are generally not as efficient as download transport flow control protocols such as TCP at utilizing all the available bandwidth, and require specialized server infrastructure to support the server/client streaming sessions.

Recently, new media delivery systems based on a combination of the "streaming" and "download" models have been developed and deployed. An example of such a model is referred to herein as "adaptive HTTP streaming" (herein referred to as "AHS"). Typically, the same multimedia content may be encoded in a variety of different ways, e.g., to accommodate client devices having different decoding and rendering capabilities and to allow for bandwidth adaptation. For example, the same multimedia content (such as the same movie) may be encoded according to different codecs, different frame rates, different bit rates, or different resolutions, be encapsulated using different file formats, and the like. Each unique combination of characteristics forms a "representation" of the multimedia content.

A variety of representations may have similar decoding and rendering requirements (e.g., similar codecs, related resolutions, similar file formats, etc.) but provide different bitrates providing different quality representations of the same multimedia content. An "adaptation set" is a group of representations from which a client might select a representation. For a given period of a presentation, there might be multiple adaptation sets, such as a video adaptation set and an audio adaptation set, but in examples herein, a single adaptation set might be considered, without loss of generality.

Representations may be divided into a plurality of segments, each segment for example corresponding to a period of time for the multimedia content, e.g., ten seconds, one second, 30 seconds, etc. A client device may determine an amount of bandwidth that is currently available, and then request one or more subsequent segments from one of the representations based on the bitrates of the representations and the currently available bandwidth. In this manner, when the amount of bandwidth increases, the client device may request segment(s) from a relatively higher quality representation, but when the amount of bandwidth decreases, the client device may request segment(s) from a relatively lower quality representation that can be accommodated by the amount of bandwidth.

Each segment of a representation can be stored in a file, wherein a URL is associated with each such file, and such that the URL can be used by an AHS client to request an HTTP download of the segment file from standard HTTP web servers. Using this approach, in response to a user request to play the media content from a particular starting point, an AHS client can issue HTTP requests to download segments and receive the requested segments for playout. Ideally, the playout of the media content from the user-requested starting point can begin on the device soon after the user request, and playout of the media content can continue in real-time from that starting point thereafter, i.e., without stall events wherein the media playout is temporarily stalled while waiting for additional media data to arrive. In some AHS systems, HTTP byte range requests may also be used to request portions of segments.

One advantage of AHS is that it can be deployed using standard HTTP web servers, i.e., the same infrastructure used to deliver other Internet content. Another potential advantage of AHS is that AHS clients deployed across a multitude of different devices on a multitude of different types of networks can dynamically decide which representation is suitable to request for playout depending on the characteristics of the playout device, on network conditions such as available bandwidth for downloading, and other factors. This last advantage is especially important for mobile devices, wherein the available network bandwidth might dynamically vary on short time scales, and thus to avoid stalls while at the same time providing the highest quality playout possible for the given network conditions, the AHS client might need to quickly change from requesting segments of one representation to requesting segments of another representation. Furthermore, other characteristics might change quickly on a mobile device, e.g., the amount of remaining charge in the battery, or the display size of the playout, etc.

Frames that might be suitable to be considered to be used for switching between representations, such as I frames, may not provide as much video compression other types of frames, such as P or B frames. However, when points at which a switch are less frequent, a client device attempting to switch between representations may need to wait for a lengthy period of time before a switch is possible, which may cause user experience to suffer (e.g., due to delayed starting of playback for the representation initially or a rebuffering/stuttering playout event after a switch between representations). Therefore, strategic decisions are typically made regarding how frequently to include frames that might be used for switching between representations of multimedia content.

One popular AHS solution is the HTTP Live Streaming protocol initially developed by Apple Inc. (hereafter referred to as "HLS"), and sometimes also called Apple Live Streaming (abbreviated herein to "ALS"), as described in the IETF draft titled "HTTP Live Streaming" and which can be found at the URL with the domain "tools.ietf.org" and the file there named "/html/draft-pantos-http-live-streaming-06". Another popular AHS solution is described in the MPEG DASH standards, for example as specified in ISO/IEC 23009-1:2012 (abbreviated herein "MPEG DASH" or the "MPEG DASH standard").

Thus, what is needed are improved signaling methods and usage of such signaling methods that provide a seamless user video experience during representations switches, and also enable efficient usage of network resources during representation switches.

SUMMARY

The switch signaling methods explained herein provide improved switching between representations for adaptive HTTP streaming described herein enable user experience and bandwidth efficiency improvements for adaptive HTTP streaming solutions. The signaling methods include associating a segment map with each segment of a representation, wherein the segment map comprises both temporal start and temporal exit points within the associated segment together with byte offset information and potentially other information about the segment. Segment maps can be used advantageously by a client to provide faster switching between representations of an adaptive streaming solution, while at the same time downloading less data over the network during the switch and enabling smoother video playout when switching from one representation to another by the video player.

These embodiments include novel improvements to methods used for signaling representation switching information and for using such information to provide a better user viewing experience and a more network efficient switching between representations. Examples of novel switching information includes temporal entry points, temporal exit points and byte offsets associated with those points within the segment map for its associated segment. A entry point indicates a temporal point at which the representation could be switched to and continued to be played out seamlessly to any subsequent exit point of the representation, and the byte offset associated with the entry point indicates the byte position within the segment wherein the download could begin to receive the data that would allow playout from that entry point. Similarly, an exit point indicates a temporal point at which playout could start at any entry point of the representation previous to the exit point and played out seamlessly to the exit point, and the byte offset associated with the exit point indicates the byte position within the segment wherein the download could end to receive the data that would allow playout to that exit point. Sufficient information is supplied in the segment map to allow seamless switching between representations and efficient usage of network resources even when the segments themselves are encrypted.

In some embodiments, the different representations are segmented such that there is "SAP alignment" between different representations of an adaptation set, in that different representations may entry and exit times that are coincident across representations. In some embodiments, the different representations are segmented such that there is "overlap patch alignment" between different representations wherein the start and end presentation times of the entry and exit points match. The type of alignment, and whether it is present for some, none or all of the representations or pairs or groups of representations, can be signaled in a profile.

These embodiments can be used to enhance existing deployments in such a way that there is no need to change existing content encoding and formatting processes, and such that existing clients that receive and playout content are unaffected. These embodiments generate and provide access to augmented information, such as segment maps, associated with encoded and formatted content. These embodiments also provide methods that can be utilized by enhanced clients to access the generated augmented information to provide the benefits described above.

The following detailed description together with the accompanying drawings will provide a better understanding of the nature and advantages of the present invention.

BRIEF DESCRIPTION OF THE DRAWINGS

FIG. 5 shows entry point lists for a representation comprising frames with the same structure as shown in FIG. 1.

FIG. 6 shows entry point lists for a representation comprising frames with the same structure as shown in FIG. 2; FIG. 6(a) shows an example with the file format order being in decode order, while FIG. 6(b) shows an example with the file format order being in presentation order.

FIG. 7 shows entry point lists for a representation comprising frames with the same structure as shown in FIG. 3.

FIG. 8 shows entry point lists for a representation comprising frames with the same structure as shown in FIG. 4.

FIG. 9 shows entry point lists for a representation comprising frames with the same structure as shown in FIG. 1.

FIG. 10 shows exit point lists for a representation comprising frames with the same structure as shown in FIG. 2; FIG. 10(a) shows an example with the file format order being in decode order, while FIG. 10(b) shows an example with the file format order being in presentation order.

FIG. 11 shows exit point lists for a representation comprising frames with the same structure as shown in FIG. 3.

FIG. 12 shows exit point lists for a representation comprising frames with the same structure as shown in FIG. 4.

FIG. 13 shows entry point lists for a representation comprising frames with the same frame dependency structure as shown in FIG. 4, but with the file format order being the presentation time order instead of the decode order shown in FIG. 4.

FIG. 14 shows exit point lists for a representation comprising frames with the same frame dependency structure as shown in FIG. 4, but with the file format order being the presentation time order instead of the decode order shown in FIG. 4.

FIG. 15 shows an example of signaling segment timeline files in a Dynamic Adaptive Streaming over HTTP (DASH) system.

FIG. 16 shows an example of a mixed time-based and index-based segment URL template generation.

FIG. 27 illustrates continuous and discontinuous timing across segments.

Figure 1:
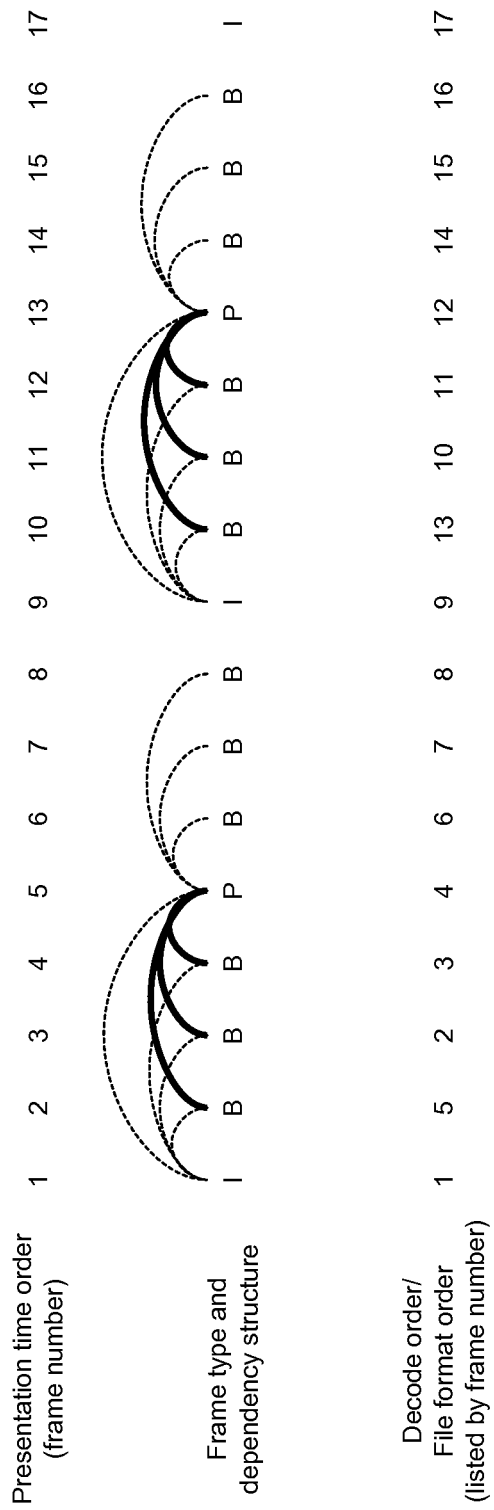
FIG. 1 illustrates an example of a presentation time order, a frame dependency structure, and a file format order for an encoded data video stream with a closed GOP structure.

In the figures, like items are referenced with like numbers and sub-indices are provided in parentheses to indicate multiple instances of like or identical items. Unless otherwise indicated, the final sub-index (e.g., "N" or "M") is not intended to be limiting to any particular value and the number of instances of one item can differ from the number of instances of another item even when the same number are illustrated and the sub-index is reused.

DETAILED DESCRIPTION

As described herein, a goal of a streaming system is to move media from its storage location (or the location where it is being generated) to a location where it is being consumed, i.e., presented by a client to a user or otherwise "used up" by a human or electronic consumer. Ideally, the streaming system can provide uninterrupted playback (or more generally, uninterrupted "consumption") at a receiving end and the client can begin playing a stream or a collection of streams shortly after a user has requested the stream or streams. For efficiency reasons, it is also desirable that each stream be halted once the user indicates that the stream is no longer needed, such as when a client is switching from one stream to another stream, for example due to fluctuations in the available amount of bandwidth between servers and the client. If media content, such as a video, is to be played out seamlessly, but a different stream is selected by the client to play out this media content, it is often preferred to occupy limited bandwidth with the new stream and stop the old stream.

The methods according to embodiments described herein provides many benefits. It should be understood that a viable system need not include all of the features described herein, as some applications might provide a suitably satisfying experience with less than all of the features described herein.

While explained in places with reference to software, instructions, steps, processes or procedures, or the like, it should be understood that the described inventions could be implemented in software stored onto tangible media and/or can be implemented as computing devices, transmitters, receivers, etc. having suitable hardware to facilitate sending and receiving and consuming of media, such as those described herein or otherwise.

Adaptive HTTP Streaming

Adaptive HTTP Streaming ("AHS") is a specific type of streaming. With AHS, the sources might be standard web servers and content delivery networks ("CDNs") and might use standard HTTP. This technique may involve stream segmentation and the use of multiple streams, all within the context of standardized HTTP requests. The media, such as video, may by encoded at multiple bitrates to form different versions, or representations. The terms "version" and "representation" are used synonymously in this document. Each version or representation may be broken into smaller pieces, perhaps on the order of a few seconds each, to form segments. Each segment may then be stored on a web server or CDN as a separate file, requested using a URL associated with the file. The presentation time durations of the representations might not be the same for every segment.

On the client side, requests may then be made, using HTTP, for individual segments that are seamlessly spliced together by the client. The client may switch to different data rates based on available bandwidth. The client may also request multiple representations, each presenting a different media component, and may present the media in these representations jointly and synchronously. Triggers for switching may include buffer occupancy and network measurements, for example. When operating in the steady state, the client may pace requests to the server to maintain a target buffer occupancy.

Advantages of AHS may include bit-rate adaptation, fast startup and seek, and minimal unnecessary delivery. These advantages come from controlling the delivery to be only a short time ahead of the playout, making maximum use of available bandwidth (through variable bit rate media), and optimizing stream segmentation and intelligent client procedures.

Although these AHS solutions have many good features, there are improvements that can be made. For example, the HLS solution would benefit from the ability to signal switch points to a representation or between representations. As another example, MPEG DASH would benefit from more detailed signaling of switching to a representation or between representations when open GOP video encoding is employed that allows more efficient switching and more efficient usage of network resources. As another example, additional methods for generating URLs for segments in an automated way that allows an AHS client to easily join a stream or rejoin a live streaming session would be beneficial.

Explained herein are improved signaling methods and usage of such signaling methods that provide a seamless user video experience during representations switches, and also enable efficient usage of network resources during representation switches.

A media presentation description may be provided to an AHS client such that the client can use a collection of files (for example in formats specified by 3GPP, herein referred to as "3 gp segments") to provide a streaming service to the user. A media presentation description, and possibly updates of this media presentation description, describe a media presentation that is a structured collection of segments, each containing media components such that the client can present the included media in a synchronized manner and can provide advanced features, such as seeking, switching bitrates and joint presentation of media components in different representations. The client may use the media presentation description information in different ways for the provisioning of the service. In particular, from the media presentation description, the AHS client may determine which segments in the collection can be accessed so that that the data is useful to the client capability and the user within the streaming service.

In some embodiments, the media presentation description may be static, although segments might be created dynamically. The media presentation description may be as compact as possible to minimize access and download time for the service. Other dedicated server connectivity may be minimized, for example regular or frequent timing synchronization between client and server.

The media presentation may be constructed to permit access by terminals with different capabilities, such as access to different access network types, different current network conditions, display sizes, access bitrates and codec support.

The client may then extract the appropriate information to provide the streaming service to the user.

The media presentation description may also permit deployment flexibility and compactness according to the requirements.

In a simplest case, each alternative representation may be stored in a single 3GP file, i.e., a file conforming as defined in 3GPP TS26.244, or any other file that conforms to the ISO base media file format as defined in ISO/IEC 14496-12 or derived specifications (such as the 3GP file format described in 3GPP Technical Specification 26.244). In the remainder of this document, when referring to a 3GP file, it should be understood that ISO/IEC 14496-12 and derived specifications can map all described features to the more general ISO base media file format as defined in ISO/IEC 14496-12 or any derived specifications. The client may then request an initial portion of the file to learn the media metadata (which typically is stored in the Movie header box, also referred to as 'moov' box) together with movie fragment times and byte offsets. The client may then issue HTTP partial get requests to obtain movie fragments as required.

In some embodiments it may be desirable to split each representation into several segments. Where the segment format is based on the 3GP file format, segments contain non-overlapping time slices of the movie fragments, called "timewise splitting". Each of these segments may contain multiple movie fragments and each may be a valid 3GP file in its own right. In another embodiment, the representation is split into an initial segment containing the metadata (typically the Movie Header "moov" box) and a set of media segments, each containing media data and the concatenation of the initial segment and any media segment forms a valid 3GP file as well as the concatenation of the initial segment and all media segments of one representation forms a valid 3GP file. The entire presentation may be formed by playing out each segment in turn, mapping the local timestamps within the file to the global presentation time according to the start time of each representation.

It should be noted that throughout this description references to a "segment" should be understood to include any data object that is fully or partially constructed or read from a storage medium or otherwise obtained as a result of a file download protocol request, including for example an HTTP request. For example, in the case of HTTP, the data objects may be stored in actual files residing on a disk or other storage medium connected to or forming part of an HTTP server, or the data objects may be constructed by a CGI script, or other dynamically executed program, which is executed in response to the HTTP request. The terms "file" and "segment" are used synonymously in this document unless otherwise specified. In the case of HTTP, the segment may be considered as the entity body of an HTTP request response.

The terms "presentation" and "content item" are used synonymously in this document. In many examples, the presentation is an audio, video, or other media presentation that has a defined "playout" time, but other variations are possible.

The terms "block" and "fragment" are used synonymously in this document unless otherwise specified and generally refer to the smallest aggregation of data that is indexed. Based on the available indexing, a client can request different portions of a fragment in different HTTP requests, or can request one or more consecutive fragments or portions of fragments in one HTTP request. In the case where ISO base media file format based segments or 3GP file format based segments are used, a fragment typically refers to a movie fragment defined as the combination of a movie fragment header ('moof') box and a media data ('mdat') box.

Herein, a network carrying data is assumed to be packet-based in order to simplify the descriptions herein, with the recognition that, after reading this disclosure, one skilled in the art can apply embodiments of the present invention described herein to other types of transmission networks, such as continuous bit-stream networks.

It is assumed in many of these examples that a client is coupled to a media server or a plurality of media servers and the client requests streaming media over a channel or a plurality of channels from the media server or the plurality of media servers. However, more involved arrangements are also possible.

Key Frames in Sequences

In video coding, some frames (such as intra-prediction mode encoded frames, also known as "I-frames") of video data are coded independently, without reference to other frames of video data. To exploit temporal redundancies between frames, other frames (that is, inter-prediction mode encoded frames such as P and B frames) are coded relative to previous or subsequent coded frames (referred to as reference frames). One of the potential difficulties with AHS is how to seamlessly switch from one representation to another when frames (or in general, other data) are coded relative to previous or subsequent frames. A potential difficulty is that the different representations of the content might be video encoded using a different frame dependency frame structure for frames that are to be presented at the same time in the different representations. Even when the dependency frame structure is the same between the different representations, the representations may use different resolution and are at different qualities, and thus using frames in one representation to decode frames in other representations in general does not lead to a seamless playout of the video, i.e., can provide a bad user viewing experience. Thus, a concern with AHS is how to seamlessly switch between representations.

Key frames are frames of a representation at which a client device may begin decoding the representation without access to earlier data of the representation, i.e., a key frame is an I-frame such that no frame after the I-frame depends on any frame previous to the I-frame. Moreover, key frames can act as representation access points for representations, i.e., places in which the download and the playout of the video can commence. Furthermore, such key frames can be helpful when switching from a first representation to a second representation, as a key frame in the second representation can be the starting point of playout in the second representation. For example, a client device may switch from a first representation to a second representation by retrieving data in the first representation up to the temporal location of a key frame in the second representation, then retrieving data starting at the key frame of the second representation. In some limited cases, this strategy may provide a seamless user experience during representation switching, but in other situations this simple strategy may fail to provide a seamless user experience during representation switching, e.g., because frames in the first representation that are temporally previous to the key frame in the second representation depend on other frames in the first representation that are temporally subsequent to the key frame of the second representation.

Furthermore, because of the use of Digital Rights Management (DRM) systems, and/or encryption, it is often the case that the frame dependency structure is not available in the part of the receiving client that makes representation switch and download decisions.

Data Dependency Structures

With video encoding technologies in general, such as MPEG1, MPEG2, or H.264 AVC encoded video, the presentation time order of frames with a single representation can differ from the decoding order of frames. The presentation time order is the consecutive order in which frames are displayed relative to other frames.

The presentation time order is more precisely determined by the presentation time associated with each frame, where the difference between the presentation times of two frames is the difference in the times the two frames are to be displayed. In this disclosure, presentation time is to be broadly interpreted. For example, the presentation time at a point of the content may be measured starting at zero from the intended start playout time of the beginning of the content up till that point, e.g., if the point is intended to be played out 20 seconds after the start of the content then the presentation time associated with that point is 20 seconds. Alternatively, presentation time may be measured in terms of wall clock time or UTC time or other equivalent time measures, as one skilled in the art will recognize.

A decode order is an ordering of frames in which the frames can be decoded, taking into account the interdependencies between various frames. An ordering of frames is said to be a decode order if for each frame, all frames that depend on that frame are subsequent in the order relative to that frame. This allows the decoding of the next frame to be decoded to be based on frames that have already been decoded. It is typical that the transmission order of frames in a streaming delivery system is a decode order, so as to ensure that frames arrive in the order that they can be easily decoded. In the descriptions below, the file format order is defined to be the order of frames within the files or segments of a representation that are to be delivered to a client, and thus the file format order is often the order in which portions of a representation will be delivered to a client when files or portions of a file are requested by clients. For AHS systems, it is typical that the order of frames within a representation, i.e., the file format order, is a decode order.

FIG. 1 illustrates an example of a presentation time order, a frame dependency structure, and a file format order for an encoded data video stream. The presentation time order frame number is used to uniquely number the frames, and hereinafter "presentation time order frame number" is abbreviated to "frame number". For example, the first frame in presentation time order is hereafter referred to as frame 1. Each frame is labeled to be of type "I" (Intra-code), "P" (Predictive) or "B" (Bi-predictive). The frame dependency structure in FIG. 1 is indicated by arched lines between frames: a dotted arch between two frames indicates that the later frame in presentation time order depends on the earlier frame; a dark solid arch between two frames indicates that the earlier frame in presentation time order depends on the later frame. The "decode order" is such that each frame is prior to any frames that depend on it.

In the example shown in FIG. 1, frame 1 is decodable based on the data that is received for frame 1, as it is an I-frame. Frame 2 is decodable based on the data that is received for frames 1 and 5 as well as the data that is received for frame 2 (frame 2 is a B-frame). Similarly, frame 3 uses frames 1, 3, 5, frame 4 uses frames 1, 4, 5, frame 5 uses frames 1, 5, frame 6 uses frames 5, 6, frame 7 uses frames 5, 7, frame 8 uses frames 5, 8, and so frames 1-8 can be decoded once the content for frames 1-8 are received. However, since frame 2 cannot be completely decoded without frame 5, if the frames are received in "decode order" then frame 2 can be decoded after receipt of just three frames (1, 2, 5) instead of having to wait for receipt of five frames.

In the example shown in FIG. 1, the file format order of the frames is the same as the decode order shown. A Group of Pictures (or "GOP") can be defined as a set of consecutive frames that start at an I-frame up to but not including the next I-frame in the sequence. In FIG. 1, frames 1-8 comprise one GOP, frames 9-16 comprise a second GOP, and frame 17 is the start of a third GOP. The GOP-structure shown in FIG. 1 is sometimes called a "closed-GOP structure", as each of the frames comprising a GOP does not depend on frames of other GOPs.

Figure 2:
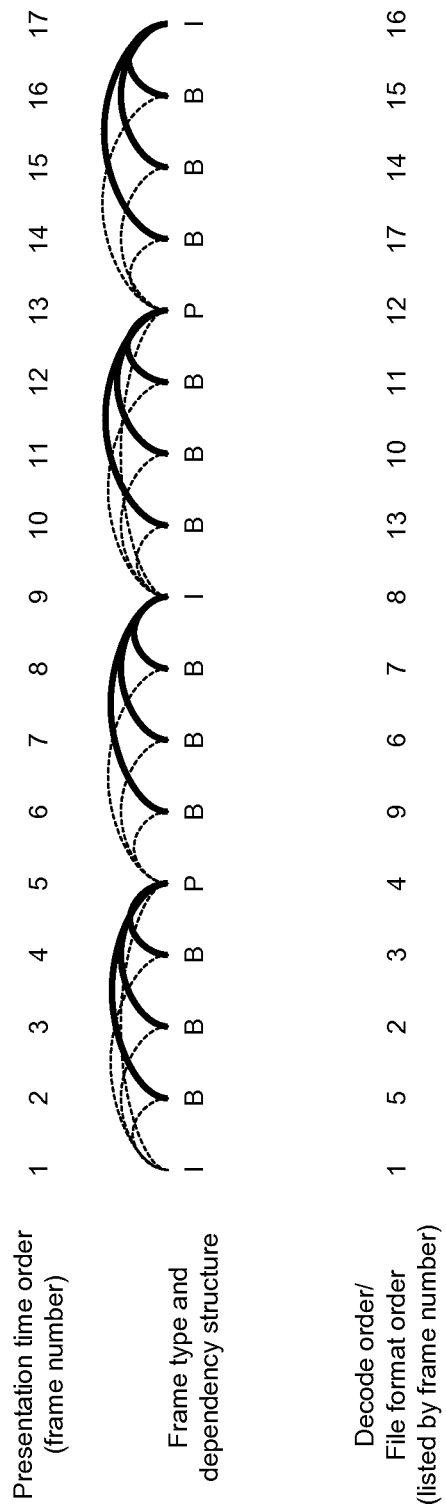
FIG. 2 illustrates another example of a presentation time order, a frame dependency structure, and a file format order for an encoded data video stream with an open GOP structure.

FIG. 2 illustrates another example of a presentation time order, a frame dependency structure, and a file format order for an encoded data video stream, and follows the same terminology conventions as described for FIG. 1. In this case, the B-frames between the last P-frame of a GOP and the I-frame of the next GOP in presentation time order may all depend on the I-frame of the next GOP, and thus some of the frames comprising a GOP may depend on frames of other GOPs. The GOP-structure shown in FIG. 2 is sometimes called an "open-GOP structure".

Figure 3:
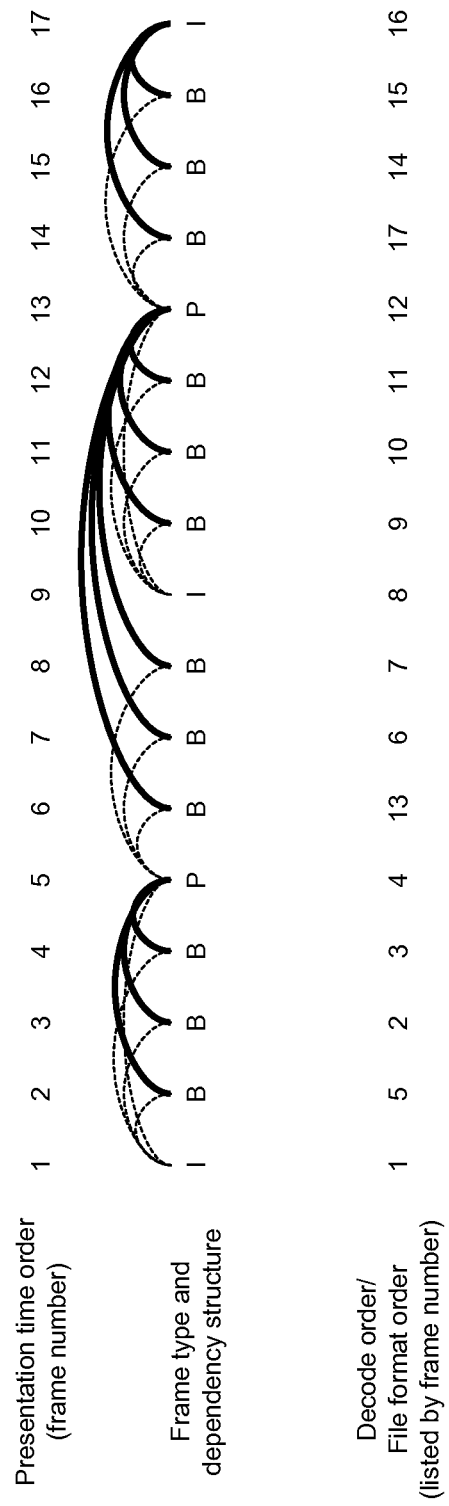
FIG. 3 illustrates another example of a presentation time order, a frame dependency structure, and a file format order for an encoded data video stream with an alternative open GOP structure.

FIG. 3 illustrates another example of a presentation time order, a frame dependency structure, and a file format order for an encoded data video stream, and follows the same terminology conventions as described for FIG. 1. In this case, there is a more complicated dependency structure between the frames, i.e., B-frames 6, 7, 8, respectively, depend on P-frame 13 that is subsequent in presentation time order to I-frame 9 at the beginning of the next GOP.

Figure 4:
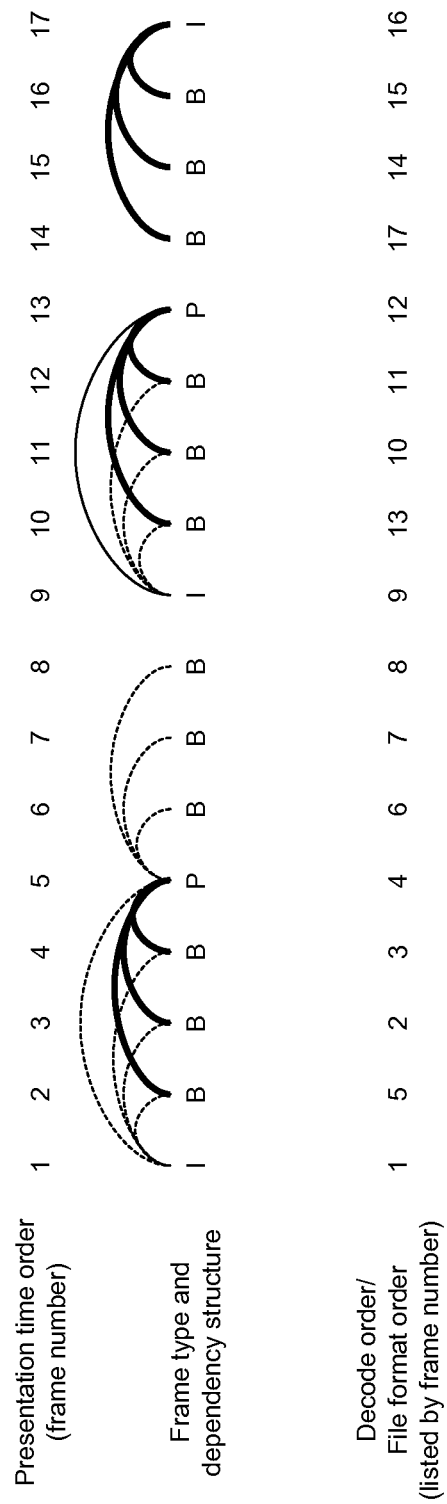
FIG. 4 illustrates another example of a presentation time order, a frame dependency structure, and a file format order for an encoded data video stream with an alternative GOP structure.

FIG. 4 illustrates another example of a presentation time order, a frame dependency structure, and a file format order for an encoded data video stream, and follows the same terminology conventions as described for FIG. 1. In this case, B-frames 14, 15, 16, respectively, depend on I-frame 17 at the beginning of the next GOP but not on any frames preceding them in presentation time order.

Entry Points and Exit Points

With respect to streaming content in general, there is a relationship between the frame dependency structures of representations of content and the methods used to switch between representations of the media content, and in particular how to signal at which points a switch between representations can be made. This relationship information can be generated and conveyed to the client in a succinct format, generally called entry point and exit point information, as described below. Entry point and exit point information can be used for other purposes as well, for example to determine which portions of a representation to download in a single request, even in the case when there is only one representation of the content, i.e., even when switching to another representation is not supported.

For the purposes of this discussion, the presentation time of a frame is the time when the frame is meant to begin display relative to the begin display time of other frames of the content, i.e., it is the begin presentation time of the frame, and each frame is meant to end display at exactly the begin presentation time of the next consecutive frame in presentation time order, i.e., the end presentation time of a frame is the begin presentation time, or simply presentation time, of the next frame in presentation time order.

For the definitions of entry points and exit points below, a byte offset is always assumed to be a byte offset to the beginning of a frame and a presentation time is always assumed to be the begin presentation time of a frame (equal to the end presentation time of the previous frame), although these restrictions can be relaxed as one skilled in the art will recognize. For example, in other alternative definitions and descriptions, byte offsets to any point in the data stream might be considered, e.g., a byte offset to the middle of the data comprising a frame of video, and any valid presentation time might be considered, e.g., a presentation time that is mid-way between the start and end presentation time of a frame.

As used herein, entry points can be expressed or represented using an indication of the time of the entry and a byte offset, e.g., in the form of "(entry presentation time, entry byte offset)", or more concisely, "(PT, BO)." The entry point (PT, BO) for a representation is the point at which, if the representation is downloaded starting from the byte offset BO and continued forward to the end, the video frames of the content in the representation can be played out seamlessly in presentation time order starting with presentation time PT to the end. Thus, in the descriptions herein, an entry point specifies a point in two-dimensions, where one dimension corresponds to the file format order and the other dimension corresponds to the presentation time order. As described herein in more detail below, signaling such points for a representation can be used as entry points to a representation, i.e., used to determine where to start downloading and playing out from a representation.

Note that by the definition of an entry point (PT, BO), all frames that have an entry presentation time of at least PT and all frames that these frames either directly or indirectly depend upon start at a byte offset that is at least BO into the representation.

For each possible byte offset BO into the representation there is a unique presentation time PT such that (PT, BO) is an entry point and such that PT is the minimum presentation time among all such possible entry points, and the function TentryB( ) is defined such that TentryB(BO)=PT. The list of such entry points for all possible byte offsets BO is referred to herein as the "byte offset entry point list".

Note that if the file format contains more than one media, e.g., a mixture of audio and video data, then an entry point may have to take into account the different medias. For example, the presentation time PT associated with a byte offset BO might be defined as the maximum of PT1 and PT2, wherein PT1 is the minimum presentation time that can be achieved for byte offset BO for a first media and PT2 is the minimum presentation time that can be achieved for a second media. Similar comments hold for all the further definitions and methods described hereafter related to entry points and exit points.

Similarly, for each possible presentation time PT there is a unique byte offset BO such that (PT, BO) is an entry point and such that BO is the maximum byte offset among all such entry points, and define BentryT(PT)=BO. A list of such entry points for all possible presentation times PT is referred to herein as a "presentation time entry point list".

It is possible that there are entry points in the byte offset entry point list with differing byte offsets but with the same presentation time, and that there are entry points in the presentation time entry point list with differing presentation times but with the same byte offset. Furthermore, if an entry point (PT, BO) in the byte offset entry point list is such that there is no other entry point (PT', BO') in the byte offset entry point list with PT'=PT and BO'>BO then the entry point (PT, BO) will also be in the presentation time entry point list and will have the property that there is no other entry point (PT', BO') in the presentation time entry point list with BO'=BO and PT'<PT. Similarly, if an entry point (PT, BO) in the presentation time entry point list is such that there is no other entry point (PT', BO') in the presentation time entry point list with BO'=BO and PT'<PT then the entry point (PT, BO) will also be in the byte offset entry point list and will have the property that there is no other entry point (PT', BO') in the byte offset entry point list with PT'=PT and BO'>BO.

Classify the entry points that are in both the byte offset entry point list and the presentation time entry point list as "major entry points" and classify the remaining entry points that are in only one of the entry point lists as "minor entry points". Note that if (PT, BO) is a major entry point then (PT, BO)=(TentryB(BO), BentryT(PT)). For each minor entry point (PT, BO) there is either a major entry point (PT, BO') with BO'>BO, in which case the major entry point is superior to the minor entry point because the same content starting at the same presentation time can be played out starting at a later byte offset with the major entry point, or there is a major entry point (PT', BO) with PT>PT', in which case the major entry point is superior to the minor entry point because more content can be played out starting at the same byte offset with the major entry point.

Note that these definitions are valid independent of the ordering of frames within a representation, i.e., whether the file format order is presentation time order, decode order, or some other order of frames within a representation.

Similarly, define an exit point of the form "(exit presentation time, exit byte offset)", where the meaning of an exit point (PT, BO) for a representation is that if the representation is downloaded from the beginning up through byte offset BO then the video frames of the content in the representation can be played out seamlessly in presentation time order starting at the beginning up through presentation time PT. Thus, in the descriptions herein, an exit point specifies a point in two-dimensions, where one dimension corresponds to the file format order and the other dimension corresponds to the presentation time order. As we describe in more detail below, signaling such points for a representation can be used as exit points from a representation, i.e., used to determine where to end downloading and playing out from a representation.

Note that by the definition of an exit point (PT, BO), all frames that have an end presentation time of at most PT and all frames that these frames either directly or indirectly depend upon end at a byte offset that is at most BO into the representation.

For each possible byte offset BO into the representation there is a unique presentation time PT such that (PT, BO) is an exit point and such that PT is the maximum presentation time among all such possible exit points, and define TexitB(BO)=PT. Define the list of such exit points for all possible byte offsets BO as being the "byte offset exit point list".

Similarly, for each possible presentation time PT there is a unique byte offset BO such that (PT, BO) is an exit point and such that BO is the minimum byte offset among all such exit points, and define BexitT(PT)=BO. Define the list of such exit points for all possible presentation times PT as being the "presentation time exit point list".

It is possible that there are exit points in the byte offset exit point list with differing byte offsets but with the same presentation time, and that there are exit points in the presentation time exit point list with differing presentation times but with the same byte offset. Furthermore, if an exit point (PT, BO) in the byte offset exit point list is such that there is no other exit point (PT', BO') in the byte offset exit point list with PT'=PT and BO'<BO then the exit point (PT, BO) will also be in the presentation time exit point list and will have the property that there is no other exit point (PT', BO') in the presentation time exit point list with BO'=BO and PT'>PT. Similarly, if an exit point (PT, BO) in the presentation time exit point list is such that there is no other exit point (PT', BO') in the presentation time exit point list with BO'=BO and PT'>PT then the exit point (PT, BO) will also be in the byte offset exit point list and will have the property that there is no other exit point (PT', BO') in the byte offset exit point list with PT'=PT and BO'<BO.

Classify the exit points that are in both the byte offset exit point list and the presentation time exit point list as "major exit points" and classify the remaining exit points that are in only one of the exit point lists as "minor exit points". Note that if (PT, BO) is a major exit point then (PT, BO)=(TexitB(BO), BexitT(PT)). For each minor exit point (PT, BO) there is either a major exit point (PT, BO') with BO'<BO, in which case the major exit point is superior to the minor exit point because the same content ending at the same presentation time can be played out ending at an earlier byte offset with the major exit point, or there is a major exit point (PT', BO) with PT<PT', in which case the major exit point is superior to the minor exit point because more content can be played out ending at the same byte offset with the major exit point.

Note that these definitions are valid independent of the ordering of frames within a representation, i.e., whether the file format order is presentation time order, decode order, or some other order of frames within a representation.

FIG. 5 shows entry point lists for a representation comprising frames with the same structure as shown in FIG. 1. The first table shown in FIG. 5 shows the frames listed in file format order according to their frame number, together with the byte offset to the beginning of each frame. The second table shown in FIG. 5 shows the presentation time entry point list. The third table shown in FIG. 5 is the byte offset entry point list. The fourth table shown in FIG. 5 is the list of major entry points. In these last three tables, the entry presentation time is the frame number of the first frame that can be played out, hereafter called the "entry frame". In FIG. 5, the major entry points are (1, 0), (9, 27,537) and (17, 54,523). Note that for all major entry points, all frames subsequent in the file format order to the entry frame are to be played out, and this is a consequence of a closed GOP structure. Note that using the frame number to indicate presentation time is only one way to represent presentation time, and one skilled in the art will recognize, there are many other presentation time formats, including formats where the media or data in general to be played back is not representable in discrete time steps such as frames.

FIG. 6, FIG. 7 and FIG. 8, respectively, show entry point lists for a representation comprising frames with the same structure as shown in FIG. 2, FIG. 3 and FIG. 4, respectively. The five tables shown in each of FIG. 6(a), FIG. 6(b), FIG. 7, and FIG. 8 have the same format and meaning as described above for FIG. 5, however, FIG. 6(a) uses a decode order for the file format, while FIG. 6(b) uses a presentation order as the file format order.

In FIG. 6(a), the major entry points are (1, 0), (9, 22,033) and (17, 41,993). Note that for the (9, 22,033) major entry point, not all frames subsequent in the file format order to the entry frame 9 are to be played out, e.g., frames 6, 7 and 8. This is a consequence of an open GOP structure.

In FIG. 7, the major entry points are (1, 0), (9, 22,031) and (17, 48,303). Note that for the (9, 22,031) major entry point, the first downloaded frame in file format order is not frame 9 but instead frame 13, and thus the first frame downloaded is not the first frame played out for this major entry point. Furthermore, frames 6, 7 and 8, which are subsequent to frame 13 in file format order, are to be downloaded but not to be played out from this major entry point. This is a consequence of this alternative open GOP structure.

In FIG. 8, the major entry points are (1, 0), (9, 27,537) and (14, 48,303). Note that for the (14, 48,303) major entry point, the first downloaded frame in file format order is not frame 14 but instead frame 17, and thus the first frame downloaded is not the first frame played out for this major entry point. This is a consequence of this alternative open GOP structure.

FIG. 9, FIG. 10, FIG. 11 and FIG. 12, respectively, show exit point lists for a representation comprising frames with the same structure as shown in FIG. 1, FIG. 2, FIG. 3 and FIG. 4, respectively. The five tables shown in each of FIG. 9, FIG. 10(a), FIG. 10(b), FIG. 11, and FIG. 12 have a similar format and meaning as described above for FIG. 5. The differences are that exit points are shown instead of entry points, and that the exit presentation time is the frame number of the last frame that can be played out, hereafter called the "exit frame". FIG. 10(a) uses a decode order for the file format, while FIG. 10(b) uses a presentation order as the file format order.

As another example, FIG. 13 shows the entry point lists for a representation comprising frames with the same dependency frame structure shown in FIG. 4, but with the file format order being the presentation time order instead of the decode order shown in FIG. 4, and FIG. 14 shows the corresponding exit point lists.

It is sometimes the case that signaling each major entry point and major exit point of a representation is appropriate, whereas other times this amount of signaling may represent a significant signaling overhead and thus only selected major entry points and major exit points are signaled. In other cases, it is appropriate to also signal some of the minor entry points and minor exit points.

Methods for Generating Entry Points and Exit Points

In implementation, entry point generators and exit point generators implementations may depend on the media-encoding format of its input. For example, the input may be MPEG2 encoded content encapsulated into an MPEG2 TS format, the input may be H.264 AVC content encapsulated into an MPEG2 TS format, or the input may be H.264 AVC content encapsulated into ISO file format. As other more detailed examples, the H.264 AVC content may be encoded using "closed GOPs", or it may be encoded using "open GOPs", or it may be encoded to allow a very general dependency structure between the video frames. As other examples, B-frames may be excluded, or B-frames may be allowed.

Preferably, the output format of different entry point generators and exit point generators implementations is the same entry point format and exit point format, respectively, independent of the specific media-encoding format input to the methods. This is advantageous because then the segment map generator can be used to generate segment maps independent of the media-encoding format of the original content, i.e., the same segment map generator can be used whether the original media-encoding format is H.264 AVC with "open GOPs" carried in ISO file format or whether the media-encoding format is MPEG2 TS with "closed GOPs" and no B-frames carried in MPEG TS format.

Preferably, the output of the entry point generators and exit point generators should contain a dense enough set of entry points and exit points, respectively, so that a segment map generator has enough entry points and exit points to select from to generate segment maps that can be used by clients to provide an excellent streaming experience to end users. This is preferable because then the entry point generators and exit point generators do not have to take into account specifics of the AHS streaming solution, and instead the specifics of AHS streaming logic can be taken into account by the segment map generator.

The file format order of frames within a representation is said to be in decode order if for any frame F, all frames that the frame F depends on are earlier in the file format order than frame F.

For the embodiments and methods of generating entry points and exit points described below, a byte offset is always assumed to be a byte offset to the beginning of a frame and a presentation time is always assumed to be the begin presentation time of a frame (equal to the end presentation time of the previous frame), although these restrictions can be relaxed as one skilled in the art will recognize.

A first embodiment of an exit point generation method when the file format order is a decode order is the following: Determine the presentation time of each frame and the byte offset to each frame in the file format order. For each presentation time PT, determine the byte offset BO to the frame that has the smallest byte offset among all frames that are subsequent in the file format order to all frames with presentation time strictly smaller than PT. The determined exit point is (PT, BO). (If there is no such frame in the file format order, then BO is the byte offset to the end of the representation.) Note that BO=BexitT(PT). Note that in this embodiment, the exit point generation method does not have to analyze the underlying frame dependency structure to generate a list of exit points. This is because the property that the file format order is a decode order expresses enough of the frame dependency structure to efficiently determine exit points based on the file format order and the presentation time of frames.

If multiple consecutive exit points in the list generated by the first embodiment have the same exit byte offset BO, then the latest exit point in the presentation time order, i.e., the one with the largest presentation time PT, among these consecutive exit points with the same exit byte offset BO is a major exit point and the remaining are minor exit points.

A second embodiment of an exit point generation method when the file format order of a representation is a decode order is the following: Determine the presentation time of each frame and the byte offset to each frame in the file format order. For each byte offset BO, determine the earliest presentation time PT among all frames in the file format order that start at or after BO. The determined exit point is (PT, BO). (There is one additional exit point (PT, BO), where BO is the byte offset to the end of the representation, and PT is the end presentation time of the representation.) Note that PT=TexitB (BO). Note that in this embodiment, the exit point generation method does not have to analyze the underlying frame dependency structure to generate a list of exit points. This is because the property that the file format order is a decode order expresses enough of the frame dependency structure to efficiently determine exit points based on the file format order and the presentation time of frames.

If multiple consecutive exit points in the list generated by the second embodiment have the same exit presentation time PT, then the earliest exit point in the file format order, i.e., the one with the smallest byte offset BO, among these consecutive exit points with the same exit presentation time PT is a major exit point and the remaining are minor exit points.

FIGS. 5-14 show examples and possible formats for generating entry points and exit points. The file format order is the decode order shown for the examples depicted in FIGS. 5-12, and thus the exit generation methods described above can be used to generate the exit point lists shown in FIGS. 9-12, wherein the first embodiment might be used to generate the second table in each of these examples and wherein the second embodiment might be used to generate the third table in each of these examples, and wherein the fourth table of major exit points in each of these examples can be generated using either of the two embodiments described above.

There are many alternatives and enhancements of exit point generators. For example, the second embodiment of the exit point generation method can generate the exit points in an on-line manner as the file format is consecutively generated, i.e., for each byte offset BO, the method can determine the earliest presentation time PT of a missing frame among all frames in the file format order that start prior to BO, and the exit point is (PT, BO). For example, in FIG. 1 if the byte offset BO is to the beginning of frame 5 then, since the frame that starts prior to BO in file format order is frame 1, the earliest presentation time PT of a missing frame is that of frame 2, which means that the exit presentation time is the end presentation time of frame 1. As another example, in FIG. 1 if the byte offset BO is to the beginning of frame 13 then, since the frames that start prior to BO in file format order are frames 1, 5, 2, 3, 4, 6, 7, 8 and 9, the earliest presentation time PT of a missing frame in this list is that of frame 10, which means that the exit presentation time is the end presentation time of frame 9. Note that no information about frames in the file format starting at or subsequent to BO is required. As one skilled in the art will recognize, there are standard data structures and methods that allow the efficient determination of PT from the presentation times of all frames in the file format order that are prior to BO.

Note that the file format order is not the decode order shown in FIG. 4 for the examples depicted in FIG. 13 and FIG. 14, but instead the file format order is the presentation time order. As one can verify, because the file format order is not a decode order, the first embodiment of an exit point generation method does not generate the second table shown in FIG. 14, and similarly the second embodiment of an exit point generation method does not generate the third table shown in FIG. 14. However, the third embodiment of an exit point generation method described below can be used to generate the tables shown in FIG. 14.

A third embodiment of an exit point generation method, that can be used independent of the underlying file format order and frame dependency structure, can be described as follows: for each byte offset BO, determine the latest presentation time PT such that all frames with an end presentation time of at most PT depend, either directly or indirectly, only on frames starting prior to BO in the file format order. Then, the determined exit point is (PT, BO). Note that PT=TexitB (BO). The third embodiment of the exit point generation method can generate the exit points in an on-line manner as the file format is consecutively generated, i.e., for each byte offset BO, determine the exit presentation time associated with BO based only on the presentation times and frame dependency structure of frames prior to BO in the file format order.

One process for determining the exit presentation time associated with BO is to determine a first list of frames that start before BO, determine a second list of frames from the first list of frames by removing from the first list of frames all frames that depend on, either directly or indirectly, frames that start at or beyond BO, and PT is the presentation time of the frame with the smallest frame number among all frames not in the second list of frames. Note that the second list of frames can be determined as follows. Determine a third list of frames by selecting from the first list of frames all frames that depend directly on frames that start at or beyond BO. The second list of frames can then be determined from the frame dependency structure amongst frames in the first list of frames, and from the third list of frames.

As one skilled in the art will recognize, there are many alternatives and optimizations possible for the embodiments described above. For example, the process described above for determining the exit presentation time associated with a particular byte offset BO can be integrated into an overall process that retains information and lists from byte offsets previous to BO to determine the information and lists for BO. As another optimization, data structures other than a list format can be used, and detailed information about only portions of a list may be explicitly represented. For example, if it is known that the frame dependency structure is such that each frame depends, either directly or indirectly, on frames that are at most D frames subsequent or prior to that frame in file format order then detailed information can be kept for the D frames starting prior to or subsequent to BO, and any other information about frames can be represented implicitly or in a compressed format.

A first embodiment of an entry point generation method is the following. Suppose, as is often the case, that there is a type of frame, hereafter called Independent Data Refresh frame, often abbreviated to IDR-frame, that have the following property: A frame F is an IDR-frame if F does not depend on any other frame and if all frames F' with presentation times greater than the presentation time of frame F and all frames upon which such frames F' depend are all after frame F in the file format order.

The first embodiment of an entry point generation method can identify IDR-frames, and for each such IDR-frame F, determine the byte offset BO to frame F in the file format order, and then determine the entry point as (PT, BO), where PT is the presentation time of frame F. Note that in this first embodiment, the entry point generation method does not have to analyze the underlying frame dependency structure to generate a list of entry points. This is because the definition of IDR-frame expresses enough of the frame dependency and file format structure to efficiently determine entry points.

There are many alternatives and enhancements of the first embodiment of an entry point generation method. For example, the first embodiment of an entry point generation method can generate the entry points in an on-line manner as the file format is consecutively generated, i.e., for each byte offset BO to a frame F in the file format order, determine if F is an IDR-frame, and if so then determine the presentation time PT of frame F and determine an entry point (PT, BO). Note that no information about frames in the file format subsequent to frame F is required.

A second embodiment of an entry point generation method, that can be used independent of the underlying file format order and frame dependency structure, can be described as follows: for each byte offset BO, determine the earliest presentation time PT such that all frames with a presentation time of at least PT depend, either directly or indirectly, only on frames starting at or subsequent to BO in the file format order. Then, the determined exit point is (PT, BO). Note that PT=TentryB(BO).

FIG. 5, FIG. 6(a), FIG. 7, and FIG. 8 show different examples of file format order and corresponding generated entry point lists, corresponding to the frame dependency structures shown in FIG. 1, FIG. 2, FIG. 3, and FIG. 4, respectively. FIG. 6(b) and FIG. 13 shows another example of a file format order and corresponding generated entry point lists corresponding to the frame dependency structure shown in FIG. 2 and FIG. 4, respectively, when the file format order is the presentation time order. Some of the properties of these entry points have already been described above.

In FIG. 5, FIG. 6(a), FIG. 6(b), FIG. 8 and FIG. 13, the frame dependency structure and the file format order is such that each I-frame is an IDR-frame, and thus the first embodiment of an entry point generation method can generate a list of entry points. The entry point list generated by the first embodiment corresponds to the fourth table of major entry point list for FIG. 5, FIG. 6(a) and FIG. 6(b). The entry point list generated by the first embodiment differs from the fourth table of major entry point list for FIG. 8, and in particular the major entry point (14, 48,303) shown in FIG. 8 is preferable to the entry point (17, 48,303) that the first embodiment would generate. The entry point list generated by the first embodiment is a subset of the fourth table of major entry point list for FIG. 13, and in particular the three major entry points (14, 48,303), (15, 51,032) and (16, 54,523) shown in FIG. 13 would not be generated by the first embodiment.

Note that in FIG. 7, the I-frame with label 9 is not an IDR-frame, as the frames with labels 10, 11 and 12 follow the I-frame in the file format order and they all depend on the frame with label 13 that precedes the I-frame.

The entry point list generated by the second embodiment correspond to the third table of major entry point list for FIG. 5, FIG. 6(a), FIG. 6(b), FIG. 7, FIG. 8, and FIG. 13.

If multiple consecutive entry points in the list generated by the second embodiment have the same entry presentation time PT, then the latest entry point in the file format order, i.e., the one with the largest byte offset BO, among these consecutive entry points with the same entry presentation time PT is a major entry point and the remaining are minor entry points. The major entry list shown in the fourth table in FIG. 5, FIG. 6(a), FIG. 6(b), FIG. 7, FIG. 8, and FIG. 13, and in general, can be generated from this major entry point selection process based on the entry point list generated by the second embodiment.

Suppose that there is some positive integer value D such that the frame dependency structure is limited so that no frame depends on any frame, either directly or indirectly, more than D frames distant with respect to the file format order. Then, the second embodiment of an entry point generation method can be generated in an on-line manner as the file format is consecutively generated as follows: for each byte offset BO, determine the entry presentation time associated with BO based only on the presentation times and frame dependency structure of frames prior to BO and frames up to at most D frames subsequent to BO in the file format order.

One process for determining the entry presentation time associated with BO is to determine a first list of D+1 frames comprising the frame with the largest frame number that starts prior to BO together with the D consecutive frames starting at byte offset BO in file format order, determine a first frame number that is the largest frame number of a frame among the frames in the first list of frames that depends on, either directly or indirectly, a frame that starts before BO, and PT is the presentation time of the frame with the frame number that is one more than the first frame number. Note that any frame that is beyond the first list of frames in file format order cannot depend, either directly or indirectly, on any frame that starts prior to BO. The first frame number can be determined as follows. Determine a second list of frames by selecting from the first list of frames all frames that depend directly on frames that start prior to BO. The first frame number can then be determined from the frame dependency structure amongst frames in the first list of frames, and from the second list of frames.

As one skilled in the art will recognize, there are many alternatives and optimizations possible for the embodiments described above. For example, the second embodiment described above for determining the entry presentation time associated with a particular byte offset BO can be integrated into an overall process that retains information and lists from byte offsets previous to BO to determine the information and lists for BO. As another optimization, data structures other than a list format can be used, and detailed information about only portions of a list may be explicitly represented. For example, detailed information can be kept for the D consecutive frames starting at BO, and any other information about frames can be represented implicitly or in a compressed format.

Seamless Switching Methods

1. Seamless Switching Methods Using Entry Points and Exit Points

The properties of entry points and exit points associated with a representation are the following. The entry presentation time listed with an entry point indicates a presentation time of the data from the representation where playout can be started and continued seamlessly to any subsequent exit presentation time listed with an exit point of the representation, and the byte offset associated with the entry point indicates the byte position within the segment wherein the download could begin to receive the data that would allow playout to start at that presentation time. Similarly, the exit presentation time listed with an exit point indicates a presentation time of the data from the representation where seamless playout can be ended that starts at any previous entry presentation time listed with an entry point of the representation, and the byte offset associated with the exit point indicates the byte position within the segment wherein the download could end to receive the data that would allow playout to end at that presentation time.

An overview of a client method for switching from a first representation to a second representation is the following. Suppose the client has determined that it would like to make a seamless switch at the earliest presentation time possible after a presentation time T, where for example T is the latest presentation time from a first representation already available in the media buffer, or already requested to be downloaded into the media buffer. From the available entry points for the second representation, the client can select an entry point (TS, BOS) such that TS is earliest amongst all entry presentation times for the second representation that are at least T. From the available exit points for the first representation, the client can select an exit point (TE, BOE) such that TE is earliest amongst all exit presentation times for the first representation that are at least TS. The client can download the data from the first representation up until the exit byte offset BOE and can download data from the second representation starting at the entry byte offset BOS. The client can provide to the media player the downloaded data from the first representation and from the second representation, and instruct the media player to video decode the first representation up to and including the temporal time TE, and to video decode the second representation starting at and continuing on from temporal time TS. In the case that TS is not equal to TE, i.e., TE>TS, then the media player can decide to render the video to the display from the first representation up through some presentation time TU, and then continue with display from the second representation starting at presentation time TU, where TU is between TS and TE, inclusive. In some embodiments, it is preferable if TU=TS, as this allows a clean start of the playout of the second representation at an entry point.

As a first alternative client switching method, suppose the client has determined that it would like to make a seamless switch at the latest presentation time possible before a presentation time T. From the available exit points for the first representation, the client can select an exit point (TE, BOE) such that TE is latest amongst all exit presentation times for the first representation that are at most T. From the available entry points for the second representation, the client can select an entry point (TS, BOS) such that TS is latest amongst all entry presentation times for the second representation that are at most TE. The remainder of the first alternative client method can be as described above once the entry and exit points have been selected.

As a second alternative client switching method, suppose the client has determined that it would like to make a seamless switch at a presentation time as close as possible to a presentation time T. From the available exit points for the first representation, the client can select an exit point (TE, BOE) such that TE is earliest amongst all exit presentation times for the first representation that are at least T. From the available entry points for the second representation, the client can select an entry point (TS, BOS) such that TS is latest amongst all entry presentation times for the second representation that are at most TE. The remainder of the second alternative client method can be as described above once the entry and exit points have been selected.

As a third alternative client switching method, the client can select an entry point (TS, BOS) from the available entry points for the second representation such that TS is the latest entry presentation time amongst all entry points for the second representation that are at most T. From the available exit points for the first representation, the client can select an exit point (TE, BOE) such that TE is the earliest amongst all exit presentation times for the first representation that is after TS.

As a fourth alternative client switching method, suppose the client has determined that it would like to make a seamless switch from a first representation to a second representation at the latest presentation time possible before a byte offset BO into the first representation, for example based on media already in a buffer that it has downloaded from the first representation, wherein BO might be the byte offset of the end of the portion of the first representation already downloaded into the media buffer, or the byte offset of the end of the first representation already requested for download into the media buffer. From the available exit points for the first representation, the client can select an exit point (TE, BOE) such that BOE is latest amongst all exit byte offsets for the first representation that is at most BO. From the available entry points for the second representation, the client can select an entry point (TS, BOS) such that TS is latest amongst all entry presentation times for the second representation that are at most TE. The remainder of the fourth alternative client method can be as described above once the entry and exit points have been selected. As one skilled in the art will recognize, there are other alternative client switching methods that are combinations of the above, for example basing the determination of the switch based on an initial byte offset for the first representation, as in the fourth alternative, and determining the entry and exit points based on this as described in the second alternative.

Note that for the first, second and fourth alternative client switching methods, the exit point chosen for the first representation is independent of the entry point chosen for the second representation. Thus, these alternatives provide attractive methods when there might be a choice of more than one second representation to which a switch can be considered, and the client can decide where to complete the download of the first representation before deciding which of the possible second representations to choose. The alternatives that choose the exit point for the first representation prior to a given presentation time T or byte offset BO might be applicable when the client needs to reduce to a lower rate second representation because the available bandwidth has reduced, in which case presentation time T or byte offset BO could be the latest available presentation time or byte offset available or soon to be available for the first representation, and no additional data need be downloaded from the higher rate first presentation when the available bandwidth has reduced, as this will tend to minimize the chance that the media buffer will be drained before enough data from the second representation has arrived to be able to continue the playout seamlessly.

2. Choosing Download Portions Based on Entry Points and Exit Points

As one skilled in the art will recognize after reading this disclosure, there are many ways that a client can utilize entry point and exit point information. For example, a crucial factor in terms of user experience is the amount of time it takes to start playing out a video from the time that a user requests the video to play out by for example clicking on a link in a web page or by using a mouse to drag the playout position of the video to a different playout time. The shorter that this amount of time is the better the user experience is generally, especially when the user is sampling different contents, i.e., moving from one content to another fairly frequently, or seeking to different start positions within a particular content. Thus, minimizing this start up time is an important concern.

A client that has access to entry point and exit point information can use this to minimize the startup time, even when the playout is from a single representation of the content, i.e., there is no switching from one representation to another, and thus the client is not necessarily an AHS client. For example, the client might be provided a first entry point at which to start playing out and a list of subsequent first exit point, second exit point, third exit point, etc. The client may use the subsequent exit points to decide which portion of the content to request in a first request, wherein this portion might be from the byte offset of the first entry point to the byte offset of the first exit point. The client can then decide as the first download request is being fulfilled as to when to start the playout of the video, preferably using techniques that avoid stalls or rebuffering once the playout has commenced. The client can also issue download requests for subsequent portions of the content, using the byte offsets of subsequent exit points as the start and ending byte offsets of subsequent requests, wherein preferably these subsequent requests are issued in such a way that avoids stalls or rebuffering. As the media buffer fills, the client can potentially issue requests for portions of the content that span larger portions of the content than when the media is less full, wherein larger means larger in presentation time, larger in bytes, or both.

As another alternative, an AHS client can use the methods just described, enhanced as follows. Instead of just one representation of the content, there are multiple representations. The AHS client may obtain or be provided the first entry point at which to start playing out the content of a first representation and a first and subsequent exit points for this first representation, and also be provided with entry points for alternative representations that are subsequent to the first entry point. In this case, the AHS client may decide which portions of the first representation to download, similar to the client methods described in the previous paragraph, but also potentially using possible entry points into the alternative representations to decide the portions. For example, as is often typical, the frequency of exit points might be higher than that of entry points, e.g., there might be multiple, e.g., 5 or more, exit points provided between each pair of consecutive entry points of a representation. In this case, the AHS client may decide as before to start with download portions that are relative short, e.g., from the start entry point of the first representation to the first subsequent exit point, and then as the media buffer grows to start downloading larger portions, e.g., from one exit point to an exit point that is more than one exit point into the future. However, the AHS client may also take into account the entry points to other alternative representations in making decisions on which portions to download of the first representation, for example to ensure that if a rate switch is necessitated then the AHS client will have downloaded an appropriate portion from the first representation to minimize the amount of overlapping content that is downloaded from the first representation and a possible switched to second representation. For example, when downloading portions from the first representation, the AHS client may choose a current download portion from the first representation that ends at the byte offset associated with an exit point that is at or just beyond in presentation time of a possible second entry point of a second representation at which a switch might be chosen, i.e., the next download portion chosen after the current download portion might be from the second representation starting at the byte offset associated with the second entry point.

As another alternative, a client might use multiple concurrent HTTP connections to download representations, and in addition might use FEC, as disclosed in Luby A5. In this alternative, as disclosed in Luby A5, it is important that the multiple connections are scheduled to download content in ways that will ensure fast start up times while at the same time minimizing the number of download requests. Thus, when first starting up, a client might partition the download of the portion of the content from the first entry point to the first subsequent exit point across the multiple connections, e.g., a first of four connections might request download of the first ¼ of this portion, a second connection might request download of the next ¼, etc. In this way, the connections are all downloading pieces of the portion of content that is initially needed for playout. Furthermore, as disclosed in Luby A5, additional FEC data for the content might be made available in a separate file, and download requests for this FEC data can also be made to further speed up the delivery of the content needed for playout. As with the previous alternatives, as the media buffer fills the pieces of the download request portions can grow, and in the case of an AHS client the begin and ending of download portions (that are subsequently partitioned into multiple pieces to be requested over multiple connections) chosen for a first representation can be made based on entry points for possible alternative representations to which a switch may be made.

3. Overview of Processes for Generating Switch Information

Segment maps can be used advantageously by a client to provide faster switching between representations of an adaptive streaming solution, while at the same time downloading less data over the network during the switch and enabling smoother video playout when switching from one representation to another by the video player. As also described herein, segment maps have other uses, such as enabling improved startup up times and improved resiliency against rebuffering/stall events.

As an example, a segment map can comprise an entry point list, an exit point list and optionally other metadata associated with a segment of a representation. An entry point list comprises a list of entry points and, associated with each such entry point, an entry presentation time and an entry byte offset. An exit point list comprises a list of exit points and, associated with each such exit point, an exit presentation time and an exit byte offset.

Generating segment maps can functionally partitioned into two method parts. Associated with the first method part are two types of methods, herein called entry point generators and exit point generators, that take as input a file or stream of media encoded in a particular format and generate detailed lists of entry points and exit points, respectively, for that media. The second method part, herein called a segment map generator, takes as input detailed lists of entry points and exit points to generate segment maps.

Embodiments for segment map generators can use the output of entry point generators and exit point generators to generate the segment maps. A segment map generator can be media format agnostic, and can provide a list of optimized entry points and exit points in the segment maps, where optimized means that the entry points and exit points are selected and represented in a way that is compact, and such that they provide a rich set of good places for a client to enter and exit the representation. The segment map generation can be performed independently for each representation of media content, or in a coordinated way.

Many variants are possible. For example, especially for a live streaming content, a solution that tightly integrates an entry point generator and an exit point generator and a segment map generator is preferable, and might also be preferable for on-demand streaming content.

The methods disclosed in Pakzad can be used to generate succinct segment maps from sets of entry points and exit points that can be used efficiently and effectively by AHS clients, i.e., Pakzad discloses some embodiments of segment map generators, including methods for partitioning segments of a representation into preferable fragments. The methods can be enhanced with the methods and processes described herein, in particular it is preferable if each fragment either starts or ends to enable starting at a major entry point or ending at a major exit point, respectively.

As an example, FIG. 1 shows an closed GOP frame dependency structure, and in this case a first fragment might comprise frames 1, 5, 2, 3 and 4, a second fragment might comprise frames 6, 7 and 8, a third fragment might comprise frames 9, 13, 10, 11 and 12, a fourth fragment might comprise frames 14, 15 and 16, etc. This fragment structure might be preferable because all major entry points are at the beginning of fragments, and because it allows downloading partial GOPs when then client starts or switches to a representation, thus allowing playout of a partial GOPs worth of content before the entire GOP is downloaded. The particular major exit points that are at the end of GOPS are also preferable, since generally B-frames are smaller than I-frames or P-frames, and thus it is advantageous generally to download the smaller frames that allow the same amount of playout time as larger frames. If the GOP structures are aligned between different representations, in this example the fragment structure allows switching between representations with no downloading of any frames that are not played out.

As another example, FIG. 2 shows an open GOP frame dependency structure, and in this case a first fragment might comprise frame 1, the second fragment might comprise frames 5, 2, 3 and 4, a third fragment might comprise frames 9, 6, 7 and 8, a fourth fragment might comprise frames 13, 10, 11 and 12, a fifth fragment might comprise frames 17, 14, 15 and 16, etc. In this case, the first fragment is formed with a different pattern of frames than thereafter. This fragment structure has many of the same advantages as described for the example in the previous paragraph. If the GOP structures are aligned between different representations, this fragment structure allows switching between representations with minimal downloading of four overlapping frames that are not played out, i.e., one I-frame and three B-frames.

Variations of Mapping Based on MPEG DASH Signaling

1. MPEG DASH Specification Signaling of Entry Points and Exit Points

The MPEG DASH specification has roughly the segment map structure to describe fragments within a segment as illustrated in Table 1 below.

TABLE 1

1) ESPT
2) Timescale
3) N
4) For each i = 1, . . . , N
   a) SB(i)
   b) Delta(i)
   c) RAP-present-flag(i)
   d) RAP-delta(i)

The interpretation of the segment map structure above is the following. The value of ESPT is the presentation time of the frame with the earliest presentation time within the segment.

The value of Timescale is the number of ticks per second used to measure time in ticks for this segment of the representation. For example, if Timescale=30,000 then there are 30,000 ticks per second for this segment of the representation and thus a time expressed as 90,000 ticks indicates a time duration of 90,000/30,000 seconds, or 3 seconds. Typically, all units of time are expressed in ticks within the segment, e.g., ESPT, Delta, and RAP-delta. A typical duration of a frame might be 1,001 ticks, which means that there are approximately 29.97 frames per second.

The value of N is the number of fragments in the segment.

The value of SB(i) is the size in bytes of fragment i of the segment. Thus, the byte offset to the beginning of fragment i within the segment is the sum over all j less than i of SB(j).

The value of Delta(i) is the difference between the earliest presentation time of any frame within fragment i+1 and the earliest presentation time of any frame within fragment i. Thus, the earliest presentation time of a frame in the next fragment after fragment i is ESPT plus the sum over all j≤i of Delta(j).

The value of RAP-present-flag(i) indicates whether or not there is a representation access point (RAP) within fragment i.

If there is a RAP signaled in fragment i then the value of RAP-delta(i) is the difference between the RAP presentation time within fragment i and the earliest presentation time of a frame in fragment i. Thus, if there is a RAP within fragment i, the RAP presentation time in fragment i is ESPT plus RAP-delta(i) plus the sum over all j<i of Delta(j).

A basic philosophy behind the MPEG DASH segment structure is that fragments within a segment can be downloaded using HTTP 1.1 byte range requests, and fragments are typically the smallest such entities that are requested for download. It makes sense to align the fragment structure in such a way that supports seamless switching between representations, in particular it is beneficial to align the fragment boundaries with entry and exit points, and to signal entry and exit points within a segment, to support efficient and seamless switching.

The MPEG DASH segment map format can be used as follows to support signaling entry points for a segment. The MPEG DASH specification defines a RAP as comprising a byte offset, IRAP, and a presentation time, TRAP, related as follows (translated into the terminology used herein): (1) TRAP is the earliest presentation time such that the video frames of the content in the representation can be played out seamlessly in presentation order starting at presentation time TRAP if the representation is downloaded starting from the byte offset IRAP and continued forward to the end, and (2) IRAP is the greatest byte offset such that the video frames of the content in the representation can be played out seamlessly in presentation order starting at presentation time TRAP if the representation is downloaded starting from the byte offset IRAP and continued forward to the end.

Thus RAPs defined in the MPEG DASH specification are equivalent to major entry points defined in this disclosure, i.e., (TRAP, IRAP)=(TentryB(IRAP), BentryT(TRAP). A fragment is said to contain a RAP if the byte offset for that RAP is within the fragment.

The MPEG DASH specification can signal RAPs as follows. Suppose fragment i contains at least one RAP, and let BO be the smallest byte offset of a RAP among all RAPs that fragment i contains and let PT=TentryB(BO) be the presentation time of the RAP corresponding to BO. The value of RAP-present-flag(i) can be set to indicate the presence of a RAP, and the value of RAP-delta(i) can be set to PT minus ESPT minus the sum over all j<i of Delta(j). For each fragment i that does not contain a RAP frame, the value of RAP-present-flag(i) can be set to indicate that there is no RAP. Thus, the MPEG DASH specification has support for signaling major entry points within fragments.

Let BO(i) be the byte offset to the first byte of fragment i within the segment. Note that if fragment i contains a RAP, then TentryB(BO(i)) is the RAP presentation time of the RAP with the earliest presentation time in fragment i.

The MPEG DASH segment map format can be used as follows to support signaling exit points for a segment in some cases. For every fragment i, the byte offset BO(i+1) to the first byte of fragment i+1 is the byte offset that corresponds to exiting at the end of fragment i. Under circumstances described below the exit presentation time TexitB(BO(i+1)) associated with exiting at the end of fragment i can be accurately determined as follows based on the MPEG DASH segment map format: Set the value of EPT(i) to ESPT plus the sum over all j≤i of Delta(j). As described previously, EPT(i) is the earliest presentation time of any frame within fragment i+1. EPT(i) is guaranteed to be equal to TexitB(BO(i+1)) if the following two conditions hold.

2. Two Conditions for Correct Signaling of Exit Points

Two conditions for correct signaling of exit points might be that (1) the file format order is a decode order, and (2) the sequence of earliest presentation times of any frame within a fragment is strictly increasing over consecutive fragments, i.e., EPT(1)<EPT(2)<EPT(3), etc.

The first condition may generally be true of file formats, although not necessarily. Furthermore, if the file format is not a decode order than it is typically the case that the signaling described above does not accurately signal the exit presentation time of fragments. FIG. 14, corresponding to the frame dependency structure as shown in FIG. 4 but with the file format order being the presentation time order instead of a decode order, is an example where the first condition is not true. In this example, if the first fragment contained frames 1, 2, 3 and 4 and the second fragment contained frames 5, 6, 7 and 8 then the value of EPT(1) would be to the presentation time of frame 5, which if used as the exit presentation time of the first fragment would indicate that the first four frames 1, 2, 3 and 4 could be played out from receiving the first fragment. However, only frame 1 can be played out from receiving the first fragment, and thus the value of EPT(1) does not accurately signal the exit presentation time for the first fragment.

The second condition may often be true, but it is dependent on the fragment structure of segments, and there are examples where it is not true, even if the first condition is true. For example, referring to FIG. 9, suppose a first fragment comprised the first 13,244 bytes and carried frame 1, and a second fragment comprised the next 5,150 bytes and carried frame 5, and a third fragment comprised the next 3,637 bytes and carried frames 2, 3 and 4. In this example, the exit presentation times EPT(1), EPT(2), and EPT(3) as calculated above for the first three fragments are the presentation time of frames 5, 2, 6, respectively. In particular, the exit presentation time EPT(1) associated with the first fragment would indicate that the first four frames in presentation time order, i.e., frames 1, 2, 3 and 4, could be played out from downloading the first fragment, whereas this is clearly not the case.

Thus, overall, although the MPEG DASH specification has support for signaling entry points in fragments, the support for signaling exit points is not nearly as comprehensive.

3. First Segment Map Method: Improved Exit Point Signaling

As noted previously, it is not always the case that exit points can be signaled correctly with the MPEG DASH specification. In particular, in order for the exit points to be correctly signaled, the two conditions for correct signaling of exit points described previously are normally required. One way the second condition could be removed is using the method described in this section for enhancing MPEG DASH for improved exit point signaling.

In this approach, ESPT is redefined as the earliest presentation time of any frame subsequent to the previous segment in the remainder of the representation. Also, the value of Delta(i) is redefined as the difference between the earliest presentation time of any frame subsequent to fragment i in the remainder of the representation and the earliest presentation time of any frame subsequent to fragment i−1 in the remainder of the representation.

Then, redefine the value of RAP-delta(i) as the difference between the RAP presentation time of the signaled RAP within fragment i and the earliest presentation time of any frame subsequent to fragment i−1 in the remainder of the representation.

If the first condition holds, i.e., the file format order is a decode order, then the above redefinitions of the parameters guarantees that EPT(i) as computed based on these redefined values is the correct exit presentation time for fragment i, even if the second condition does not hold. As an example, referring to FIG. 9, suppose, as in the example described above, a first fragment comprised the first 13,244 bytes and carried frame 1, and a second fragment comprised the next 5,150 bytes and carried frame 5, and a third fragment comprised the next 3,637 bytes and carried frames 2, 3 and 4. In this example, the value of ESPT would be as before, i.e., it would be the presentation time of frame 1. However, the exit presentation times EPT(1), EPT(2), and EPT(3) as calculated based on the redefinitions above associated with the first three fragments are the presentation time of frames 2, 2, 6, respectively. In particular, the exit presentation time EPT(1) associated with the first fragment would indicate that the first frame in presentation time order, i.e., frame 1, could be played out from downloading the first fragment. Furthermore, the exit presentation time EPT(2) associated with the second fragment would indicate that only frame 1 could be played out from downloading the first two fragments, and the exit presentation time EPT(3) associated with the third fragment would indicate that the first five frames 1, 2, 3, 4 and 5 could be played out from downloading the first three fragments.

Another way the second condition could be accommodated is if the fragment structure is formed in such a way that the sequence of earliest presentation times of any frame within a fragment is strictly increasing over consecutive fragments. For example, if each fragment contains a major exit point then the second condition will be satisfied.

In cases where it is possible to determine the fragment structure, it is preferable if each fragment that contains a major entry point is such that there is a major entry point is near the beginning of the fragment. It is also preferable if each fragment that contains a major exit point is such that there is a major exit point is near the end of the fragment.

One way that both conditions could be removed is to modify the definitions of the parameters carried in the current MPEG DASH segment map as follows, and this is a preferable method of MPEG DASH segment map signaling.

4. Second Segment Map Method: Modification of MPEG DASH Segment Map Methods

Let BO be the byte offset to the beginning of the segment of the representation, and let BO(i) be the byte offset to the beginning of fragment i.

Redefine the value of ESPT to be TexitB(BO).

Redefine the value of Delta(i) to be TexitB(BO(i+1))−TexitB(BO(i)).

Redefine the value of RAP-delta(i) to be TentryB(BO(i))−TexitB(BO(i)).

Note that the second modification of the MPEG DASH segment map methods is equivalent in effect to the first modification described above when the first of the two conditions for correct signaling of exit points described above holds, i.e., when the first condition holds then TexitB(BO) is the earliest presentation time of any frame subsequent to the previous segment in the remainder of the representation, TexitB(BO(i+1))−TexitB(BO(i)) is the difference between the earliest presentation time of any frame subsequent to fragment i in the remainder of the representation and the earliest presentation time of any frame subsequent to fragment i−1 in the remainder of the representation, and TentryB(BO(i))−TexitB(BO(i)) is the difference between the RAP presentation time of the signaled RAP within fragment i and the earliest presentation time of any frame subsequent to fragment i−1 in the remainder of the representation. However, the second modification can accurately be used to calculate exit times independently of any conditions, and is more in keeping with the current definition of a RAP within the MPEG DASH specification.

Delta(i) is guaranteed to be non-negative for each fragment i since TexitB(BO(i+1)) is at least TexitB(BO(i)). Furthermore, since the sequence of exit presentation times of major exit points in order of increasing exit byte offset are strictly increasing, Delta(i) is guaranteed to be greater than zero for each fragment i if each fragment contains at least one major exit point, and Delta(i)=0 indicates that fragment i does not contain any major exit points. Furthermore, if fragment i contains at least one major exit point then TexitB(BO(i+1) is the exit presentation time of the last major exit point in fragment i. Also, RAP-delta(i) is guaranteed to be greater than or equal to zero, since TentryB(BO(i)) is at least TexitB(BO(i)).

Since entry points and exit points are equally important in making switches between representations in AHS systems, further enhancing the MPEG DASH specification might be considered.

The definition of a "representation exit point" might be introduced into the MPEG DASH specification, abbreviated to RXP, wherein an RXP is defined to be a major exit point, similar to how RAP is defined to be a major entry point.

A new parameter RXP-present-flag(i) can be introduced for each fragment i, wherein the value of RXP-present-flag(i) indicates whether or not there is a representation exit point (RXP) within fragment i. The value of RXP-present-flag does not have to be signaled explicitly in the MPEG DASH segment map, but instead could be calculated from the other parameters as follows: the value of RXP-present-flag(i) indicates that there is an RXP in fragment i if Delta(i)>0 and indicates that there is no RXP in fragment i if Delta(i)=0.

If there is a RXP within fragment i, the RXP presentation time for fragment i is ESPT plus Delta(i) plus the sum over all j<i of Delta(j).

As in the MPEG DASH specification, the value of RAP-present-flag(i) indicates whether or not there is a representation access point (RAP) within fragment i.

If there is a RAP within fragment i, the RAP presentation time for fragment i is ESPT plus RAP-delta(i) plus the sum over all j<i of Delta(j).

Other enhancements of the MPEG DASH specification are possible as well, including indicating multiple major entry and/or exit points within a fragment, and including information about their byte offsets as well.

Other information that might be included in the segment map is information that might be used to help with decryption if for example CBC-style block encryption provided by AES is used, wherein each block of data is for example 16 bytes, and where the blocks are encrypted in a chain, i.e., to encrypt a next block, the encryption of the previous block is first XORed with the next block to form a new block and then the encryption of the new block is the encrypted value of the next block. Thus, the encrypted value of the previous block is needed to decrypt the next block, i.e., the value of the next block is formed by decrypting the encryption of the next block and XORing this with the encrypted value of the previous block. Thus, it would be potentially beneficial to provide byte offsets to the previous encrypted block that is needed for decrypting the first encrypted block of the fragment, or for decrypting the first encrypted block of a RAP or RXP, in the segment map. Alternatively, it would be potentially beneficial to provide the previous encrypted block in the segment map itself The segment map can be provided as a separate file from the associated segment, with a URL for the segment map derived from that of the URL of the segment file, for example, the segment map URL is the URL of the segment with ".segment_map" appended. This variant has the advantage that clients that are not aware of the existence of segment map files are not affected by their existence, as the segment files are unaltered, whereas clients that are aware and can take advantage of segment index files can download them and use them to improve the representation switching experience.

As another variant, the segment map can be prepended to the segment to enhance the segment, and then the client can download the segment map by downloading a small prefix of the enhanced segment to obtain the segment map for the file. This variant has the advantage that there are fewer files and associated URLs to manage than the first variant, but may be problematic if there are existing clients that are not configured to parse or use the prepended segment map. As another variant, the segment map can be appended to the segment to enhance the segment. As other variants, the segment map for several segments and/or representations may be aggregated into one file. As another variant, the segment map for one segment may be partitioned into multiple files and URLs for these segment maps may be derived automatically from the URL for the segment, for example using template-based URL generation. This variant might be especially useful if the segment comprises many fragments/blocks, e.g., the segment is for a two hour movie, and each fragment is around 500 milliseconds in duration.

There are many variations of the above embodiment. For example, instead of listing at most one entry and exit point per fragment/block, multiple entry and/or exit points can be listed per fragment. In the case when the content is encrypted, the segment map can include encryption byte offsets to indicate where to start downloading encrypted content to decrypt the subsequent portions. For example, in case the content is encrypted using CBC encryption provided by AES, wherein to decrypt a portion of encrypted data a previous portion of the encrypted data in the stream of data is needed, the segment map can provide byte offsets to these previous portions of the encrypted data.

The segment map may also contain other information that is relevant to the client and/or the media player for assisting seamless switching and playing out of the video. For example, it is possible to add information in the segment map indicating whether the representation comprises audio data, or a mixture of video and audio data. Also, it is possible to add indication of whether or not FEC repair segments are available, and if so, the signaling of FEC segment maps that can be used by the client to use the FEC repair segments.

5. Third Segment Map Method: Segment Map Generation and Formats for ALS Streaming For some AHS streaming systems, it is useful to generate and provide segment maps as files separate from the segments themselves. Backwards compatibility provides one set of rationale: segment maps are either not specified or contemplated for some existing or future deployed AHS systems. Enhancing such systems with segment maps in a backwards compatible way can provide a lot of value, i.e., provide improved switching and startup end user experiences and network efficiencies for enhanced AHS clients that can take advantage of the availability of segment maps and not have any negative impact on the performance of unenhanced AHS clients. Other rationales are described in other parts of this disclosure. Although the segment maps disclosed in this section are described as separate files from the segment themselves, these segment maps can also be part of the segment files, e.g., they can be prepended to segments, appended to segments, or interspersed throughout the segments.

A simple format for a segment map to provide information about a particular segment is to include a list of the selected major entry points and selected major exit points for the segment, wherein the selected major entry points can be all of the major entry points, or a selected subset of the major entry points, that start within a segment, and similar for selected major exit points. Thus, one possible format for generating and providing information about a particular segment in a segment map is the following.

Let BO be the byte offset to the beginning of the segment of the representation, and let APT(0)=TentryB(BO), ABO(0)=BO, XPT(0)=TexitB(BO) and XBO(0)=BO. Let AN be the number of selected major entry points, and let XN be the number of selected major exit points. For all i=1, . . . , AN, let (APT(i), ABO(i)) be the i-th selected major entry point in order of increasing byte offset, and similarly for i=1, . . . , XN, let (XPT(i), XBO(i)) be the byte offset to the beginning of selected major exit point in order of increasing byte offset. Then, the format of the portion of the segment map pertaining to this segment can be a data structure such as shown in Table 2 below.

TABLE 2

1) Timescale
2) BO
3) AN
4) APT(0)
5) For each i = 1, . . . , AN
   a) ABO(i) − ABO(i−1)
   b) APT(i) − APT(i−1)
6) XN
7) XPT(0)
8) For each i = 1, . . . , XN
   a) XBO(i) − XBO(i−1)
   b) XPT(i) − XPT(i−1)

The interpretation of the segment map structure of Table 2 is the following. The value of Timescale is as described for the MPEG DASH specification. The byte offset of selected major entry point i within the segment is the sum over all j=0, . . . , i of ABO(j), and the byte offset of selected major exit point i within the segment is the sum over all j=0, . . . , i of XBO(j). Similarly, the presentation time of selected major entry point i within the segment is the sum over all j=0, . . . , i of APT(j), and the presentation time of selected major exit point i within the segment is the sum over all j=0, . . . , i of XPT(j).

An alternative format for indicating the selected major entry points and selected major exit points within a segment in a segment map is the following.

6. Fourth Segment Map Method

Let L be the list of combined selected major entry points and selected major exit points, where the points are listed as (byte offset, presentation time) pairs, where the points are listed in increasing order of their byte offset, and where an entry point and exit point in this list are considered to be duplicates if they have the same (byte offset, presentation time) values. Let N be the number of unique points in the list L. For all i=1, . . . , N, let (PT(i), BO(i)) be the i-th point in the list L. Let BO be the byte offset to the beginning of the segment of the representation, and let PT(0)=TexitB(BO) and BO(0)=BO. Then, the format of the portion of the segment map pertaining to this segment can be as shown in the listing of Table 3.

TABLE 3

1) Representation type indicator = {0, 1, 2}
   0 = audio only
   1 = both audio and video
   2 = video only
2) Timescale = value
3) BO(0)
4) PT(0)
5) N
6) For each i = 1, . . . ,N
   a) BO(i) − BO(i−1)
   b) PT(i) − PT(i−1)
   c) RP(i) = {0, 1, 2}
      0 if (BO(i), PT(i)) is only an entry point
      1 if (BO(i), PT(i)) is only an exit point
      2 if (BO(i), PT(i)) is both an entry point and an exit point The interpretation of the segment map structure of Table 3 is the following. The representation type indicates what type of data is contained in the referenced segment, wherein 0 indicates that the data is audio only, 1 indicates that it is video only, and 2 indicates that it is a mix of both audio and video. Thus, a client can determine the representation type from downloading a segment map. The value of Timescale is as described for the MPEG DASH specification. The byte offset of point i within the segment is the sum over all j=0, . . . , i of BO(j), and the presentation time of point i within the segment is the sum over all j=0, . . . , i of PT(j). Note that for some file format orders and frame dependency structures it is possible that PT(i)−PT(i−1) could be less than zero, whereas for other file format orders and frame dependency structures PT(i)−PT(i−1) is always at least zero. The value of RP(i) indicates whether point i is an entry point, an exit point, or both an entry point and an exit point.

There are many enhancements to the above. For example, segment maps may include information about partial segments, or multiple segments. A segment map may include a URL and a byte range to indicate which segments it contains information about.

Note that the fourth segment map method described above can also be used to determine an MPEG DASH fragment structure. For example, for each i=1, ..., N there might be a fragment defined as starting at byte offset BO(i−1) and ending at byte offset BO(i)−1. In this case, the start and end of each fragment would correspond to either a selected major entry point, a selected major exit point, or both a selected major entry point and a selected major exit point.

In order to align with the segment map signaling methods used by the MPEG DASH, an alternate embodiment can be used if the file format order is a decode order. In this alternative embodiment, the fragment structure is formed in such a way that each fragment contains at least one major exit point, i.e., such that for each i=1, ..., N there is at least one major exit point (PT, BO) with BO(i−1)<BO≤BO(i), then the segment map signaling methods of the "MPEG DASH specification signaling of entry points and exit points" as previously described can be used. As described previously, the value of Delta(i) for this method is the difference between the earliest presentation time of any frame within fragment i+1 and the earliest presentation time of any frame within fragment i. Thus, the earliest presentation time of a frame in the next fragment after fragment i is ESPT plus the sum over all j≤i of Delta(j). In this case, because the "Two Conditions for Correct Signaling of Exit Points" are both satisfied, each fragment contains an exit point, and the earliest presentation time of a frame in the next fragment after fragment i is the exit presentation time associated with the end of fragment i. Thus, the end of each fragment is an exit point with an exit presentation time that can be calculated based on the signaling information in the segment map.

Many other enhancements and alternatives are possible as well. For example, all of the alternatives and enhancements of MPEG DASH described previously also apply to the embodiments described in this section. For example, the selected major entry points may be expanded to possibly include minor entry points, and the selected major exit points may be expanded to possibly include minor exit points.

Methods for Signaling and Reordering Data Using Switch Patches

In some cases, to enable more efficient video encoding, the data dependency structure might be more complicated, and it may not be easy for an AHS client to leave one representation and join a second representation at a SAP. For example, as described previously, the Close GOP structure shown in FIG. 1 facilitate such transitions, but the Open GOP structure shown in FIG. 2 makes such transitions more difficult. One example of the difference between Closed GOP transitions and Open GOP transitions in the case of aligned entry points and exit points is the following.

When transitioning from a first representation at an exit point (PT, BO) to a second representation at an entry point (PT', BO'), for a Closed GOP the presentation times PT and PT' are equal, and it turns out that there is no overlapping content downloaded from the representations and the content from the two representations can be concatenated to represent a valid content for the media player to playback, enabling a seamless transition. As an example of a Closed GOP transition, suppose two representations share the same data dependency structure and file format as shown in FIG. 1, FIG. 5 and FIG. 9. In this case, as shown in FIG. 9, a transition out of the first representation can be made at exit point (8, 27,537), which indicates that the first representation is downloaded up to byte offset 27,537 and the end presentation time is just after playing back frame 8.

Referring to FIG. 5, the corresponding transition into the second representation can be made at entry point (9, 27,537), which indicates that the second representation starts downloading at byte offset 27,537 and the start presentation time will commence with playing back frame 9. In this example, there is no overlapping download of the same frames, i.e., all frames downloaded from the first representation differ from all frames downloaded from the second representation. In this example the byte offset of the exit point for the first representation and the byte offset of the entry point for the second representation are equal since both representations have exactly the same byte offsets for the same entry and exit points, but in general the representations between which there will be transitions will be encoded at different qualities and rates, and thus the byte offsets for the same presentation times will generally not be equal.

When transitioning from a first representation at an exit point (PT, BO) to a second representation at an entry point (PT', BO'), for an Open GOP the presentation times PT and PT' are not necessarily equal, and it turns out that there may be overlapping content downloaded from the representations and the content from the two representations cannot be simply concatenated to represent a valid content for the media player to playback. In these cases, it is useful for the AHS client to signal to the media player which content is overlapping when it provides the media player with the overlapping content to the media player, as this can be useful to the media player to play back the overlapping content in a seamless fashion. In other cases, the media player is equipped with the logic and methods to understand when overlapping content is provided to it and handle playing back the content as seamlessly as possible.

As an example of an Open GOP transition, suppose two representations share the same data dependency structure and file format as shown in FIG. 2, FIG. 6(a) and FIG. 10(a). In this case, as shown in FIG. 10(a), a transition out of the first representation can be made at exit point (9, 31,043), which indicates that the first representation is downloaded up to byte offset 31,043, i.e., the client will download up to and including frame 8 in the file format order shown, and the end presentation time is just after playing back frame 9. Referring to FIG. 6(a), the corresponding transition into the second representation can be made at entry point (9, 22,033), which indicates that the second representation starts downloading at byte offset 22,033, i.e., the client starts download at frame 9 in the file format order shown, and the start presentation time will commence with playing back frame 9.

Note that in this Open GOP example, in contrast to the Closed GOP example above, both representations have different byte offsets for the entry point and exit point of the transition, even though both representations have exactly the same byte offsets for the same entry and exit points overall. In this Open GOP example, there is a set of overlapping frames downloaded in this transition, i.e., frames 9, 6, 7 and 8 are downloaded once each for each representation in this transition. Preferably, only one of these sets of frames are used by the media consumer, such as playout by a media player, so as to provide a seamless transition in time experience to the end user.

Herein this overlapping set of frames is referred to as an "overlap patch". In the example above, each overlap patch is 31,043−22,033=9,010 bytes. In some instances, the number of bytes might differ between overlap patches from one representation to another. However, in this example, they are the same. The client will then download 2*(31,043−22,033)=18,020 bytes—the overlap patches of two representations—and only use one of those overlap patches to play back frames 6, 7, 8, and 9. Thus, there is an overhead of 9,010 bytes, in this example.

In general, since the representations between which there will be transitions will typically be encoded at different qualities and rates, the byte offsets for the same presentation times will generally not be equal, and thus the total number of bytes downloaded for the overlap patches—the sum of the byte sizes of the overlap patch in each of the two representations—is not necessarily double. The size of the frames played back from the overlap patch can depend on how the media player decides to transition the playback from one representation to the other amongst the frames in the overlap patch.

To enhance the efficiency and simplicity of seamless transitions when using Open GOP data dependencies and other more advanced data dependency structures, several methods described herein might be used. The first is a method for signaling the overlap patch structure, for example in the segment map, i.e., signaling pairs of entry and exit points that correspond to a possible overlap patch that can be used to switch from one representation to another, or used to start playing content at the entry point from within a representation, or used to stop playing content at the exit point of a representation.

A possible format for signaling overlap patches within a segment map is shown in Table 4 as a data structure that might be conveyed to a client in a variety of formats.

TABLE 4

1) Timescale = value
2) Number_overlap_patches = OP
3) For each i = 1, ..., OP, the data substructure:
    Overlap_patch_entry_and_exit_point =
        (APT(i), ABO(i)), (XPT(i), XBO(i))

The client then interprets this data structure from a segment map to determine where the overlap patches occur. In that example data structure, the value of Timescale can be as described for the MPEG DASH specification. The value of OP is the number of overlap patches signaled in this segment map. The type field signals that an overlap patch is being signaled. The pair (APT(i), ABO(i)) is the entry point of the i-th overlap patch and the pair (XPT(i), XBO(i)) is the exit point of the i-th overlap patch.

There are many variants of the above signaling method. For example, signaling of overlap patches may be signaled together with signaling of other SAPs, entry points and exit points within a segment map. As another example, the exact details of the signaling might vary.

As another variant, if the value of OP might be fixed and not signaled. For example, it may be that the segment map for a segment is prepended to the segment and there is only one overlap patch per segment, wherein the segment starts with an entry point and ends with an exit point. In this case, the value of OP is one. As another variant, the signaling of an overlap patch might be signaled by another flag within the segment map, wherein if the flag is set to 0, then there is no overlap patch signaled in the segment and wherein if the flag is set to 1, then there is exactly one overlap patch signaled in the segment.

In some of the existing MPEG DASH profiles, there is SAP alignment between different representations of an adaptation set. In variations of standard profiles of MPEG DASH or other AHS technologies, profiles might be permitted wherein overlap patch alignment between different representations of an adaptation set, or in general between a group of representatives for the same content at different bit-rates and qualities, can either be signaled or always true for the given profile. Overlap patch alignment between different representations means that for a substantial portion or all overlap patches, if a particular representation has a signaled overlap patch with an entry point (APT, ABO) and a corresponding exit point (XPT, XBO) then the other representations within the adaptation set or group will also have a signaled overlap patch with an entry point of the form (APT, ABO'), and exit point of the form (XPT, XBO'), i.e., the start and end presentation times of the entry and exit points match. Note that the byte offsets do not need to match and often will not.

Having aligned signaled overlap patches between representations can be very beneficial for an AHS client. For example, this allows the AHS client to determine the strategy for switching from a current first representation to another second representation, i.e., the start presentation time to start downloading for the second representation and the end presentation time for the first representation, from the segment map information for the first representation. This can be a benefit as then the AHS client can avoid downloading or accessing the segment map information for the second representation to determine at what presentation time to make the switch. Another benefit is that the AHS client can then signal to the media player the start and end presentation time of the overlap patch even before downloading any information from the second representation, thus providing hints to the media player in advance about the overlapping content.

In embodiments, the source of media content can be configured to arrange data in segments with overlap patches and the client can be configured to process data with an assumption of the existence of overlap patches, whether or not present. In some embodiments, such a source might be used with clients that are agnostic or ignorant of overlap patches.

One possible method for aligned overlap patches between representations in the same adaptation set or group is to have aligned segments between different representations and have segments that are overlap patches within representations, i.e., segments that start with the byte offset of an entry point of an overlap patch and end with the byte offset of an exit point of an overlap patch, i.e., if (PT, BO) is the entry point of the overlap patch and (PT', BO') is the exit point of the overlap patch, then the segment starts at byte offset BO within the representation and ends at byte offset BO' within the representation.

Segments that coincide with overlap patches might also be signaled as being segments comprising overlap patches. In this case, when the AHS client wants to transition from a first representation to a second representation, the AHS client method can be to find a segment that is an overlap patch, say with entry point (APT, ABO) and exit point (XPT, XBO), in the first representation and download that segment that comprises XBO−ABO bytes of content, download the segment that is the corresponding overlap patch in the second representation, i.e., the segment in the second representation with XBO'−ABO' bytes of content from the second representation corresponding to entry point (APT, ABO') and exit point (XPT, XBO'), and signal to the media player to make the transition from the first representation to the second representation within the presentation time interval APT to XPT.

Another variant is to restrict overlap patches to be wholly contained within a segment, and to signal the positions of overlap patches within segment. This variant might be preferable for example if segment durations are generally much larger than durations of overlap patches, for example for on-demand content where there might be only one segment per representation, or for live content where the segment duration might be a couple of seconds whereas overlap patch durations might be in the tens or hundreds of milliseconds. In this case, when an AHS client transitions from a first representation to a second representation, the AHS client can download the segment in the first representation ending at the end of the overlap patch in the first representation, and download the segment in the second representation starting at the start of the overlap patch in the second representation, thereby avoiding downloading other portions of these segments that are not to be played back.

As explained above, some redundant and/or unused content might be requested and transmitted based on overlap patches. Thus, when switching from a first representation to a second representation, two different versions of the content are downloaded in the overlap patch, and since the media player only plays back one of the two versions of each portion of content in the overlap patch, redundant content is downloaded. Therefore, there are good reasons to configure devices such that overlap patch sizes are minimized.

Small overlap patch sizes also have benefit where a client is starting to playback content from a representation that starts at an entry point of an overlap patch, or ending the playback of content from a representation that ends at an exit point of an overlap patch, as in either case it is possible that content is downloaded that is never played back.

For example, referring again to FIG. 2, FIG. 6(a) and FIG. 10(a), consider the overlap patch comprising the frames 9, 6, 7 and 8 in the file format order shown. When switching representations at this overlap patch, the frames 9, 6, 7 and 8 are downloaded twice, once for the first representation and once for the second representation. When using the entry point of this overlap patch to start a playback, i.e., start downloading at the beginning of frame 9 to start playback at frame 9, the frames 6, 7 and 8 are downloaded but cannot be played back, since frames 6, 7 and 8 also depend on frame 5 that is not downloaded.

To minimize the size and duration of the overlap patch, it is useful to consider other file format orders that are not necessarily decode order. Consider the following method: a server forms the segments using the file format order as the presentation order instead of a decode order. The signaling in the segment maps associated with the segments can signal how to reorder the content within a segment into a decode order. The AHS client can download segments or portions of segments, reorder the received content into decode order, and provide the content to the media player in decode order. This does require the AHS client to potentially reorder portions of the content before providing it to the media player, although in some cases the media player may not need to receive the content in decode order. Also, the AHS client may have to buffer slightly more content before providing content to the media player in order to provide the content to the media player in decode order. However, there are many advantages to this method.

In this example, the indication that the file format order is the presentation order can be signaled for example in the MPD. For representations signaled that the file format order is the presentation order, major entry and exit points and the decode order can be signaled using the following format for each frame signaled:

start_BO SBO end_BO EBO decode_BO DBO [entry] [exit].

In the above, SBO is the start byte offset of the frame in the file format order, and is signaled as being the start byte offset by the keyword "start_BO". Similarly, EBO is the end byte offset of the frame and is signaled as such by the keyword "end_BO". DBO, signaled by the keyword "decode_BO", is the byte offset that this frame should be inserted at in the file format order in order to put the frames into decode order. The optional keyword "entry" is included if the beginning of the frame is an entry point, and similarly the optional keyword "exit" is included if the end of the frame is an exit point.

As an example, consider the frame dependency structure shown in FIG. 2, but suppose instead the file format order is the presentation order instead of a decode order, i.e., the file format order is as shown in FIG. 6(b) and FIG. 10(b). Then the signaling described above for this example can be:

```
start_BO 0 end_BO 13,244 decode_BO 0 entry exit
start_BO 16,583 end_BO 22,033 decode_BO 13,244 exit
start_BO 25,013 end_BO 31,043 decode_BO 22,003 entry exit
start_BO 34,980 end_BO 41,993 decode_BO 31,043 exit
start_BO 44,840 end_BO 49,204 decode_BO 41,993 entry exit
```

The first entry above corresponds to frame 1, and signals that frame 1 starts at byte offset 0 and ends at byte offset 13,244, in decode order this frame should be where it is at as indicated by decode_BO=start_BO=0, and the beginning of frame 1 is an entry point and the end of frame 1 is an exit point. The second entry above corresponds to frame 5, and signals that frame 5 starts at byte offset 16,583 and ends at byte offset 22,033, and in decode order should be inserted at byte offset 13,244, i.e., just before frame 2, and the end of frame 5 is an exit point. The third entry above corresponds to frame 9, and signals that frame 9 starts at byte offset 25,013 and ends at byte offset 31,043, and in decode order should be inserted at byte offset 22,003, i.e., just before frame 6, and the beginning of frame 9 is an entry point and the end of frame 9 is an exit point. The next two entries signal similar information for frames 13 and 17.

Note in the above example that each overlap patch is only one frame, i.e., frames 1, 9 and 17 each are an overlap patch. For example, a transition out of a first representation can be made at the exit point at the end of frame 9, and thus the first representation is downloaded up to byte offset 31,043, i.e., the client downloads up to the end of frame 9 in the presentation order file format. The corresponding transition into the second representation can be made at the beginning of frame 9, and thus the second representation starts downloading at byte offset 25,013 i.e., the client downloads starting at the beginning of frame 9. Note that the overlap patch is frame 9, which is the only frame that is downloaded for both representations, i.e., 2*6,030=12,060 bytes are downloaded from the overlap patch comprising frame 9 for the two representations.

Note that in the previous example above for this same frame dependency structure but with the decode order as the file format, the overlap patch comprising frames 6, 7, 8 and 9 and a total of 18,020 bytes are downloaded from the overlap patch for the two representations. Thus, the presentation order as the file format order has a smaller overlap patch in this example, which is beneficial to an AHS client as it has to download less content to effect a transition from one representation to another. Thus, less network capacity may be used for the transition, and also there is less chance that the AHS client will be forced to stall or rebuffer due to the smaller amount of data that is downloaded to enable the transition.

Furthermore, the above method provides enough information to the AHS client to reorder the frames into the decode order before providing them to the media player, and the AHS client can also supply the media player with an indication of the overlap patch. Furthermore, with this file format ordering, an AHS client that wants to start playing back content from a representation starting at for example frame 9 does not download any frames that are not played back, as opposed to the previous example with the same frame dependency structure but with the decode order as the file format order where frames 6, 7 and 8 are also downloaded but not played back.

There are many variants of the above. For example, the keywords are not included in the description of the entry and exit point byte offsets and the decode byte offset, and instead the meaning of each field is determined by its order or some other indicator. As another example, the partition of a representation into fragments or segments could be defined by the sequence of major entry points and exit points, i.e., a new segment is started at each entry point, and a segment is ended at each exit point. In the example above, there could be a fragment or segment comprising frame 1 with an indication that it has both an entry and exit point, a fragment or segment comprising frames 2, 3, 4 and 5 with an indication that it has an exit point, a fragment or segment comprising frames 6, 7 and 8 with an indication that it contains neither an entry or exit point, a fragment or segment comprising frame 9 with an indication that it has both an entry and exit point, a fragment or segment comprising frames 10, 11, 12 and 13 with an indication that it has an exit point, a fragment or segment comprising frames 14, 15 and 16 with an indication that it contains neither an entry or exit point, and a fragment or segment comprising frame 17. In this example, the exit points are at the end of the segment and the entry points are at the beginning of the segments. Furthermore, each exit frame should be moved to just after the previous exit frame to obtain the decode order. Thus, an AHS client, signaled with the above information together with the start byte offset of each exit point frame, can automatically reorder the frames into decode order and provide them to the media player in decode order.

There are many variants of the above methods. For example, for some portions of the content the file format order can be a decode order, and for other portions of the content the file format can be presentation order. As an example, referring again to FIG. 2, the file format order can be 1, 5, 2, 3, 4, 6, 7, 8, 9, 13, 10, 11, 12, 13, 14, 15, 16, 17. The pattern for this order is that the order is decode order up till the last sequence of B-frames that depend on the I-frame that starts the next open GOP, and then instead of the open GOP I-frame preceding this last sequence of B-frames, the B-frames precede the open GOP I-frame in the file format order. In this variant, the open GOP I-frames can be signaled as the overlap patch, also signaling the byte offset of the beginning and end of the open GOP I-frame, together with the byte offset where the open GOP I-frame should be placed in the file format order to obtain the decode order. With this variant, the other exit points, which may or may not also be signaled, are in decode order in the file format order.

Methods for Structuring and Deriving Urls for Segment Maps

Clients may need to obtain segment maps somehow. Some preferable properties of methods for obtaining or accessing segment maps do not require changes to existing deployments of AHS clients and/or content encoded into AHS formats. For example, it is desirable that the methods to provide access to segment maps are provided in a backwards compatible way such that AHS clients not using segment maps, and/or AHS clients that are completely unaware of the existence of the availability of segment maps for the media content that they are downloading and playing out, are not affected when segment maps are provided. Furthermore, it is desirable that the methods for encoding, formatting, and providing media AHS media content that do not provide segment maps do not have to be changed when segment maps are made available for that AHS media content.

For AHS streaming systems, such as ALS, each segment containing media data is made available as a file with an associated URL. The URL of a segment can be used to access and download the segment or a portion of the segment, for example using HTTP 1.1.

Each segment map associated with a segment can also be made available as a file with an associated URL, wherein the segment map URL can be generated automatically from the URL of its associated segment. For example, the URL for the segment map can be the URL of the associated segment with ".segment_map" appended.

The span of a segment map is defined as the portions of a segment or segments about which the segment map provides information. In the embodiment described above, the span of a segment map is the entire segment with which it is associated. In other embodiments, other relationships between the span of segment maps and segments are possible.

For example, a segment map might be made available for a set of segments, e.g., the span of a segment map might be multiple consecutive segments, in which case the URL for the segment map might be derived from the URL of the first of the consecutive segments by for example appending ".segment_map" to that URL.

As another alternative, segment maps might span portions of a segment, in which case the URLs for the segment maps might be derived by appending ".segment_map.X" to the URL of the associated segment, where "X" might be the sequence number of the segment maps whose spans are portions of the segment, e.g., if there are 10 segment maps whose spans are portions of a segment then the URLs for these segment maps might be derived from the URL of the segment by appending ".segment_map.0", ".segment_map.1", . . . , ".segment_map.9", respectively.

A refinement of the previous alternative is to provide segment maps that span different time intervals of a segment. For example, there might be multiple segment maps, wherein each segment map spans one minute of presentation time of a segment that contains one hour of media data. In this case, the URL for a segment switch might be derived from the URL for the segment by appending ".segment_map.T", where "T" is an integer value between 0 and 59, which indicates roughly the starting minute within the segment of the one minute interval spanned by the segment map. For example, if the segment URL is "the_movie_of_the_year", then a segment map that spans a one minute interval of the segment starting 6 minutes into the segment could have the URL "the_movie_of_the_year.segment_map.6".

In this and other alternatives, the segment maps might span overlapping portions of a segment or segments. For example, each segment map might span one minute of the segments such that there is a segment map with a span start point each 30 seconds into the segment, and thus in this example the span of each segment map overlaps the span of two other segment maps by 30 seconds.

As a second example, there might be segment maps that span different durations of segments, e.g., some that span 1 minute intervals, others that span 2 minute intervals, and others that span 4 minute intervals. The detail of the information comprising a segment map might vary depending on its span. For example, segment maps that span longer intervals or durations may contain entry and exit points that are farther apart than segment maps that span shorter intervals or durations.

In these alternatives, the segment map can also contain information about to which segments or portions of segments they pertain.

AHS clients that are not aware of the existence of segment maps, or that are not enhanced to take advantage of the availability of segment maps, are not affected by the availability of segment maps as described above.

Enhanced AHS clients can take advantage of the availability of segment maps with no additional changes to the AHS delivery system other than those described above in terms of generating and making available segment maps. An enhanced AHS client can use the URL of a segment to automatically generate the URL for the segment map, e.g., by appending ".segment_map" to the URL of the segment, and then make an HTTP 1.1 request for the URL of the segment map to download and access the segment map.

Alternative methods for URL generation to those described above can be used for other files related to segments of representations. For example, Luby A5 teaches methods for generating and providing FEC repair data from segments, and suggests to append "fec_repair" to URL of segment from which FEC repair data is generated.

Methods for Structuring Segment Map Files Independently of Segment Files

Herein we describe a different approach to providing segment map files, using a two level structure. At a first level, segment map files are organized so that each segment map file contains mapping information approximately covering a designated interval of presentation time, herein called the presentation time span of the segment map file, wherein the designated presentation time span is embedded into the URL associated with each segment map file, either implicitly or explicitly, wherein the available designated sequence of presentation time spans associated with segment map files follows a regular pattern that can be deduced either implicitly or by following a simple rule to generate presentation time spans. For example, for an ALS system, the presentation time spans and start presentation time offsets might be deduced from the ALS signaled durations of segments for the representations. For example, ALS signals for a representation that the durations of the segments is T seconds, then the pattern of start presentation time offsets for the segment maps might be 0, T, 2*T, 3*T, 4*T, 5*T, etc., and the corresponding time span durations covered by each segment map might be 2*T seconds.

For using these methods in an MPEG DASH system, the MPEG DASH specification might be augmented so that the Media Presentation Description, also known as the "MPD", signals via a URL template construction rule the URLs for segment maps, wherein the URL segment map construction rule specifies the URL pattern for segment maps that includes start presentation time offset pattern and the time span durations for segment maps. The URL template construction rule used to describe the URL pattern for segment maps in such an augmented MPD could be similar to the MPD URL template construction rule for specifying the pattern of segment URLs in the MPEG DASH specification. In this case, the segment maps might be separate files that are not part of the segment files, and instead of signaling the URLs for segments in the MPD either explicitly or implicitly using a URL construction rule for segments, the URLs for segments can be carried in the segment maps, as described in more detail below.

At a second level, each segment map file contain detailed mapping information about the segment, or portions of segments, or multiple segments, within the presentation time span that is embedded into the URL associated with the segment map file. In this way, the structure of the segment map files can be made to be independent of that of the structure of the associated segment files about which they contain mapping information.

A client, including an AHS client, can use such a two level structure as follows. Given a presentation time PT, the client can determine the URL of a segment map file such that PT is within the presentation time span of the segment map file, use this URL to access the segment map file, and then use the detailed mapping information within the segment map file to determine which segments contain media data with a presentation time shortly before and after PT and the related mapping information such as entry points and exit points shortly before and after PT. A client may use this information to decide which segments to access from local storage and/or download over a network in response to requests to play out content starting at a particular presentation time, or to seek within content to a particular presentation time, or to switch from one representation of content to another, or for a variety of other uses.

A possible segment map URL format is "content_ID.representation_ID.SPT_X.Dur_Y.segment_map", wherein "content_ID" identifies the content, "representation_ID" identifies the representation of the content, "SPT_X" identifies that the starting presentation time of the span is X, and "Dur_Y" identifies that the ending presentation time of the span is X+Y. Note that it is not required that the actual presentation time span of the mapping information contained within the segment file map is exactly the specified presentation time span, for example it might be the case the mapping information in the segment map file covers presentation times from X-d through X+Y+e, where d and e are small positive increments of presentation time. Alternatively, d or e could be negative increments instead of positive increments.

Collections of related segment map files may be made available as a single entity, e.g., segment map files with the same content_ID and representation_ID may be collected together and provided as a single file, for example with a URL of the form "content_ID.representation_ID.segment_map.zip" if all segment map files associated with the same content_ID and representation_ID are included in the single file, or as another example with a URL of the form "content_ID.representation_ID.SPT_X.Dur_Y.segment_map.zip" if all segment map files with presentation time spans in the interval X through X+Y are included in the single file. Standard processes such as the well-known "file zipping" process can be used to bundle segment map files into single files.

Another possible segment map URL format is "content_ID.representation_ID.SPT_X.segment_map", i.e., the start presentation time is included in the URL but not the duration, and in this case the duration could be the same for each segment map or it could vary between different segment maps.

Other alternative segment map URL formats include having the end presentation time signaled within the URL in addition to or in place of the start presentation time or the duration.

Segment map files may span portions of segments and multiple segments, and the presentation time spans of segment map files can be independent of the presentation time spans of the segments about which they provide mapping information. Thus, segment map files can contain the URLs, either explicit or implicit, of the segments or portions of segments about which they contain mapping information. More generally, segment map files may contain a URL and a specified byte range to reference a portion of a segment. For example, suppose there is a segment map file with a presentation time span from presentation time 10 seconds through 30 seconds, and there is a first segment with URL A_ID that contains media data that spans presentation times 5 through 15 seconds, wherein the media data that starts at 10 seconds has a byte offset of A_ID.BO into the first segment, and there is a second segment with URL B_ID that contains media data that spans presentation times 15 seconds through 20 seconds, and a third segment with URL C_ID that contains medial data that spans presentation times 20 through 40 seconds, wherein the media data that ends at 30 seconds has a byte offset of C_ID.BO into the third segment. Then, the segment map file can contain the URL A_ID together with the start byte offset A_ID.BO and the associated mapping information for the first segment, the URL B_ID and the associated mapping information for the second segment, and the URL C_ID together with the end byte offset C_ID.BO and the associated mapping information for the third segment. The segment map file may contain other information as well, e.g., the sizes of each of the segments and the total presentation time span of each of the segments. Other information may be contained in the segment map file as well, such as the indication of the insertion of an advertisement at a certain presentation time, indications of what type and format of media is carried in each of the segments that the segment map file references, etc.

For example, a possible method for a segment map to indicate which segment files it contains information about is the following.

Segment Map Referencing of Segments Method

Let M be the number of segment files (partial or full) referenced by the segment map. For i=1, ..., M, let URL(i) be the URL of i-th segment file referenced in the segment map, listed in order of presentation times, and let BS(i) and BE(i) be the start byte offset and end byte offset, respectively, of the byte range about which the segment map contains information for the i-th segment file. Then, the segment map format for referencing these segments might be as in Table 5.

TABLE 5

1) M
2) For I = 1, ..., M
   a) URL(i)
   b) [BS(i), ..., BE(i)]

The above defines a "virtual segment" that is the concatenation of the byte ranges BS(i) through BE(i) for the segments with URL(i), for i=1, ..., M. The detailed list of points in the segment map about this "virtual segment" can for example be in the format described in the Fourth Segment Map Method, wherein the byte offsets for the listed points are calculated with respect to this virtual segment. Thus, for example, it is possible that portions of the virtual segment data between two consecutive points in the segment map are partially in one segment and partially in another segment. One or both of BS(i) and BE(i) may be omitted from the range for all or some of the values of i, for example using −1 as an indicator of a missing value. For example, [−1, BE(i)] indicates the segment referenced by URL(i) from the beginning of the segment up to byte offset BE(i), and [BS(i), −1] indicates the segment referenced by URL(i) from the byte offset BS(i) through the end of the segment, and [−1,−1] indicates the entire segment referenced by URL(i).

Segment map files may be made available for fixed and predictable presentation time spans. For example, there might be a presentation time span rule that indicates there is a segment map file for each possible start presentation time span that is equal to zero modulo 10 seconds, i.e., the start presentation times of segment map files are 0 seconds, 10 seconds, 20 seconds, 30 seconds, 40 seconds, 50 seconds, and so on until the end of the content (if there is an end), and the presentation time span duration of each segment map file is 20 seconds. In this case, for a content that can be identified as mouse__16543, for a representation for that content that can be identified as rep__38934, the segment map URL sequence might be mouse__16543.rep__38934.SPT__0.DUR20.seg_map, mouse__16543.rep__38934.SPT__10.DUR__20.seg_map, mouse__16543.rep__38934.SPT__30.DUR__20.seg_map, mouse__16543.rep__38934.SPT__40.DUR__20.seg_map, mouse__16543.rep__38934.SPT__50.DUR__20.seg_map, etc. In this example, given the rule for the presentation time spans, the URLs of segment map files can be determined from the content identifier mouse__16543 and the representation identifier rep__38934 and seg_map identifies the file as a segment map.

As another alternative, a segment map file may contain mapping information for more than one representation. For example, the segment map file may contain mapping information about all representations of content. In this case, an alternative possible segment map URL format is "content_ID.SPT_X.Dur_Y.seg_map", wherein "content_ID" identifies the content, "SPT_X" identifies that the starting presentation time of the span is X, "Dur_Y" identifies that the ending presentation time of the span is X+Y and "seg_map" identifies this as a segment map. Note that it is not required that the actual presentation time span of the mapping information contained within the segment file map is exactly the specified presentation time span, for example it might be the case the mapping information for each representation in the segment map file covers presentation times from X-d through X+Y+e, where d and e are small positive increments of presentation time. In this case, the segment map file may reference segments, portions of segments, or multiple segments for multiple representations of the content.

In the above embodiments, the segment map file URL can be derived from some base URL for the content and the representation, and the map information within a segment map file may cover a certain fixed (roughly, round-off is allowed) duration of presentation time, e.g., presentation time span expressed in start seconds and end seconds of presentation time, or start seconds and duration seconds of presentation time, or start "ticks" and duration "ticks of presentation time. Units of "ticks" are sometimes used to express presentation times, wherein "ticks per second" is a unit of time associated with a representation. The "tick unit" for each representation is an example of other information that may be included in segment map files. For example, 30,000 ticks per second indicates that each tick is a 1/30,000 portion of a second. Note that in each case above, the presentation time span is indicated using a cumulative measure of time since the beginning of the presentation, or to some other fixed reference time.

Methods Using Segment Timeline Files

The methods described in this section build upon the previous methods, but provide an overall structure that alters the MPEG DASH specifications less and may provide overall preferred solutions.

A new type of file can be introduced, hereafter referred to as a "segment timeline" file, that has some of the features of the segment maps described above. The URL of a segment timeline file can be generated using URL construction rules based on presentation time durations, similar to that described above for segment maps, e.g., a possible format is "content_ID.representation_ID.Dur_X.EPT_Y.segment_timeline", wherein "content_ID" and "representation_ID" identify the content and representation of the content, respectively, and "X" is the approximate duration of presentation time span covered by the segment timeline, and "Y" is the approximate end presentation time of the presentation time span, and "segment_timeline" identifies the file as a segment timeline file. The existence of segment timeline files, and the URL construction rules for segment timeline files can be signaled within the MPD, e.g., the construction rule might specify that there is a file for all values of Y that are multiples of 10 seconds up to the content duration, and that X=30, wherein the values of X and Y are in units of seconds.

The MPEG DASH formats of segments and segment maps for segments can be used for segments in the ISO file format, i.e., the segment map (Sidx) is prepended to the segment and covers the presentation time duration of the data carried in that segment. For the MPEG2 TS file format, the segment map (Sidx) is in a separate file from the segment in the format described in the MPEG DASH specification, wherein there is one segment map per segment with a URL that is derived from the segment URL. It would be recommended that the URLs for the segments and the segment maps (if they are in different files) be signaled using the existing URL construction rules in the MPEG DASH specification, wherein the consecutive segments (or segment maps, if carried as separate files) are recommended to have URLs that are indexed sequentially, i.e., the URLs for segments could follow a pattern similar to "content_ID.representation_ID.Index_X.segment", wherein the sequence of values for X are for example 0, 1, 2, 3, 4, etc., i.e., consecutive integers, for segments that are sequential in presentation time. Thus, the URLs for segments indicate their sequence of segments in presentation time, but the durations of different segments in the sequence can vary within a representation, and may also be of different durations and vary between representations. Thus, although the indices assigned to segment map URLs can be sequential with respect to their presentation time span ordering, the indices assigned to segment map URLs do not depend on their presentation time span durations. As an alternative, the URLs may be signaled as in existing ALS for an ALS system, and then the URLs for corresponding segment maps may be derived by a simple rule from the URL of the segment that they are associated with, e.g., the URL for a segment map might be the URL for the associated segment with ".seg_map" appended.

The set of segments relevant to a segment timeline file is defined to be the set of segments that cover a presentation time span that intersects with the presentation span covered by the segment timeline file. For example, if the URL for the segment timeline file is "content_ID.representation_ID.Dur_15.EPT_60.segment_timeline" then it covers a presentation time span duration of 15 seconds that starts at presentation time 45 and ends at presentation time 60, and thus all segments that have a start presentation time or end presentation time in the 45 through 60 second interval are said to be relevant to the segment timeline file. A similar definition of segment maps relevant to a segment timeline file can be made, and this definition can be extended to include portions of segments or segment maps that are defined by a presentation time sub-range and a byte sub-range.

A segment timeline file can contain the list of URLs and start presentation times of the segments (and segment maps, if carried as separate files) that are relevant to the segment timeline file. Alternatively, the segment timeline file may contain information from which the segment URLs can be constructed, e.g., a range of indices for the segments, where for example the indices are from those defined implicitly by the URL segment construction rule for segments in the MPD.

The MPD may also specify a maximum segment presentation time span TSmax, and may also specify a Timescale, wherein the Timescale may be used to express presentation times in the URLs of segment timelines. The maximum segment presentation time span TSmax can be defined such that the difference between the start presentation time of any segment and the start presentation time of the segment previous to that segment is at most TSmax. For example, if TSmax=2 seconds, then the difference between the start presentation time of a segment i and the start presentation time of segment i–1 immediately previous in order of presentation time to segment i is at most 2 seconds.

As alternatives, the segment timeline files may also contain segment maps, or presentation end times of segments, or other relevant information.

The segment timeline files indications may also be used with an ALS system, where the presentation time spans from which their URLs are derived are for example at fixed end presentation times with fixed durations, e.g., an end presentation time each 10 seconds and all have duration of 20 seconds, or the end presentation time and duration may be derived from the durations of segments advertised by the ALS metadata using a fixed rule, e.g., if the advertised duration of segments is T seconds, then the segment timeline files might end each T seconds and each has a duration of 2*T.

Client Methods for Using Segment Map Files and Segment Timeline Files

One benefit of segment map files is that, without them, clients cannot effectively determine segment map structure, e.g., valid entry points and exit points, of segments, because such information is not directly provided in the segments themselves. Although such segment map information possibly can be derived from the segments, typically the segments need to be downloaded by the client to derive this information, which may not be effective since the media data itself needs to be downloaded to determine its structure, and one of the primary purposes of determining the segment map information is to determine which portions of the segments to download. Furthermore, the client architecture of where segment map information can be derived is typically isolated from the representation selection methods portion of the client, i.e., where the segment map information could be derived by a client is deep in the media processing portion of the client close to where the media is played out, whereas the client representation selecting portions of a client are near where the media enters the client over the network, and typically there are not good interfaces between the two portions of the client. Also, the segments may be encrypted, furthermore exacerbating the problems, as then the segments need to be decrypted before the map information could be derived, and this is typically down in an isolated portion of the client that does not communicate with the representation selection logic.

Furthermore, the duration of presentation time that a segment file contains media data may not be accurately signaled, e.g., in ALS if each segment is signaled as 10 seconds duration, it actually might be anywhere between 9.5 seconds and 10.5 seconds because of rounding to the nearest second. Since for the ALS/HLS standard, only the segment durations are signaled, and cumulative presentation times are not signaled, the client might make an estimate of the segment start presentation time for the 200-th consecutive segment that has an error of up to 100 seconds, i.e., up to 200*0.5 seconds of cumulative estimation error over the 200 segments. Furthermore, content encoding and segmentation into segment files is sometimes performed independently for each ALS representation with different durations for each representation. Since the durations of segments of different representations can be different in ALS, this is especially a problem when trying to switch from one representation to another after having stayed at one representation for a long duration of time, as it is difficult to determine a segment with the correct presentation time in the switch-to representation, and determining the correct segment might entail downloading several trial segments and having to deeply examine them to determine their presentation time. As one skilled in the art will recognize, these issues can cause huge inefficiencies in terms of downloading data this is not played out, in terms of causing user experience problems such as stuttering or rebuffering or stalling due to the playable media in the media buffer completely draining while downloading segments to determine which one contains the next portion of media that should be played out, and in terms of not providing seamless switches from one representation to another due to not having information about entry points and exit points, etc. At least some of these issues, and related issues, can occur even for clients that do not try to switch between representations.

With the embodiments described above, a client can access segment maps using implicit URL construction and access rules, e.g., client generates "content_ID" and "representation_ID" from the metadata obtained for the content, and then has access to the presentation span rules about what are the possible start presentation time intervals for segment maps, e.g., they follow the pattern 0, 10, 20, 30, 40, . . . , and the possible durations intervals for segment maps, e.g., they are always 20. From this, the client can form the URL for a segment map and request it, and thereby obtain the mapping information that can be used to determine which segments to download and which portions of segments to download when implementing the switch methods and fast startup methods and related methods disclosed herein. If segment map file presentation time spans are similar, then a client can request the same presentation time span of segment map files for different representations to decide how to switch from one representation to another representation during a certain time span duration. However, even if the presentation time spans of segment map files are different for different representations, essentially the same advantages are provided. Alternatively, if the segment map files contain information about more than one representation, then the client can access the same presentation time span mapping and related information for all of the representations from the same segment map file. Also, segment map presentation time spans might be overlapping, e.g., the example above, so that a client never hits a boundary condition, e.g., if a client has determined that a switch should occur at around 20 seconds in presentation time, and if the segment map file time spans were 0-10 seconds, and the next 10-20 seconds, and the next 20-30 seconds, etc., then the client might have to download the segment map files that span 10-20 seconds and also the segment map files that span 20-30 seconds. On the other hand, if there were also segment map files that start each 10 seconds but span each 20 seconds, then the client could download the segment map file that for example spans 10-30 seconds and ensure that this contains mapping information both before and after the target presentation time of 20 seconds, at the potential expense of having in this example twice as many segment map files for overlapping time spans as for having non-overlapping time spans. In general, since the mapping information is generally small compared to the media content data itself, it is often preferable to have overlapping presentation time spans. Furthermore, the overlap can be much smaller, e.g., consecutive segment map files cover a duration that start at 10 second intervals and the span of each is 11 seconds, in which case the overlap between consecutive segment maps is one second.

These embodiments can be used to enhance existing ALS content generation in such a way that existing ALS clients can operate unmodified without adverse effects. Additional processes, embodied as describe above, can be added to the ALS system to generate segment map files with associated URLs as described above, and make these segment map files available in a content delivery network, for example accessing based on their URL using HTTP 1.1. Enhanced clients with the methods and processes described herein can form the appropriate URLs for segment map files of representations, request the appropriate segment map files, and use these segment map files to guide their startup and switch selection methods to provide a better user experience. These enhanced client methods can use the mapping information in simple ways, e.g., the clients may still download entire segment files based on HTTP without byte range requests, but at least be able to accurately determine from the segment map files the correct segments to download with the correct presentation times for switching with appropriate entry and exit points for switching. If HTTP byte range requests are supported, more advanced clients can more efficiently use the mapping information contained in segment map files to enable representation switching and fast startup, for example, by selecting exactly which portions of the ALS segments to download when switching between representations or when starting at a specified presentation time within content.

An enhanced AHS client can try to download segment map files without any explicit signaling that such segment maps are available for a given content. For content for which segment maps are not available, the client download request will fail, e.g., an HTTP response will return with for example "HTTP error 404—file not found" response, in which case the enhanced AHS client can deduce that segment maps are not available for this content and fall back to unenhanced ALS client behavior.

An enhancement of the systems and methods described herein is to indicate explicitly for each content, for example in the MPEG DASH MPD metadata file, whether or not segment maps are available for each particular content. In this case, enhanced AHS clients can use this to determine if segment maps are available or not, and thus for example avoid the extra overhead of making HTTP requests for segment maps when they are not available and receiving back the "file not found" response. In this case, the enhanced AHS client can immediately use unenhanced ALS client methods and logic if segment maps are not available. Furthermore, if segment maps are indicated as available, but for whatever reason not all of them are available (for example, due to some failures in parts of the overall content delivery network), then the enhanced AHS client methods can be more robust in terms of knowing what to do if a "file not found" response comes back for some requests, i.e., other segment maps for other representations and durations may be still available and the enhanced AHS client can still continue to request segment maps that may be available, even if some segment maps are not available.

Another possible enhancement is to generate the segment structure so as to better align with the underlying frame dependency structure and file format ordering, i.e., start segments at well selected entry points and end segments at well selected exit points, etc. For example, the segments might be constructed so that they span from one major entry point to the next consecutive major entry point. The segment map files can still have a regular pattern of time spans that are independent of the time spans of the segment files. This provides a simple algorithm for enhanced AHS clients to download segments that may avoid largely or all together the usage of HTTP 1.1 byte range requests but still enjoy the benefits of being able to download content from representations in portions that start at entry points and end at exit points. This can be an advantage because HTTP byte range requests may not be universally supported.

Segment maps may also contain other relevant information. For example, a segment map may indicate whether particular representations are audio only, or a mix of audio and video, or video only. As another example, segment maps may contain the URLs for FEC repair segments, and the segment mapping information for FEC repair segments, for example the segment mapping information in the format disclosed in Luby A4 or a similar alternative format. As for segment files, segment maps may contain URLs and/or associated mapping information for multiple or partial FEC repair segments, with a structure that is independent of the segment map file structure, and an AHS client can access these segment maps based on the URL structure of the segment maps, and then use the information contained in segment maps to determine which FEC repair segments to access, and to determine the structure of the FEC repair segments.

For the system described above using segment timeline files, and AHS client might operate as follows. From the MPD, the AHS client can construct the list of URLs for the segment timeline files that also indicate their presentation time spans. The AHS client can also construct the list of URLs for segments, either from a URL construction rule or from other means as described previously. The AHS client can decide when a segment timeline file is available and when to download it based on the current real-time and its relationship to the presentation time line of the content being viewed. From the segment timeline file, the AHS client can determine which segment and segment map to download that contains the relevant segment data and segment mapping information. For the last segment listed in a segment timeline file, the AHS client can determine when it will be available for download from its listed start presentation time in the segment timeline file and from the value TSmax of the longest presentation time span of any segment. Thus, the overall end-to-end delay from when content is available till when it is download and viewed by an AHS client is not impacted by the addition of segment timeline files, whereas segment timeline files provide valuable hints to the AHS client about which segment and segment maps to download when switching from one representation to another or when starting a content from a presentation time in the middle of the content. Thus, there are many advantages to providing segment timeline files to better the performance of AHS clients.

FIG. 15 shows an example of the signaling segment timeline files in a DASH system. The left side of FIG. 15 shows some relevant parts of the Media Presentation Description (MPD) that might be made available for a content, wherein in this example there are two representations described in the MPD: a first representation where the video is available encoded at approximately 500 Kbps and in 640×480 resolution, and a second representation where the video is available encoded at approximately 250 Kbps and is also in 640×480 resolution, both available within a period that starts at 100 seconds into the content. The baseURL for all of the content in this example is http://www.example.com/.

As shown in FIG. 15, the timescale for the segment timeline files for the first representation is 1 tick per second, and the URL template pattern for these segment timeline files is ./ahs-5-DUR4.EPT$2*Tind$.time, wherein the full URL is then the concatenation of the baseURL and the URL portion defined by this template. Here, DUR4 indicates the span of presentation time covered by the segment timeline is 4 ticks, or equivalently 4 seconds since timescale=1, and EPT$2*Tind$ indicates that the end presentation time of the span is 2*Tind ticks, or equivalently 2*Tind seconds since timescale=1, wherein Tind indicates the index of the segment timeline file. Thus, the full URL for the first segment timeline file (with Tind=1) is http://www.example.com/ahs-5-DUR4.EPT2.time, and the full URL for the second segment timeline file (with Tind=2) is http://www.example.com/ahs-5-DUR4.EPT4.time, etc. This indicates that all segment timeline files covers a span of 4 seconds, and that the span of the first segment timeline file ends at presentation time 2 seconds (and thus the first two seconds of the span does not actually exist), and that the span of the second segment timeline ends at presentation time 4 seconds, etc.

As shown in FIG. 15, the timescale for the segment files of the first representation is 30,000 ticks per second, and the URL template pattern for these segment files is ./ahs-5-$Sind$0.3 gs, wherein the full URL is then the concatenation of the baseURL and the URL portion defined by this template. Here, Sind indicates the index of the segment file. Thus, the full URL for the first segment file (with Sind=1) is http://www.example.com/ahs-5-1.3 gs, and the full URL for the second segment file (with Sind=2) is http://www.example.com/ahs-5-2.3 gs, etc.

The segment timeline files shown in the middle of FIG. 15 carry the Sind for each of the segment files that have a start presentation time within the presentation time span covered by the segment timeline file, and also carry the corresponding SPT (start presentation time) of the media carried in that segment file, wherein SPT is in units of ticks of the segment timescale, i.e., 30,000 ticks per second. For example, information about the fifth segment with Sind=5 and SPT=79,079 is carried in both the second segment timeline file (Tind=2) and the third segment timeline file (Tind=3), since the SPT of 79,079 ticks corresponds to 79,079/30,000 seconds, or approximately 2.64 seconds is within the time span of both the second and third segment timeline files. In some embodiments, other data is also carried in segment timeline files, for example, segment maps for segments, etc.

The segment files shown in the right side of FIG. 15 carry the media data starting at the SPT shown, and the URL for each of these segment files is shown. The bulk of the data carried in the segment files is not indicated in FIG. 15, e.g., the media data itself, and possibly a segment map associated with the segment, etc.

The MPD shown in the left of FIG. 15 also shows segment timeline file and segment file information associated with a second representation. The corresponding segment timeline files and segment files are not shown in FIG. 15 for this second representation. As shown in FIG. 15, the timescale for the segment timeline files for the second representation is 1 tick per second, and the URL template pattern for these segment timeline files is ./ahs-2-DUR7.EPT$3*Tind$.time, wherein the full URL is then the concatenation of the baseURL and the URL portion defined by this template. Here, DUR7 indicates the span of presentation time covered by the segment timeline is 7 ticks, or equivalently 7 seconds since timescale=1, and EPT$3*Tind$ indicates that the end presentation time of the span is 3*Tind ticks, or equivalently 3*Tind seconds since timescale=1, wherein Tind indicates the index of the segment timeline file. Thus, the full URL for the first segment timeline file (with Tind=1) is http://www.example.com/ahs-2-DUR7.EPT3.time, and the full URL for the second segment timeline file (with Tind=2) is http://www.example.com/ahs-2-DUR7.EPT6.time, etc. This indicates that all segment timeline files covers a span of 7 seconds, and that the span of the first segment timeline file ends at presentation time 3 seconds (and thus the first four seconds of the span does not actually exist), and that the span of the second segment timeline ends at presentation time 6 seconds, etc. As shown in FIG. 15, the timescale for the segment files of the second representation is 30,000 ticks per second, and the URL template pattern for these segment files is ./ahs-2-$Sind$0.3 gs, wherein the full URL is then the concatenation of the baseURL and the URL portion defined by this template. Here, Sind indicates the index of the segment file. Thus, the full URL for the first segment file (with Sind=1) is http://www.example.com/ahs-2-1.3 gs, and the full URL for the second segment file (with Sind=2) is http://www.example.com/ahs-2-2.3 gs, etc.

For the example shown in FIG. 15, an AHS client can operate as follows. The AHS client can use the URL for the MPD to download the MPD, and use the information within the MPD to determine the segment timeline files and segment files information as described above. Suppose the AHS client wants to switch to the first representation at presentation time approximately 110,000 ticks in the segment timescale of 30,000 ticks per second. Since 110,000/30,000 is approximately 3.67 seconds, the AHS client can choose to form the segment timeline URL such that 3.67 seconds is somewhere in the middle of the time span covered by that segment timeline, e.g., the segment timeline file with Tind=3 that has an EPT of 6 seconds and a time span duration of 4 seconds might be a good choice, and the AHS client can determine the URL for this segment timeline file as http://www.example.com/ahs-5-DUR4.EPT6.time using the segment timeline URL template construction rules for the first representation in the MPD. The AHS client can use this URL to download this segment timeline file that contains the following data elements:

Sind=5: SPT=79079
Sind=6: SPT=125125
Sind=7: SPT=145145
Sind=8: SPT=175175

The AHS client can determine that the point at which it wants to switch to the first representation is within the segment file with Sind=5, since 79,079<110,000<125,125. Based on the segment URL template construction rules in the MPD and the segment index Sind=5, the AHS client can form the URL for this segment as http://www.example.com/ahs-5-5.3 gs, and the AHS client can download this segment using this URL.

There are many variants of the above. For example, in a live streaming service, an AHS client can determine when files are available for download based on the current presentation time. For example, a segment timeline file might be available for download immediately or soon after the current presentation time reaches the end presentation time (EPT) of the segment timeline file, and the AHS client can determine which segment timeline files are available for download based on the segment timeline URL template construction rules and the current presentation time. As another example, a segment file might be available for download immediately or soon after the current presentation time reaches the SPT of the subsequent segment file. Thus, an AHS client can determine which segment files are available for download based on the segment indexes and their corresponding SPTs carried in segment timeline files. For example, if an AHS client has downloaded a segment timeline file that covers a time span up to EPT=Z and the segment timeline file carries information about a segment file with Sind=i that carries media data with a maximum presentation time at most Z then the AHS client can determine that the segment file with Sind=i is or will soon be available for download. As another example, if the segment file with Sind=i and SPT=Y is the last segment file listed in a segment timeline file, then an AHS client can determine that the segment file with Sind=i is available for download when the available media presentation time is at or beyond presentation time Y+TSmax, where TSmax is defined as above to be an upper bound on the time span of a segment file.

An AHS client can determine which segment file contains media data for a particular presentation time T as follows. The AHS client can determine the URL of a segment timeline file with a presentation time span that contains T, i.e., a segment timeline file with a presentation time span of duration A starting at presentation time Z-A and ending at presentation time Z, where Z-A≤T≤Z. This can be done using the segment timeline URL template construction rules using the value of T to compute Z and A. Note that there might be several such segment timeline files, and the segment timeline file such that T is closest to the middle of the presentation time span might be preferable. The AHS client can download the segment timeline file using the constructed URL. Then, based on the information in the segment timeline file, the AHS client can determine which segment file contains T as follows. Let $Y\_1$, $Y\_2, \ldots, Y\_k$ be the SPTs of the k segment files about which the segment timeline file contains information, and let i+1, i+2, . . . , i+k be the indices of these segment files, where the value of k may also be carried in the segment timeline map as a parameter and where Z-A≤$Y\_1$<$Y\_2$< . . . <$Y\_k$≤Z. If Z-A≤T<$Y\_1$ then the segment file with index i contains the presentation time T; if for some j between 2 and k, $Y\_(j-1)$≤T<$Y\_j$, then the segment file with index j−1 contains the presentation time T; if $Y\_k$≤T<Z then the segment file with index k contains the presentation time T.

Mixed Time-Based and Index-Based Segment URL Template Generation

The segment URL template construction rules can be augmented to contain both time-based and index-based elements as follows. Let TimescaleSegURL be a timescale that is used to express the number of ticks per second for the time-based information contained in a segment URL for all segments of a representation, let Tind and Sind be positive integer indexes, and let TM be a positive integer constant. Then, a segment URL template construction rule can be of the following form:
1. Content_ID.Representation_ID.PT$Tind$.SEG$Sind$.

The value of TM should be set such that TM/TimescaleSegURL is at least TSmax, where TSmax is the maximum presentation time span of any segment within this representation. For example, if TSmax=2.2 seconds and TimescaleSegURL=10 then TM can be set equal to 22 since in that case TM/TimescaleSegURL=22/10 seconds≥TSmax. This guarantees that, for each positive integer Tind such that TM*Tind is at most the total presentation time span of the representation, at least one segment will start in the interval of presentation time between TM*(Tind−1) and TM*Tind, wherein all times are relative to the time scale TimescaleSegURL.

For each segment, the values of Tind and Sind for that segment fully define the URL for that segment according to the above segment URL template construction rule. The values of Tind and Sind for a segment can be determined as follows. The value of Tind for the segment satisfies TM*(Tind−1)≤SPT<TM*Tind, where SPT is the start presentation time SPT of the segment in the timescale of TimescaleSegURL. As described above, for each positive Tind such that Tind*TM is at most the total presentation time span of the representation, there is at least one segment that is assigned the value Tind. Among those segments assigned the value Tind, the segment with the earliest SPT is assigned the value Sind=1, the segment with the next earliest SPT is assigned the value Sind=2, the segment with the next earliest SPT is assigned the value Sind=3, where the maximum used value of Sind may vary for different values of Tind, as the number of segments varies for different values of Tind.

FIG. 16 shows an example of a mixed time-based and index-based segment URL template generation in a DASH system. The left side of FIG. 16 shows some relevant parts of the Media Presentation Description (MPD) that might be made available for a content, wherein in this example, there are two representations described in the MPD: a first representation where the video is available encoded at approximately 500 Kbps and in 640×480 resolution, and a second representation where the video is available encoded at approximately 250 Kbps and is also in 640×480 resolution, both available within a period that starts at 100 seconds into the content. The baseURL for all of the content in this example is http://www.example.com/.

As shown in FIG. 16, the TimescaleSegURL for the segment URL of the first representation is 10 ticks per second, the value of TM is 22 ticks, and the URL template pattern for these segment files is ./ahs-5-$Tind$.$Sind$0.3 gs, wherein the full URL for the segment is then the concatenation of the baseURL and the URL portion defined by this template. Note that because TM=22 and TimescaleSegURL=10, the maximum presentation time span of any segment for the first representation is 22/10=2.2 seconds. TM*Tind indicates the span of start presentation times of segments with a given value of Tind is TM*Tind ticks in the time scale of TimescaleSegURL, i.e., for the first representation, each value of Tind covers 2.2 seconds of segment start presentation times. The segment with the earliest start presentation time between TM*(Tind-1) and Tind has Sind=1, the segment with the second earliest start presentation time between TM*(Tind-1) and Tind, if there is such a segment, has Sind=2, etc. Thus, the full URL for the first segment file with Tind=1 is http://www.example.com/ahs-5-1.1.3 gs, and the full URL for the second segment file with Tind=1 is http://www.example.com/ahs-5-1.2.3 gs, whereas the first segment file with Tind=2 is http://www.example.com/ahs-5-2.1.3 gs.

As shown in FIG. 16, TimescaleSeg for the first representation is 30,000 ticks per second, which indicates that the presentation times expressed for the media frames within a segment are in units of 30,000 ticks per second. Thus, for example, if the presentation time of a frame within a segment is 10,010, then the presentation time in seconds is 10,010/30,000, or approximately 0.33 seconds.

The segment files for the first representation shown in the middle of FIG. 16 show the start presentation time, SPT, of the segment in units of TimescaleSeg, and also show the URL for the segment. For example, the fifth segment has an SPT=79,079, which corresponds to 79,079/30,000 seconds, or approximately 2.636 seconds. Because this SPT is between 22 and 44 ticks in units of TimescaleSegURL=10 ticks per second, i.e., between 2.2 and 4.4 seconds, Tind=2 for this segment. Furthermore, because this is the segment with the earliest SPT that is between 22 and 44 ticks in units of TimescaleSegURL=10 ticks per second, Sind=1 for this segment. Thus, the segment URL for segment 5 is http://www.example.com/ahs-5-2.1.3 gs, as shown in FIG. 16. FIG. 16 does not show the media data or the segment map information, if any, carried in the segment files.

As shown in FIG. 16, the TimescaleSegURL for the segment URL of the second representation is 20 ticks per second, the value of TM is 30 ticks, and the URL template pattern for these segment files is ./ahs-2-$Tind$.$Sind$0.3 gs, wherein the full URL for the segment is then the concatenation of the baseURL and the URL portion defined by this template. Note that because TM=30 and TimescaleSegURL=20, the maximum presentation time span of any segment for the first representation is 30/20=1.5 seconds. TM*Tind indicates the span of start presentation times of segments with a given value of Tind is TM*Tind ticks in the time scale of TimescaleSegURL, i.e., for the first representation, each value of Tind covers 1.5 seconds of segment start presentation times. The segment with the earliest start presentation time between TM*(Tind-1) and Tind has Sind=1, the segment with the second earliest start presentation time between TM*(Tind-1) and Tind, if there is such a segment, has Sind=2, etc. Thus, the full URL for the first segment file with Tind=1 is http://www.example.com/ahs-5-1.1.3 gs, and the full URL for the second segment file with Tind=1 is http://www.example.com/ahs-5-1.2.3 gs, whereas the first segment file with Tind=2 is http://www.example.com/ahs-5-2.1.3 gs.

As shown in FIG. 16, TimescaleSeg for the second representation is 30,000 ticks per second, which indicates that the presentation times expressed for the media frames within a segment are in units of 30,000 ticks per second. Thus, for example, if the presentation time of a frame within a segment is 11,011, then the presentation time in seconds is 11,011/30,000, or approximately 0.367 seconds.

The segment files for the second representation shown to the right of FIG. 16 show the start presentation time, SPT, of the segment in units of TimescaleSeg, and also show the URL for the segment. For example, the eighth segment has an SPT=175,175, which corresponds to 175,175/30,000 seconds, or approximately 5.84 seconds. Because this SPT is between 90 and 120 ticks in units of TimescaleSegURL=20 ticks per second, i.e., between 4.5 and 6 seconds, Tind=4 for this segment. Furthermore, because this is the segment with the second earliest SPT that is between 90 and 120 ticks in units of TimescaleSegURL=20 ticks per second, Sind=2 for this segment. Thus, the segment URL for segment 8 is http://www.example.com/ahs-2-4.2.3 gs, as shown in FIG. 16.

The generation of segment URLs according to the above segment URL template construction rules by a server performing segmentation of a representation is straightforward: the Tind for a segment URL depends only on the start presentation time of the segment, and the Sind for the URL only depends on the number of previously generated segments with the same Tind. Thus, the segment URLs can be generated by such a server in real-time, and can be made available before the media that is carried in the segment is available and before the presentation times of the media carried in the segment is available.

An advantage of a mixed time-based and index-based segment URL template generation as described above is that segments can have variable presentation time spans while at the same time an AHS client can construct segment URLs and download segments without a priori information about precise segment presentation time spans, and without complicated updates to segment URL lists or MPDs, i.e., the AHS client can use a simple segment URL template construction rule to build the URLs for segments of interest. The advantage of segments with variable presentation time spans has been described previously, for example, this allows segments to start with major entry points and allows the video compression to flexibly place major entry points at natural presentation time boundaries that provide the best compression and quality of play back, wherein these boundaries might be dictated by scene changes or action sequences within the content itself.

An AHS client can operate as follows for a live system based on mixed time-based and index-based segment URL template generation. The AHS client can use the URL for the MPD to download the MPD, and use the information within the MPD to determine the segment URL template construction rules and other information in the MPD as described above. For example, the AHS client can use the values of TM and TimescaleSegURL for the possible representations that the client might request to determine an upper bound TSmax on the presentation time span of any segment for any of these relevant representations. For example, in FIG. 16 where there are two representations, presuming both representations are possible choices for the client, the client can calculate TSmax as the maximum of 22/10 and 30/20, i.e., the maximum of 2.2 and 1.5 seconds.

Suppose an AHS client decides to start requesting and playing out a representation from a live stream at some real-time T, wherein T is expressed in units of TimescaleSegURL ticks of the representation. Based on T and TM for the representation that the AHS client wants to request and play back, the client can compute M=floor(T/TM), wherein floor is the function that results in the largest integer less than or equal to its argument. The client can request the segment, call it segment I, with the URL that corresponds to Tind=M−1 and Sind=1. At time T, segment I is guaranteed to be available, since the start presentation time of any segment with Tind=M−1 is at least TM ticks prior to T in units of TimescaleSegURL, and since the presentation time span of segment I is at most TM ticks in units of TimescaleSegURL, the end of segment I is prior to T and is thus available. Furthermore, since there is at least one segment with Tind=M−1, there will be the segment I with Tind=M−1 and Sind=1. The AHS client can start playing back segment I once the difference between the current real-time T and the start presentation time of segment I is for example some multiple of TSmax, e.g., the difference is at least TSmax, or at least 2*TSmax.

Many possible AHS client strategies are possible. For example, the client may start downloading media farther in the past and build up a buffer of media to playback, with the potential benefits of improving resiliency to download delays and potentially reducing the startup time if the initial download rate is greater than the initial playback rate.

In the above and hereafter, the terms "real-time", and "the value of T" and "available" are generally used in the context of describing the situation when the client is trying to playback live content in real-time with as little as possible latency between when the content is created and when it is available for playback. As described above the client may choose to be playing back content further behind in presentation time for live content in order to build up a media buffer, and for on-demand content all of the content may be available to the client from the beginning, and thus in these contexts "real-time" is to be viewed more generally as the desired presentation time of the media that the client currently wants to download, and "the value of T" is the approximate presentation time of the content that the client is currently attempting to download, and all of the content that the client is attempting to download is available.

Once the AHS client has downloaded segment I, or has access to the end presentation time of segment I, the AHS client also knows the start presentation time of the next segment I+1. The start presentation time of segment I+1 can be used to determine if segment I+1 has Tind=M−1 and Sind=2, i.e., if the start presentation time of segment I+1 is less than TM*(M−1) in units of TimescaleSegURL, or if segment I+1 has Tind=M and Sind=1, i.e., if the start presentation time of segment I+1 is greater than or equal to TM*(M−1) in units of TimescaleSegURL. Continuing in this manner, the AHS client can always determine the Tind and the Sind for the segment subsequent to the current segment within a representation, and thus the URL for that next segment.

If for any reason an AHS client cannot access a particular segment, or information about a particular segment, with Tind=M−1, of a representation, then the AHS client may not be able to determine the URL for the subsequent segment after that missing segment using the procedure described in the previous paragraph. However, the AHS client can determine the URL of the segment with Tind=M and Sind=1, and because there is at least one segment for each Tind, the segment with Tind=M and Sind=1 should be available at some point. Thus, if the AHS client misses a segment from a representation, for example because of a server or network delivery error, then the AHS client can skip to the first segment with the next larger Tind value, and thereby miss playing back at most a span of 2*TM/TimescaleSegURL presentation time of the media content.

The AHS client can use the following strategy to switch from a first representation to a second representation. Let TM and TimescaleSegURL be for the second representation that is to be switched to, and let T be real-time expressed in tick units of TimescaleSegURL at which the switch decision has been made. As soon as T reaches the next value that is evenly divisible by TM, i.e., M=T/TM is an integer, the AHS client can generate the URL corresponding to Tind=M−1 and Sind=1 for a segment, call it segment I, from the second representation, and switch to the second representation at the start presentation time of segment I. In the meantime, the AHS client can continue downloading segments from the first representation until it can play out up to at least the start presentation time of segment I of the second representation, and then make the switch to start playing out segment I of the second representation. Using the methods described in this paragraph, if the difference between real-time and the played out presentation time is at least 2*TSmax, then the switch from the first representation to the second representation can be executed without any stutters or pauses, not taking into account the time between when segments are requested for download and when at least enough of the segment has arrived at the AHS client to start playout of the segment.

As an example of an AHS client method, consider FIG. 16. From the MPD, the client can determine that TSmax=max{22/10, 30/20}=2.2 seconds for these two representations. Suppose the client decides to join the first representation at real-time T=52 in units of TimescaleSegURL=10 ticks per second, i.e., at real-time 5.2 seconds. A first client strategy is for the client to compute M=floor(T/TM), where TM=22, and thus M=2. Based on this, the client can generate the URL for the segment corresponding to Tind=M−1=1 and Sind=1, i.e., segment 1, and then request and download segment 1. Segment 1 is available at this point in time, since the end presentation time of segment 1 is at most the start presentation time of segment 2, which is 10,010/30,000, or approximately 0.333 seconds. The client can start playing out the media content upon receiving at least part of segment 1, and thus the lag between real-time and presentation time is approximately 5.2-0.33=4.87 seconds in this example, and is at most 3*TSmax in general using this first client strategy.

Continuing with the example above using the first client strategy, once the information about segment 1 is available, specifically its end presentation time, the start presentation time of the next segment can be calculated, namely 19,019/30,000, and from this the Tind=1 and Sind=2 of this next segment 2 can be determined, its URL constructed according to the URL template construction rule, and segment 2 can be requested based on its URL. Suppose that for whatever reason, segment 2 corresponding to Tind=1 and Sind=2 is not available. Then, the AHS client may or may not be able to determine the URL for segments 3 and 4, but the AHS client can determine the URL for segment 5 with Tind=2 and Sind=1, and request and play out segment 5 and subsequent segments of representation 1. In this example, the AHS client may play out segment 1, skip the playout of segments 2, 3 and 4, and then continue with the playout of segment 5 and subsequent segments, thus in total skipping playout of (79,079−

10,010)/30,000, or approximately 2.3 seconds of media content, which in general is at most $2*T_{max}$ using this third client strategy.

Suppose as above the client decides to join the first representation at real-time T=52 in units of TimescaleSegURL=10 ticks per second, i.e., at real-time 5.2 seconds. A second alternative client strategy is for the client to wait until the real-time is a multiple of TM ticks, i.e., until real-time T reached 3*TM/TimescaleSegURL=6.6 seconds, and then proceed as above to compute M=T/TM=3, and then form the URL corresponding to Tind=M−1=2 and Sind=1, i.e., segment 5, and then request and start playing out from segment 5 with a start presentation time of 79,079/30,000, or approximately 2.636 seconds. In this case, the playout is delayed by at least 6.6-5.2 seconds=1.4 seconds from the time the client decided to play out from representation 1, i.e., in general a delay of at most TSmax seconds using this second client strategy, but with an improved lag between real-time and presentation time of 6.6−2.636=3.964 seconds, which in general is at most 2*TSmax using this second client strategy. In this case, the client might decide to delay the playout so that the lag is equal to 2*TSmax, i.e., the content starting at presentation time 2.636 seconds will start playing out at real-time 2.636+2*2.2=7.036 seconds, so that there are no stutters or pauses due to subsequent representation switches or requests for segments of the same representation.

Continuing with the example above, suppose the AHS client decides to switch from the first representation to the second representation at real-time T=10 seconds. Let TM=30 and TimescaleSegURL=20 be as specified for the second representation. As soon as T reaches the next value that is evenly divisible by TM in units of TimescaleSegURL, i.e., M=T*TimescaleSegURL/TM is an integer, which occurs at M=7 when T=10.5 seconds, the AHS client can generate the URL corresponding to Tind=6 and Sind=1 for a segment 10 of the second representation and request this segment, where the start presentation time of this segment is 230,230/30,000, or approximately 7.674 seconds. If the lag between real-time and the presentation time of what is being played out is 4.4 seconds as described in the previous paragraph for this example, then the playout of this segment will commence at real-time approximately 12.0743 seconds. In the meantime, the AHS client can continue downloading segments from the first representation until it can play out up to at least the start presentation time of segment 10 of the second representation, and then make the switch to start playing out segment 10 of the second representation.

There are many variants of the above methods. For example, the value of TM and TimescaleSegURL for a representation might be such that TM/TimescaleSegURL is less than the maximum presentation time span of a segment of that representation. In this alternative, it might be the case that there are some positive integer values M such that there is no segment of the representation that has a start presentation time between TM*(M−1) and TM*M in tick units of TimescaleSegURL. In such cases, when a client forms the URL of a segment corresponding to Tind=M and Sind=1, there may be no segment of the representation corresponding to that URL. In this case, if the client decides to request a segment based on the formed URL using HTTP, the client might receive a "HTTP 404 file not found" error response, which the client might use to interpret that there is no segment corresponding to the formed URL.

As another example of a variant, for segments that have the same Tind index, the Sind indexes of segments might be increasing in order of decreasing start presentation times of segments instead of in order of increasing start presentation times of segments. For example, if the start presentation time of segment 1 is 1.1 seconds, the start presentation time of segment 2 is 1.3 seconds, and the start presentation time of segment 3 is 2.4 seconds, and all three segments have the same Tind value, then the Sind value of segment 3 can be 1, the Sind value of segment 2 can be 2, and the Sind value of segment 1 can be 3.

As other examples of variants, the Tind value associated with a segment might be based on the end presentation time of the segment instead of the start presentation time, or the Tind value associated with a segment might be based on the average presentation time of the segment, or it might be based on the presentation time of the frame that is at the mid-byte position of the segment.

As another example of a variant, the segment URL template construction rules might be modified to apply to segment map URL template construction rules, or to segments that contain a combination of segment maps and media data.

Multiple URL Versions of Time-based and Index-based Segment URL Template Generation The segment URL template construction rules that contain both time-based and index-based elements can be further augmented as follows: The URL template construction rules might be used to specify more than one URL for a segment, i.e., the same segment might correspond to multiple URLs, any of which can be used to identify the segment, e.g., to request and download the segment.

As before, let TimescaleSegURL be a timescale that is used to express the number of ticks per second for the time-based information contained in a segment URL for all segments of a representation, let Tind and Sind be positive integer indexes, and let TM be a positive integer constant. Then, a segment URL template construction rule can be of the following form:
1. Content_ID.Representation_ID$Tind$.$Sind$.

In this alternative, possibly multiple values of Tind and Sind might be determined for each segment, where each (Tind, Sind)-pair for that segment defines a URL for that segment. The rule for constructing URLs corresponding to a segment, hereinafter referred to as the segment-URL intersection rule construction, is the following: Let SPT and EPT be the start and end presentation times of the segment in the tick timescale of TimescaleSegURL, wherein the end presentation time of a segment is the start presentation time of the subsequent segment. Then, there is a URL corresponding to Tind=M assigned to the segment if any one or more of the following three conditions is satisfied:

$$SPT \le TM*(M-1) \le EPT$$
$$TM*(M-1) \le SPT \text{ and } EPT \le TM*M$$
$$SPT \le TM*M \le EPT.$$

In other words, there is a URL corresponding to Tind=M assigned to the segment if the presentation time span defined by [SPT, EPT] has a non-empty intersection with the time span [TM*(M−1), TM*M] defined by the URL template construction rule with Tind=M. Note that a segment may satisfy more than one of the three conditions, e.g., if SPT≤TM*(M−1) and EPT≥TM*M, then both conditions 1 and 3 are satisfied. For each Tind=M assigned to a segment, the Sind value assigned to the segment can be according to the order of the segments within the representation that have the same Tind=M assigned to them. Thus, if there are N segments 1, 2, . . . , N with a presentation time intersections with the URL time span [TM*(M−1), TM*M] that are ordered according to their starting and ending presentation times ($SPT_1$, $EPT_1$), $(SPT_2, EPT_2), \ldots, (SPT_N, EPT_N)$, such that $EPT_i = SPT_{i+1}$, then the Sind values for these N segments for Tind=M is 1, 2, ..., N, respectively.

Using the segment-URL intersection rule construction, the number of URLs that are assigned to a segment is the number of URL time spans of the form [TM*(M−1), TM*M] that the presentation time span of the segment intersects. This construction has the property that for every M such that TM*M is at most the end presentation time of the representation in the tick timescale TimescaleSegURL, there will be at least one segment assigned to Tind=M, and thus, there is always a segment with the URL corresponding to Tind=M and Sind=1 for each such M.

Using the segment-URL intersection rule construction, each segment is assigned to at least one URL time span. In particular, if the URL time span [TM*(M−1),TM*M] is the first URL time span that a segment intersects, and the segment intersects N URL time spans in total, then N URLs will be assigned to the segment, wherein the first URL corresponds to Tind=M and Sind=I for some I≥1, and wherein the second through the Nth URLs correspond to (Tind=M+1, Sind=1), (Tind=M+2, Sind=1), ..., (Tind=M+N−1, Sind=1), respectively. Thus, all of the URLs corresponding to the segment can be determined from the values of (Tind=M, Sind=I) of the URL where M is the smallest Tind value, and from the number of URLs N assigned to the segment.

Figure 17:
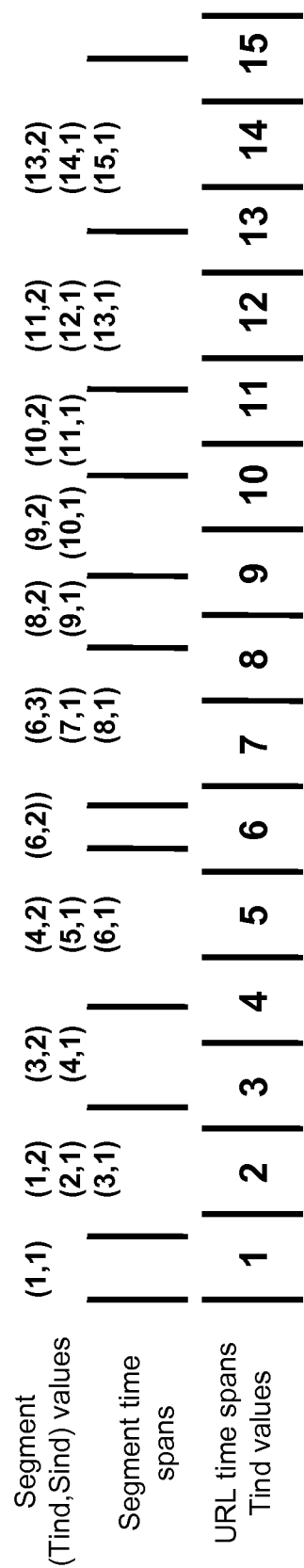
FIG. 17 shows an example of the segment-URL intersection rule construction.

FIG. 17 shows an example of the segment-URL intersection rule construction. The URL time spans and the value Tind=M assigned to each URL time span is shown along the bottom of FIG. 17, wherein the Tind value shown for each URL time span is the presentation time M*TM of the end of the span in the time scale units of TimescaleSegURL. The segment start and end points are shown just above the URL time spans, wherein the vertical lines indicate the end of one segment and the start of the next, i.e., the vertical lines indicate the boundaries between consecutive segments. Within the start and end point of each segment is listed the set of (Tind, Sind) values that correspond to URLs assigned to that segment. For example, the values (1,2), (2,1), (3,1) are listed for the second segment, which indicates that the URLs corresponding to the second segment are of the form:

Content_ID.Representation_ID.1.2,
Content_ID.Representation_ID.2.1,
Content_ID.Representation_ID.3.1.

As an example of an AHS client usage of the segment-URL intersection rule construction, suppose an AHS client decides to start requesting and playing out a representation from a live stream at some real-time T, wherein T is expressed in units of TimescaleSegURL ticks of the representation. Supposed further that TSmax is a positive integer MM multiple of TM in the timescale units of TimescaleSegURL, i.e., TSmax=TM*MM. Based on T and TM for the representation that the AHS client wants to request and play back, the client can compute M=floor(T/TM), wherein floor is the function that results in the largest integer less than or equal to its argument. The client can request the segment, call it segment I, with the URL that corresponds to Tind=M−MM+1 and Sind=1 that intersects the start boundary of the URL time span corresponding to Tind=M−MM+1. At time T, segment I is guaranteed to be available, since the start of the boundary of the URL time span corresponding to Tind=M−MM+1 is at least TM*MM ticks prior to T in units of TimescaleSegURL, and since the presentation time span of segment I is at most TM*MM ticks in units of TimescaleSegURL, the end of segment I is prior to T and is thus available. It can also be verified that the start presentation time of segment I is at most 2*TSmax ticks prior to T. The AHS client can start playing back segment I once the difference between the current real-time T and the start presentation time of segment I is, for example, at least 2*TSmax.

Once the AHS client has downloaded segment I, or has access to the end presentation time of segment I, the AHS client can determine the start presentation time of the next segment I+1 just after segment I, and the AHS client can determine if segment I+1 has Tind=M−MM+1 and Sind=2, or if segment I+1 has Tind=M−MM+2 and Sind=1, i.e., if the start presentation time of the next segment is less than or equal to or greater than TM*(M−MM+1) in units of TimescaleSegURL. Continuing in this manner, the AHS client can always determine the Tind and the Sind for the segment subsequent to the current segment within a representation, and thus the URL for that next segment.

If for any reason an AHS client receives a "not found" response to a validly formed URL request for a segment with Tind=M, wherein the URL request is formed based on the segment-URL intersection rule construction, then the AHS client may not be able to determine the URL for the subsequent segment after that missing segment. However, the AHS client can issue requests for the segments with the URLs corresponding to Tind=N and Sind=1, for N=M+1, M+2, etc. until a segment that is available is found. Of course, the AHS client should time these requests so that the corresponding segment should be available at the time of the request if, for example, the segments are being generated and made available live. Thus, if the AHS client misses a segment from a representation, for example because of a server or network delivery error, then the AHS client can skip to the first segment with the next larger Tind=N value that is available, and thereby miss playing back the minimal amount, within an additive factor of TM/TimescaleSegURL seconds, of presentation time possible due to missing segments.

The AHS client can use the following strategy to switch from a first representation to a second representation. Let TM and TimescaleSegURL be for the second representation that is to be switched to, let TSmax=TM*MM for some positive integer MM, and let T be real-time expressed in tick units of TimescaleSegURL at which the switch decision has been made. As soon as T reaches the next value that is evenly divisible by TM, i.e., M=T/TM is an integer, the AHS client can generate the URL corresponding to Tind=M−MM+1 and Sind=1 for a segment, call it segment I, from the second representation, and switch to the second representation at the start presentation time of segment I. In the meantime, the AHS client can continue downloading segments from the first representation until it can play out up to at least the start presentation time of segment I of the second representation, and then make the switch to start playing out segment I of the second representation. Using the methods described in this paragraph, if the difference between real-time and the played out presentation time is at least 2*TSmax, then the switch from the first representation to the second representation can be executed without any stutters or pauses, not taking into account the time between when segments are requested for download and when at least enough of the segment has arrived at the AHS client to start playout of the segment.

As an example, the segment-URL intersection rule construction can be applied to an existing ALS system as follows, with many advantages to enhanced ALS clients, as one skilled in the art will recognize. The TimescaleSegURL value can be set to 1, i.e., there is always 1 tick per second. The value of TM can be determined from the advertised duration of segments in a representation of a content, e.g., if the segment duration is advertised as 10 seconds for a representation of a content, then TM is set to 10 for that representation of the content, whereas if the segment duration is advertised as 6 seconds for a representation of a content, then TM is set to 6 for that representation of the content. Enhanced ALS clients and enhanced segment URL generators that incorporate the segment-URL intersection rule construction should use the same TimescaleSegURL value and TM value for each representation of a content. Enhanced segment URL generators should use the segment-URL intersection rule construction to generate and associate the URLs for the segments of the ALS content, whereas enhanced ALS clients should use the segment-URL intersection rule construction to determine URLs for segments to request as described previously. If these methods are applied to an existing ALS system, an enhanced segment URL generator might also additionally generate and associate the URLs as would be generated and explicitly provided in a list of segment URLs for the content by existing segment URL, so that existing ALS clients can continue to operate unmodified. Alternatively, an enhanced segment URL generator might use the segment-URL intersection rule construction to generate and associate the URLs for the segments of the ALS content, and additionally provide the first URL for each segment in a list in the current ALS segment URL list format so that existing ALS clients can use these explicit segment URL lists to operate unmodified.

There are many variants of segment URL template construction rules for which there is potentially more than one URL assigned to at least some of the segments. For example, instead of assigning the Sind values for the segments with the same Tind value in increasing order of presentation times of the segments, the Sind values can be assigned in decreasing order of presentation times of the segments.

As a variant of the segment-URL intersection rule construction, the rule might be that if there are N segments 1, 2, ..., N with presentation time intersections with the URL time span [TM*M, TM*(M+1)] that are ordered according to their starting and ending presentation times $(SPT_1, EPT_1)$, $(SPT_2, EPT_2)$, ..., $(SPT_N, EPT_N)$, such that $EPT_i=SPT_{i+1}$, then the Sind values for these N segments for Tind=M is 0, 1, ..., N−1, respectively.

Another variant of the segment-URL intersection rule construction can be that if there is more than one URL assigned to a segment, e.g., N>1 URLs are assigned to a segment, then more than one copy of the segment is made available. For example, there might be N separate copies of the segment made available as separate files, wherein each copy is identical to each other copy with the exception that each such copy has exactly one of the URLs assigned to it that is used to reference or download that copy. As another example, each copy of a segment may not be identical, i.e., each copy may have exactly the same time span as each other copy and be for the same representation, but the different copies might be video encoded in different ways: for example, the copies that have a Sind=1 that might be used as switch-to segments into a representation might be encoded so that they start with a RAP, whereas copies that have a Sind>1 that are used to continue from the previous segment of the same representation might be encoded more efficiently using frames that are not RAPs, but instead reference frames from previous segments of the same representation.

As another variant, more than one URL construction rule may be specified for the same representation, e.g., a rule based on segment time spans intersecting URL time spans where Sind indexing is in order of increasing segment presentation times, a rule based on segment time spans intersecting URL time spans where Sind indexing is in order of decreasing segment presentation times, a rule based on segment start presentation time contained in a URL time span where Sind indexing is in order of increasing or decreasing segment start presentation times, a rule based on segment end presentation time contained in a URL time span where Sind indexing is in order of increasing or decreasing segment end presentation times, rules with different values of TM or TimescaleSegURL for the same representation, and different rules for segments, segment maps, or combinations of segments or segment maps.

For example, a general segment URL template construction rule can be of the following form, where "Content_ID" identifies the content, "Representation_ID" identifies the representation, "Type" is either "SPT", "EPT", or "INT", and "Direction" is either "I" or "D":

```
TM = value
TimescaleSegURL = value
Content_ID.Representation_ID.Type.Direction.$Tind$.$Sind$
```

In the above data structure, "Type" indicates the type of the rule, i.e., if it is "SPT" then the rule is based on segment start presentation time, if it is "EPT" then the rule is based on segment end presentation time, and if it is "INT" then the rule is based on segment intersection. "Direction" indicates the direction of Sind indexing, if it is "I" then Sind indexing is in order of increasing segment presentation time, if it is "D" then Sind indexing is in order of decreasing segment presentation time.

As an example, the URL template construction rule:

```
TM = 20
TimescaleSegURL = 1
http://www.example.com/ahs-5-INT.I.$Tind$.$Sind$
``` indicates a rule wherein the content and representation are identified by "http://www.example.com/ahs-5-1.1.3 gs", "INT" indicates the rule is a segment intersection rule as defined previously, and "I" indicates that Sind indexing is increasing in terms of segment presentation times. Since TimescaleSegURL=1 and TM=20, each URL time span defined by this rule is 20 seconds in duration.

Simple Segment URL Template Generation

Segment URLs can be generated according to a template where the template and/or construction rules are compactly conveyed to clients that will be making segment requests. These templates/rules can be simple or complex. A simple process for segment URL generation and URL template generation will now be described, as an example.

Maintaining the notation described in the previous section, TM is a presentation time parameter that is expressed in units of ticks, and TimescaleSegURL is the number of ticks per second. For URL template generation (and possibly other purposes), there are two additional parameters, DeltaMinus and DeltaPlus, that are both presentation time parameters expressed in units of ticks. Thus, an example of a URL template construction rule might use the following data structure:

```
TM = 50
TimescaleSegURL = 10
DeltaMinus = 4
DeltaPlus = 6
http://www.example.com/ahs-8.$Sind$.3gp
```

In the above data structure, possibly passed to the client or otherwise obtained by the client, Sind is a positive integer argument to the URL template construction rule that is to be interpreted as follows. For the segment with Sind=i, i.e., for the segment with the URL http://www.example.com/ahs-8.i.3 gp, the start presentation time SPT of the segment is within the presentation time interval that starts at a time (in seconds) specified by the value (TM*I-DeltaMinus)/TimescaleSegURL and ends at a time (in seconds) specified by the value (TM*I+DeltaPlus)/TimescaleSegURL.

For example, if Sind=17 in the example above, then the start presentation time SPT of the segment with URL http://www.example.com/ahs-8.17.3 gp is between 50*17−4 ticks and 50*17+6 ticks, or equivalently between presentation time 84.6 seconds and presentation time 85.6 seconds. Thus, in this example, the start time of the segment falls within a one second presentation time interval, whereas the average segment duration is approximately TM/TimescaleSegURL=5 seconds. From a desired start presentation time, a client can easily perform computations to derive a segment to request, exactly or near enough to still be efficient.

Typically, but not always, DeltaMinus and DeltaPlus are a fraction of TM. However, there are cases where allowing DeltaMinus or DeltaPlus to be larger than TM provides benefits.

One benefit of the above method is that it provides flexibility in the video encoding process, i.e., providing flexibility in the start presentation time of segments also provides flexibility in the presentation time of SAPs that in some cases are at the beginning of each segment. Since a SAP is in many cases is an IDR-frame, having flexibility in the presentation times of IDR-frames generated by the video encoding process allows the video encoding process to provide better compression for the same stream rate as compared to video compression with IDR-frames generated at fixed presentation time intervals.

A further benefit is that the method provides control over the trade-off between the end-to-end latency, which can be as small or smaller than TM+DeltaMinus+DeltaPlus, and video compression flexibility in the placement of IDR-frames. A further benefit is that it allows the AHS client to be able to generate the URL of the segment it should request based on a rough presentation time estimate, within a configurable precision of (DeltaMinus+DeltaPlus)/TimescaleSegURL seconds, and without reference to information about previous or subsequent segments.

A further benefit is that the method allows servers to generate segments and associated URLs without reference to information about previous or subsequent segments or URLs. This can be especially beneficial in support of a live streaming solution with redundant servers: if a first server crashes that is generating segments and URLs and a new second server comes online to replace it, the second server can generate subsequent segments and URLs independent of the state of the crashed first server. There may be a short discontinuity in the video content and the segments and URLs generated by the second server, where the duration of this discontinuity is related to the interval of time between the when the first server crashed and the second server takes its place, plus a time interval proportional (DeltaMinus+DeltaPlus)/TimescaleSegURL.

In one variant of the above method, the constraint on the start presentation time of segments falling within the prescribed time interval only applies to segments with a SAP at the beginning of the segment. In another variant of the above method, the constraint on the start presentation time of segments only applies to segments that have an index Sind that is a multiple of some fixed positive integer SAP_FREQ, and only segments that have an index Sind that is a multiple of SAP_FREQ are required to begin with a signaled SAP.

As one skilled in the art will recognize upon reading this disclosure, there are many other variants of the above methods. As examples, the values of DeltaMinus and DeltaPlus may be signaled in the MPD for each adaptation set, or may be signaled per representation within an adaptation set, or may be signaled globally for all adaptation sets. As other examples, one or both of the values of DeltaMinus and DeltaPlus may not be explicitly signaled and may be set to a predetermined value, for example based on a predefine profile. For example, DeltaMinus might be defined to be zero and DeltaPlus might defined to be TM/2 for a predefined profile. As another example, DeltaMinus and DeltaPlus may have prescribed default values that are only overridden if the values of DeltaMinus and DeltaPlus are explicitly provided in the MPD. As other examples, there might be only a single signaled parameter Delta, and the values of DeltaMinus and DeltaPlus are both set to Delta, or DeltaMinus is set to zero and DeltaPlus is set to Delta. As another example, DeltaMinus and DeltaPlus might be derived from other parameters, e.g., there are two parameters FracDeltaMinus and FracDeltaPlus that are signaled instead of DeltaMinus and DeltaPlus, and then DeltaMinus is set to FracDeltaMinus*TM and DeltaPlus is set to FracDeltaPlus*TM.

Hardware System Overview

Various embodiments, features, methods, etc. are described above that can operate on a variety of platforms. This section describes some specific hardware platforms in detail that might be used with the teachings above.

Figure 18:
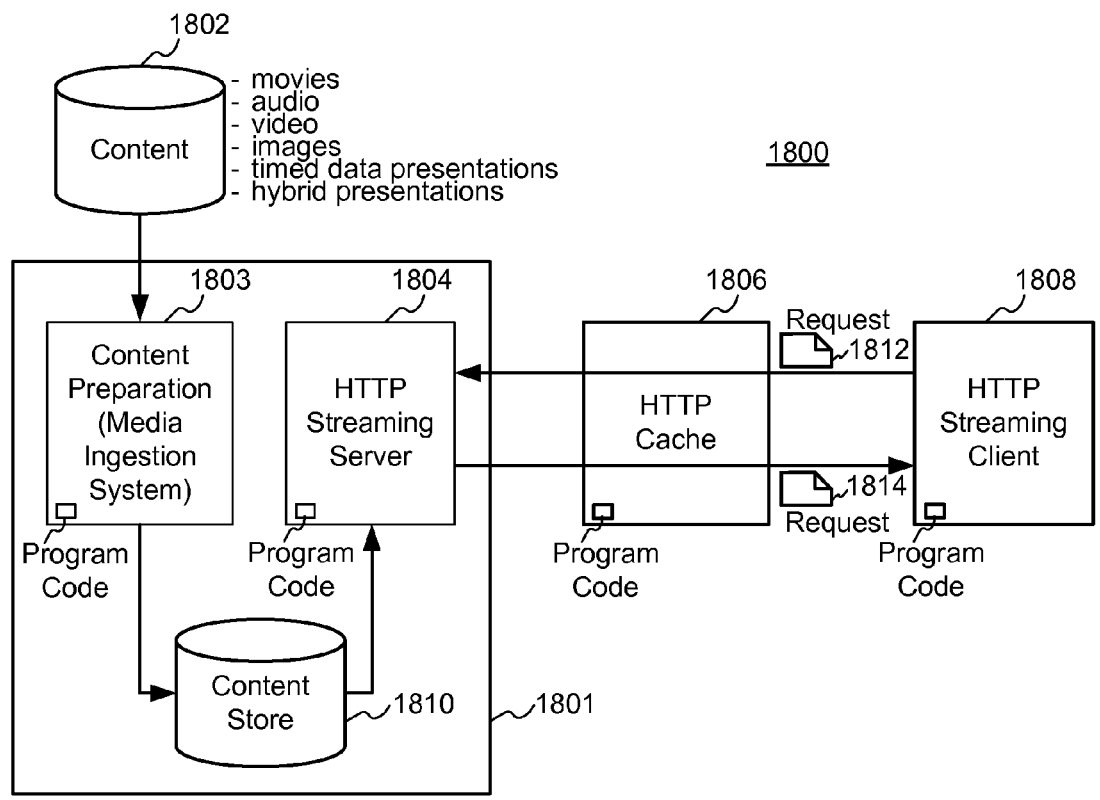
FIG. 18 depicts elements of a block-request streaming system according to embodiments of the present invention.

In FIG. 18, a block-streaming system 1800 is illustrated, comprising block serving infrastructure ("BSI") 1801 in turn comprising an ingestion system 1803 for ingesting content 1802, preparing that content and packaging it for service by an HTTP streaming server 1804 by storing it into a content store 1810 that is accessible to both ingestion system 1803 and HTTP streaming server 1804. As shown, system 1800 might also include an HTTP cache 1806. In operation, a client 1808, such as an HTTP streaming client, sends requests 1812 to HTTP streaming server 1804 and receives responses 1814 from HTTP streaming server 1804 or HTTP cache 1806. In each case, elements shown in FIG. 18 might be implemented, at least in part, in software, therein comprising program code that is executed on a processor or other electronics.

The content might comprise movies, audio, 2D planar video, 3D video, other types of video, images, timed text, timed metadata or the like. Some content might involve data that is to be presented or consumed in a timed manner, such as data for presenting auxiliary information (station identification, advertising, stock quotes, Flash™ sequences, etc.) along with other media being played out. Other hybrid presentations might also be used that combine other media and/or go beyond merely audio and video.

Figure 19:
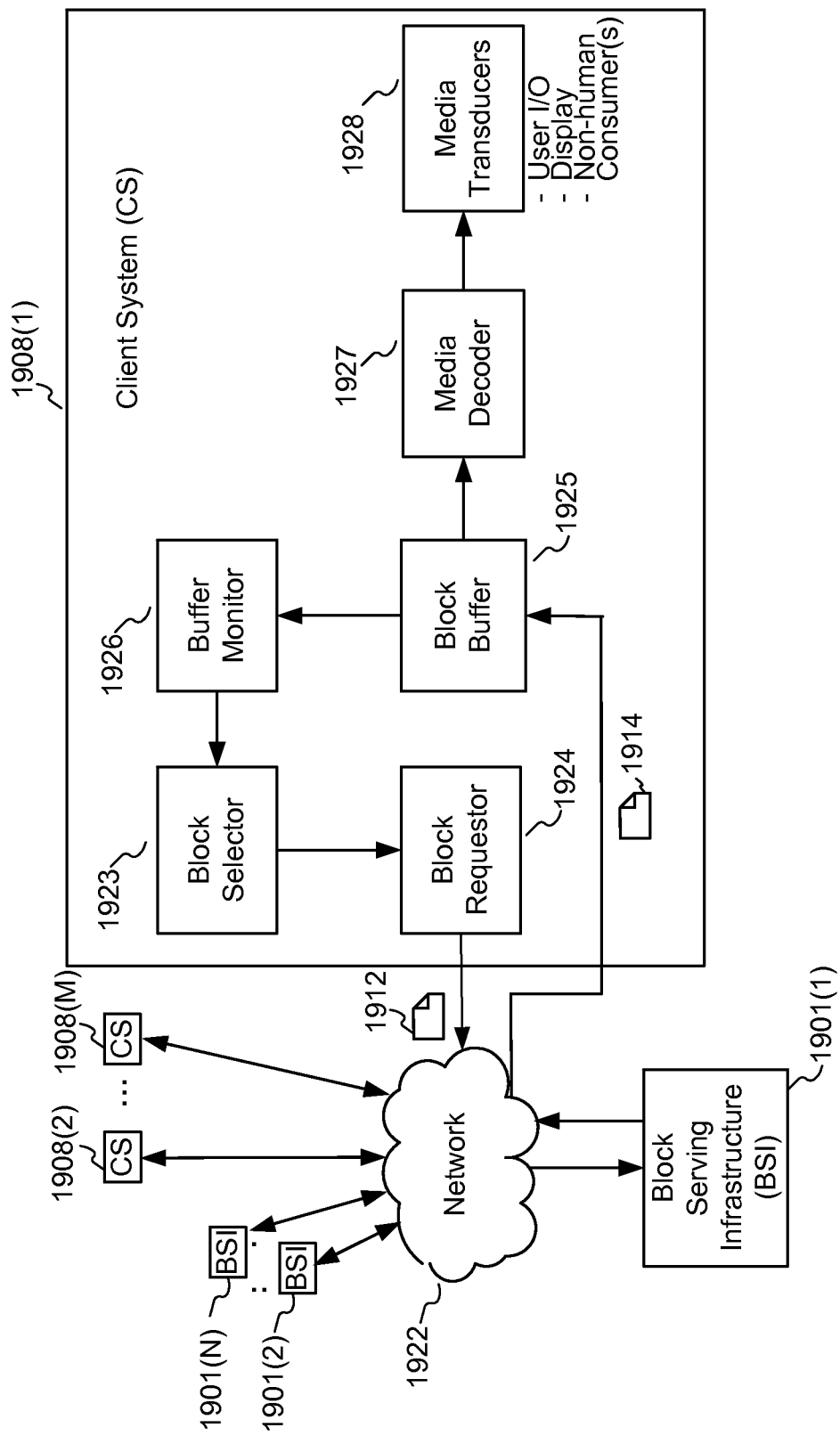
FIG. 19 illustrates the block-request streaming system of FIG. 18, showing greater detail in the elements of a client system that is coupled to a block serving infrastructure ("BSI") to receive data that is processed by a content ingestion system.

As illustrated in FIG. 19, media blocks may be stored within a block serving infrastructure 1801(1), which could be, for example, an HTTP server, a Content Delivery Network device, an HTTP proxy, FTP proxy or server, or some other media server or system. Block serving infrastructure 1801(1) is connected to a network 1822, which could be, for example, an Internet Protocol ("IP") network such as the Internet. A block-request streaming system client is shown having six functional components, namely a block selector 1823, provided with the metadata described above and performing a function of selecting blocks or partial blocks to be requested from among the plurality of available blocks indicated by the metadata, a block requestor 1824, that receives request instructions from block selector 1823 and performs the operations necessary to send a request for the specified block, portions of a block, or multiple blocks, to block serving infrastructure 1801(1) over network 1822 and to receive the data comprising the block in return, as well as a block buffer 1825, a buffer monitor 1826, a media decoder 1827 and one or more media transducers 1828 that faciliate media consumption.

Block data received by block requestor 1824 is passed for temporary storage to block buffer 1825, which stores the media data. Alternatively, the received block data can be stored directly into block buffer 1825 as illustrated in FIG. 18. Media decoder 1827 is provided with media data by block buffer 1825 and performs such transformations on this data as are necessary to provide suitable input to media transducers 1828, which render the media in a form suitable for user or other consumption. Examples of media transducers include visual display devices such as those found in mobile phones, computer systems or televisions, and might also include audio rendering devices, such as speakers or headphones.

An example of a media decoder would be a function that transforms data in the format described in the H.264 video coding standard into analogue or digital representations of video frames, such as a YUV-format pixel map with associated presentation timestamps for each frame or sample.

Buffer monitor 1826 receives information concerning the contents of block buffer 1825 and, based on this information and possibly other information, provides input to block selector 1823, which is used to determine the selection of blocks to request, as is described herein.

In the terminology used herein, each block has a "playout time" or "duration" that represents the amount of time it would take for the receiver to play the media included in that block at normal speed. In some cases, the playout of the media within a block may depend on having already received data from previous blocks. In rare cases, the playout of some of the media in a block may depend on a subsequent block, in which case the playout time for the block is defined with respect to the media that can be played out within the block without reference to the subsequent block, and the playout time for the subsequent block is increased by the playout time of the media within this block that can only playout after having received the subsequent block. Since including media in a block that depends on subsequent blocks is a rare case, in the remainder of this disclosure we assume that media in one block does not depend on subsequent blocks, but note that those skilled in the art will recognize that this variant can be easily added to the embodiments described below.

The receiver may have controls such as "pause", "fast forward", "reverse", etc. that may result in the block being consumed by playout at a different rate, but if the receiver can obtain and decode each consecutive sequence of blocks in an aggregate time equal to or less than their agreggate playout time excluding the last block in the sequence then the receiver can present the media to the user without stalling. In some descriptions herein, a particular position in the media stream is referred to as a particular "time" in the media, corresponding to the time that would have elapsed between the beginning of the media playout and the time when the particular position in the video stream is reached. The time or position in a media stream is a conventional concept. For example, where the video stream comprises 24 frames per second, the first frame could be said to have a position or time of t=0.0 seconds and the 241st frame could be said to have a position or time of t=10.0 seconds. Naturally, in a frame-based video stream, position or time need not be continuous, as each of the bits in the stream from the first bit of the 241st frame to just before the first bit of the 242nd frame might all have the same time value.

Adopting the above terminology, a block-request streaming system (BRSS) comprises one or more clients that make requests to one or more content servers (for example, HTTP servers, FTP Servers, etc.). An ingestion system comprises one or more ingestion processors, wherein an ingestion processor receives content (in real-time or not), processes the content for use by the BRSS and stores it into storage accessible to the content servers, possibly also along with metadata generated by the ingestion processor.

The BRSS also might contain content caches that coordinate with the content servers. The content servers and content caches might be conventional HTTP servers and HTTP caches that receive requests for files or segments in the form of HTTP requests that include a URL, and may also include a byte range, in order to request less than all of the file or segment indicated by the URL. The clients might include a conventional HTTP client that makes requests of HTTP servers and handles the responses to those requests, where the HTTP client is driven by a novel client system that formulates requests, passes them to the HTTP client, gets responses from the HTTP client and processes those (or storing, transforming, etc.) in order to provide them to a presentation player for playout by a client device. Typically, the client system does not know in advance what media is going to be needed (as the needs might depend on user input, changes in user input, etc.), so it is said to be a "streaming" system in that the media is "consumed" as soon as it is received, or shortly thereafter. As a result, response delays and bandwidth constraints can cause delays in a presentation, such as causing a pause in a presentation as the stream catches up to where the user is in consuming the presentation.

In order to provide for a presentation that is perceived to be of good quality, a number of details can be implemented in the BRSS, either at the client end, at the ingestion end, or both. In some cases, the details that are implemented are done in consideration of, and to deal with, the client-server interface at the network. In some embodiments, both the client system and the ingestion system are aware of the enhancement, whereas in other embodiments, only one side is aware of the enhancement. In such cases, the entire system benefits from the enhancement even though one side is not aware of it, while in others, the benefit only accrues if both sides are aware of it but when one side is not aware, it still operates without failing.

Figure 20:
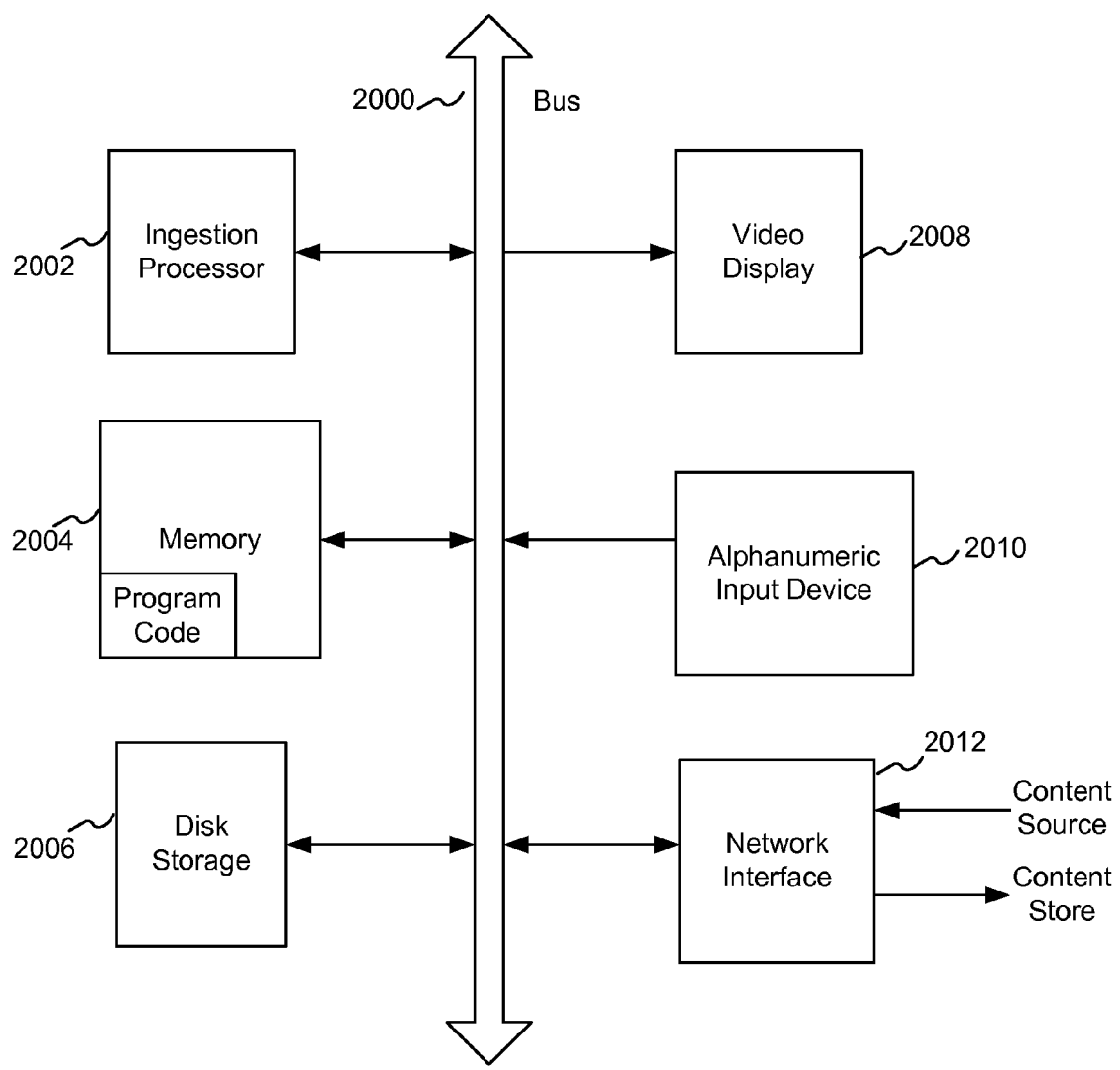
FIG. 20 illustrates a hardware/software implementation of an ingestion system.

As illustrated in FIG. 20, the ingestion system may be implemented as a combination of hardware and software components, according to various embodiments. The ingestion system may comprise a set of instructions that can be executed to cause the system to perform any one or more of the methodologies discussed herein. The system may be realized as a specific machine in the form of a computer. The system may be a server computer, a personal computer (PC), or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The ingestion system may include the ingestion processor 2002 (e.g., a central processing unit (CPU)), a memory 2004 which may store program code during execution, and disk storage 2006, all of which communicate with each other via a bus 2000. The system may further include a video display unit 2008 (e.g., a liquid crystal display (LCD) or cathode ray tube (CRT)). The system also may include an alphanumeric input device 2010 (e.g., a keyboard), and a network interface device 2012 for receiving content source and delivering content store.

The disk storage unit 2006 may include a machine-readable medium on which may be stored one or more sets of instructions (e.g., software) embodying any one or more of the methodologies or functions described herein. The instructions may also reside, completely or at least partially, within the memory 2004 and/or within the ingestion processor 2002 during execution thereof by the system, with the memory 2004 and the ingestion processor 2002 also constituting machine-readable media.

Figure 21:
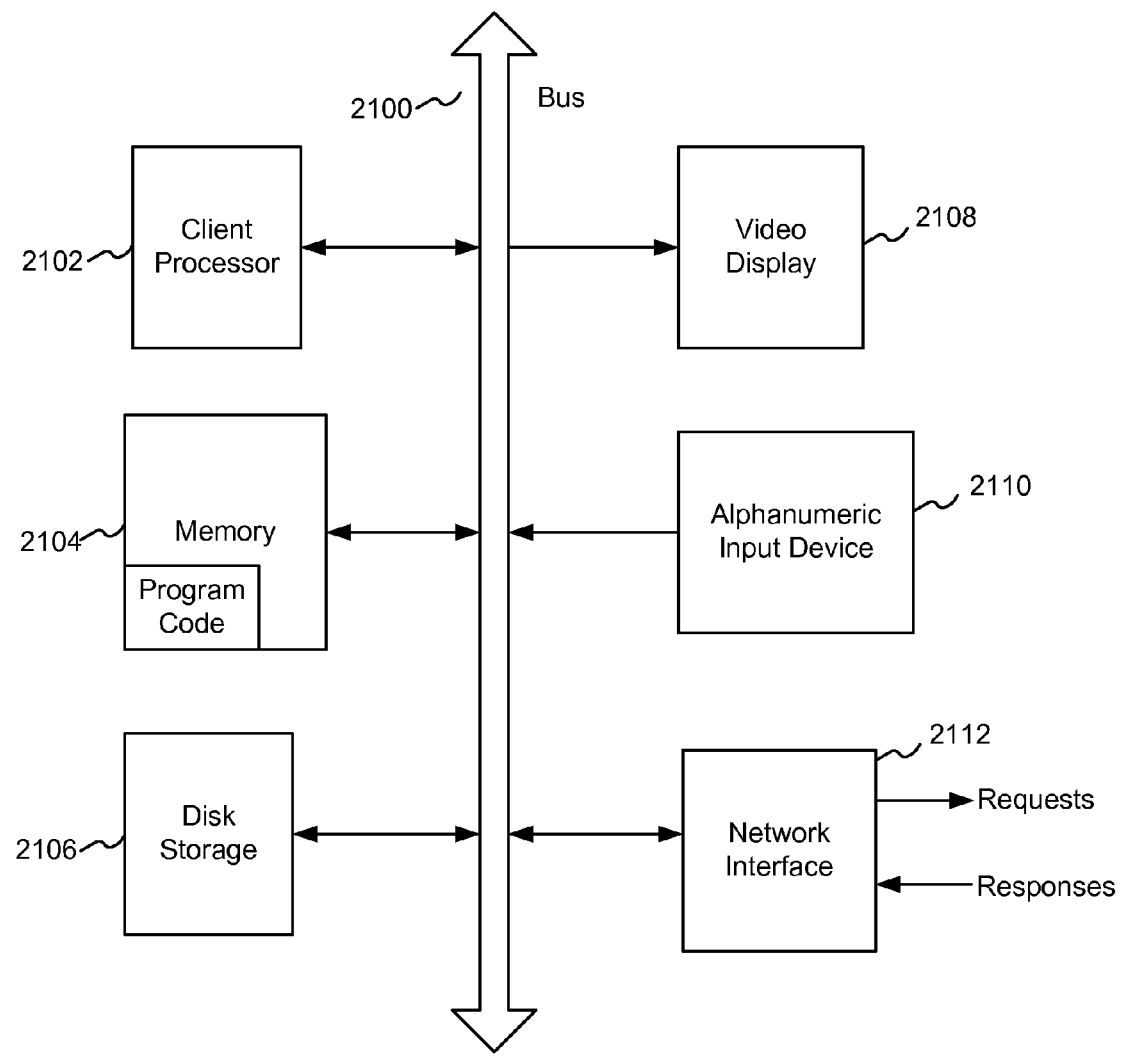
FIG. 21 illustrates a hardware/software implementation of a client system.

As illustrated in FIG. 21, the client system may be implemented as a combination of hardware and software components, according to various embodiments. The client system may comprise a set of instructions that can be executed to cause the system to perform any one or more of the methodologies discussed herein. The system may be realized as a specific machine in the form of a computer. The system may be a server computer, a personal computer (PC), or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The client system may include the client processor 2102 (e.g., a central processing unit (CPU)), a memory 2104 which may store program code during execution, and disk storage 2106, all of which communicate with each other via a bus 2100. The system may further include a video display unit 2108 (e.g., a liquid crystal display (LCD) or cathode ray tube (CRT)). The system also may include an alphanumeric input device 2110 (e.g., a keyboard), and a network interface device 2112 for sending requests and receiving responses.

The disk storage unit 2106 may include a machine-readable medium on which may be stored one or more sets of instructions (e.g., software) embodying any one or more of the methodologies or functions described herein. The instructions may also reside, completely or at least partially, within the memory 2104 and/or within the client processor 2102 during execution thereof by the system, with the memory 2104 and the client processor 2102 also constituting machine-readable media.

Advanced Methods Overview

In the following sections, methods for improved block-request streaming systems are described. It should be understood that some of these improvements can be used with or without others of these improvements, depending on the needs of the application. In the general operation, a receiver makes requests of a server or other transmitter for specific blocks or portions of blocks of data. Files, also called segments, may contain multiple blocks and are associated with one representation of a media presentation.

Preferably, indexing information, also called "segment indexing" or "segment map", is generated that provides a mapping from playout or decode times to byte offsets of corresponding blocks or fragments within a segment. This segment indexing may be included within the segment, typically at the beginning of the segment (at least some of the segment map is at the beginning) and is often small. The segment index may also be provided in a separate index segment or file. Especially in cases where the segment index is contained in the segment, the receiver may download some or all of this segment map quickly and subsequently use this to determine the mapping between time offsets and corresponding byte positions of fragments associated with those time offsets within the file.

A receiver can use the byte offset to request data from the fragments associated with particular time offsets, without having to download all of the data associated with other fragments not associated with the time offsets of interest. In this way, the segment map or segment indexing can greatly improve the ability of a receiver to directly access the portions of the segment that are relevant to the current time offsets of interest, with benefits including improved content zapping times, ability to quickly change from one representation to another as network conditions vary, and reduced wastage of network resources downloading media that is not played out at a receiver.

In case switching from one representation (referred to herein as the "switch-from" representation) to another representation (referred to herein as the "switch-to" representation) is considered, the segment index may also be used to identify the start time of a random access point in the switch-to representation to identify the amount of data to be requested in the switch-from representation to ensure that seamless switching is enabled in a sense that media in the switch-from representation is downloaded up to a presentation time such that the playout of the switch-to representation can start seamlessly from the random access point.

Those blocks represent segments of the video media or other media that the requesting receiver needs in order to generate the output for the user of the receiver. The receiver of the media can be a client device, such as when the receiver receives content from a server that transmits the content. Examples include set-top boxes, computers, game consoles, specially-equipped televisions, handheld devices, specially-equipped mobile phones, or other client receivers.

Many advanced buffer management methods are described herein. For example, a buffer management method enables clients to request blocks of the highest media quality that may be received in time to be played out with continuity. A variable block size feature improves compression efficiency. The ability to have multiple connections for transmitting blocks to the requesting device while limiting the frequency of the requests provides improved transmission performance. Partially received blocks of data can be used to continue the media presentation. A connection can be re-used for multiple blocks without having to commit the connection at the start to a particular set of blocks. Consistency in the selection of servers from among multiple possible servers by multiple clients is improved, which reduces the frequency of duplicate content in nearby servers and improves the probability that a server contains an entire file. Clients can request media blocks based on metadata (such as available media encodings) that are embedded in the URLs for the files containing the media blocks. A system can provide for calculation and minimization of the amount of buffering time required before playout of the content can begin without incurring subsequent pauses in media playout. Available bandwidth can be shared among multiple media blocks, adjusted as the playout time of each block approaches, so that, if necessary, a greater share of available bandwidth can be allocated towards the block with the nearest playout time.

HTTP streaming may employ metadata. Presentation level metadata includes, for example, stream duration, available encodings (bitrates, codecs, spatial resolutions, frame rates, language, media types), pointers to stream metadata for each encoding, and content protection (digital rights management (DRM) information). Stream metadata may be URLs for the segment files.

Segment metadata may include byte range versus time information for requests within a segment and identification of Random Access Points (RAPs) or other seek points, where some or all of this information may be part of a segment indexing or segment map.

Streams may comprise multiple encodings of the same content. Each encoding may then be broken into segments where each segment corresponds to a storage unit or file. In the case of HTTP, a segment is typically a resource that can be referenced by a URL and the request of such URL results in the return of the segment as the entity body of the request response message. Segments may comprise multiple groups of pictures (GoPs). Each GoP may further comprise multiple fragments where the segment indexing provides time/byte-offset information for each fragment, i.e., the unit of indexing is a fragment.

Fragments or portions of fragments may be requested through parallel TCP connections to increase throughput. This can mitigate problems that arise when sharing connections on a bottleneck link or when connections are lost due to congestion, thus increasing overall speed and reliability of delivery, which can substantially improve the speed and reliability of the content zapping time. Bandwidth can be traded for latency by over-requesting, but care should be taken to avoid making requests too far into the future that can increase the risk of starvation.

Multiple requests for segments on the same server may be pipelined (making next request before current request completes) to avoid repetitious TCP startup delays. Requests for consecutive fragments may be aggregated into one request.

Some CDNs prefer large files and may trigger background fetches of an entire file from an origin server when first seeing a range request. Most CDNs will, however, serve range requests from cache if the data is available. It may therefore be advantageous to have some portion of the client requests be for a whole segment file. These requests can later be cancelled if necessary.

Valid switch points may be seek points, specifically RAPs for example, in the target stream. Different implementations are possible such as fixed GoP structures or alignment of RAPs across streams (based on the beginning of the media or based on the GoPs).

In one embodiment, segments and GoPs may be aligned across different rate streams. In this embodiment, GoPs may be of variable size and may contain multiple fragments, but fragments are not aligned between the different rate streams.

In some embodiments, file redundancy may be employed to advantage. In these embodiments, an erasure code is applied to each fragment to generate redundant versions of the data. Preferably, the source formatting is not changed due to the usage of FEC, and additional repair segments, for example as dependent representation of the original representation, containing FEC repair data are generated and made available as an additional step in the ingestion system. The client, which is able to reconstruct a fragment using only source data for that fragment, may only request source data for the fragment within the segment from the servers. If the servers are unavailable or the connection to the servers are slow, which can be determined either before or after the request for source data, additional repair data may be requested for the fragment from the repair segment, which decreases the time to reliably deliver enough data to recover the fragment, possibly using FEC decoding to use a combination of received source and repair data to recover the source data of the fragment. Furthermore, additional repair data can be requested to allow recovery of the fragment if a fragment becomes urgent, i.e., its playout time becomes imminent, which increases the data share for that fragment on a link but is more efficient than closing other connections on the link to free up bandwidth. This may also mitigate the risk of starvation from the use of parallel connections.

The fragment format may be a stored stream of real time transport protocol (RTP) packets with audio/video synchronization achieved through real time transport control protocol RTCP.

The segment format may also be a stored stream of MPEG-2 TS packets with audio/video synchronization achieved MPEG-2 TS internal timing.

1. Using Signaling and/or Block Creation to Make Streaming More Efficient

A number of features can be used or not, in a block-request streaming system, to provide for improved performance. Performance can be related to the ability to playout a presentation without stalling, obtaining media data within bandwidth constraints, and/or doing so within limited processor resources at a client, server and/or ingestion system. Some of these features will now be described.

2. Indexing within Segments

In order to formulate partial GET requests for Movie Fragments, the client may be informed of the byte offset and start time in decoding or presentation time of all media components contained in the fragments within the file or segment and also which fragments begin or contain a Random Access Points (and so are suitable to be used as switch points between alternative representations), wherein this information is often referred to as the segment indexing or segment map. The start time in decoding or presentation time may be expressed directly or may be expressed as deltas relative to a reference time.

This time and byte offset indexing information may require at least 8 bytes of data per movie fragment. As an example, for a two hour movie contained within a single file, with 500 ms movie fragments, this would be a total of about 112 kilobytes of data. Downloading all of this data when starting a presentation may result in a significant additional startup delay. However, the time and byte offset data can be encoded hierarchically, so that the client can quickly find a small chunk of time and offset data relevant to the point in the presentation at which it wishes to start. The information may also be distributed within a segment such that some refinement of the segment index may be located interleaved with media data.

Note that if the a representation is segmented timewise into multiple segments, the use of this hierarchical coding may not be necessary, as the complete time and offset data for each segment may already be quite small. For example, if segments are one minute instead of two hours in the above example, the time-byte offset indexing information is around 1 kilobyte of data, which can typically fit within a single TCP/IP packet.

3. Different Options are Possible to Add Fragment Time and Byte Offset Data to a 3GPP File:

First, the Movie Fragment Random Access Box ('MFRA') may be used for this purpose. The MFRA provides a table, which may assist readers in finding random access points in a file using movie fragments. In support of this function, the MFRA incidentally contains the byte offsets of MFRA boxes containing random access points. The MFRA may be placed at or near the end of the file, but this is not necessarily the case. By scanning from the end of the file for a Movie Fragment Random Access Offset Box and using the size information in it, one may be able to locate the beginning of a Movie Fragment Random Access Box. However, placing the MFRA at the end for HTTP streaming requires typically at least 3-4 HTTP requests to access the desired data: at least one to request the MFRA from the end of the file, one to obtain the MFRA and finally one to obtain the desired fragment in the file. Therefore, placing at the beginning may be desirable as then the MFRA may be downloaded together with the first media data in a single request. Also, using the MFRA for HTTP streaming may be inefficient, since none of the information in the 'MFRA' is needed apart from the time and moof offset and specifying offsets instead of lengths may require more bits.

Second, the Item Location Box ('ILOC') may be used. The 'ILOC' provides a directory of metadata resources in this or other files, by locating their containing file, their offset within that file, and their length. For example, a system might integrate all the externally referenced metadata resources into one file, re-adjusting file offsets and file references accordingly. However, the 'ILOC' is intended for giving the location of metadata so it may be difficult for this to coexist with real metadata.

Last, and perhaps most suitable, is the specification of a new box, referred to as Time Index Box ('TIDX'), specifically dedicated to the purpose of providing exact fragment times or durations and byte offset in an efficient manner. This is described in more detail in the next section. An alternative box with the same functionalities may be the Segment Index Box ('SIDX'). Herein, unless otherwise indicated, these two might be interchangeable, as both boxes provide the ability to provide exact fragment times or durations and byte offset in an efficient manner. The difference between the TIDX and the SIDX are provided below. It should be apparent how to interchange the TIDX boxes and SIDX boxes, as both boxes implement a segment index.

4. Segment Indexing

A segment has an identified start time and an identified number of bytes. Multiple fragments may be concatenated into a single segment and clients may issue requests that identify the specific byte range within the segment that correspond to the required fragment or subset of the fragment. For example, when HTTP is used as the request protocol, then the HTTP Range header may be used for this purpose. This approach requires that the client has access to a "segment index" of the segment that specifies the position within the segment of the different fragments. This "segment index" may be provided as part of the metadata. This approach has the result that far fewer files need to be created and managed compared to the approach where every block is kept in a separate file. Management of the creation, transfer and storage of very large numbers of files (which could extend to many thousands for a 1 hour presentation, say) can be complex and error-prone and so reduction in the number of files represents an advantage.

If the client only knows the desired start time of a smaller portion of a segment, it might request the whole file, then read the file through to determine the appropriate playout starting location. To improve bandwidth usage, segments can include an index file as metadata, where the index file maps the byte ranges of individual blocks with the time ranges that the blocks correspond to, called segment indexing or segment map. This metadata can be formatted as XML data or they may be binary, for example following the atom and box structure of the 3GPP file format. The indexing can be simple, wherein the time and byte ranges of each block are absolute relative to the start of the file, or they can be hierarchical, wherein some blocks are grouped into parent blocks (and those into grandparent blocks, etc.) and the time and byte range for a given block is expressed relative to the time and/or byte range of the block's parent block.

5. Example Indexing Map Structure

In one embodiment, the original source data for one representation of a media stream may be contained in one or more media files herein called a "media segment", wherein each media segment contains the media data used to playback a continuous time segment of the media, e.g., 5 minutes of the media playback.

Figure 22:
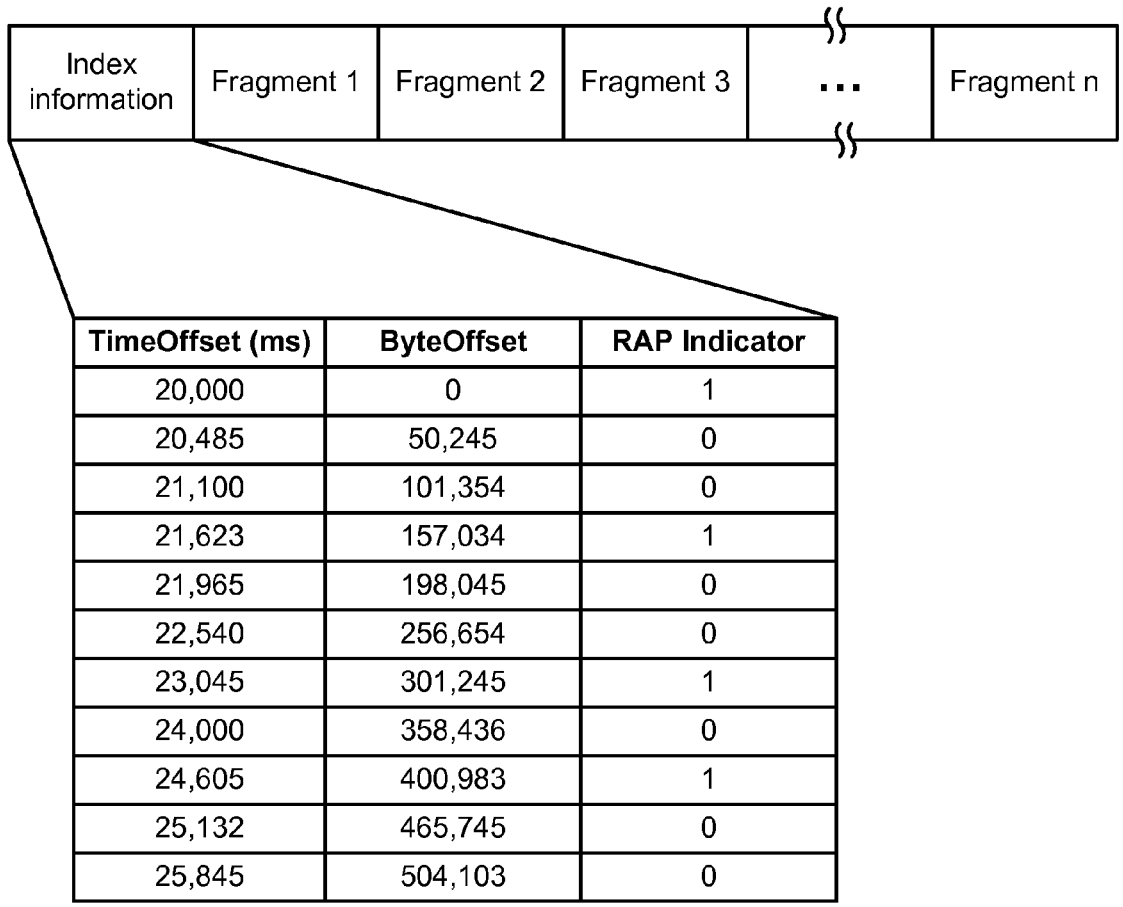
FIG. 22 illustrates details of a typical source segment, as might be stored in the content store illustrated in FIG. 18.

FIG. 22 shows an example overall structure of a media segment. Within each segment, either at the beginning or spread throughout the source segment, there can also be indexing information, which comprises a time/byte-offset segment map. The time/byte-offset segment map in one embodiment may be a list of time/byte-offset pairs (T($\mathbf{0}$), B($\mathbf{0}$)), (T($\mathbf{1}$), B($\mathbf{1}$)), ..., (T(i), B(i)), ..., (T(n),B(n)), wherein T(i−1) represents a start time within the segment for playback of the i-th fragment of media relative to initial start time of the media amongst all media segments, T(i) represents an end time for the i-th fragment (and thus the start time for the next fragment), and the byte-offset B(i−1) is the corresponding byte index of the beginning of the data within this source segment where the i-th fragment of media starts relative to the beginning of the source segment, and B(i) is the corresponding end byte index of the i-th fragment (and thus the index of the first byte of the next fragment). If the segment contains multiple media components, then T(i) and B(i) may be provided for each component in the segment in an absolute way or they may be expressed relative to another media component that serves a reference media component.

In this embodiment, the number of fragments in the source segment is n, where n may vary from segment to segment.

In another embodiment, the time offset in the segment index for each fragment may be determined with absolute start time of the first fragment and the durations of each fragment. In this case, the segment index may document the start time of the first fragment and the duration of the all fragments that are included in the segment. The segment index may also only document a subset of the fragments. In that case, the segment index documents the duration of a subsegment that is defined as one or more consecutive fragments, ending either at the end of the containing segment, or at the beginning of the next subsegment.

For each fragment, there may also be a value that indicates whether or not the fragment starts at or contains a seek point, i.e., at a point wherein no media after that point depends on any media previous to that point, and thus the media from that fragment forward can be played out independently of previous fragments. Seek points are, in general, points in the media where playout can start independently of all previous media. FIG. 22 also shows a simple example of possible segment indexing for a source segment. In that example, the time offset value is in units of milliseconds, and thus the first fragment of this source segment starts 20 seconds from the beginning of the media, and the first fragment has a playout time of 485 milliseconds. The byte offset of the start of the first fragment is 0, and the byte offset of the end of the first fragment/start of the second fragment is 50,245, and thus the first fragment is of size 50,245 bytes. If the fragment or the subsegment does not start with a random access point, but the random access point is contained in the fragment or subsegment, then the decoding time or presentation time difference between the start time and the actual RAP time may be given. This enables that in case of switching to this media segment, the client can accurately know the time until the switch from representation needs to be presented.

In addition to, or instead of, simple or hierarchical indexing, daisy-chained indexing and/or a hybrid indexing could be used.

Because the sample durations for different tracks might not be the same (for example, video samples might be displayed for 33 ms, whereas an audio sample might last 80 ms), the different tracks in a Movie Fragment might not begin and end at precisely the same time, i.e., the audio may begin slightly before or slightly after the video, with the opposite being true of the preceding fragment, to compensate. To avoid ambiguity, the timestamps specified in the time and byte offset data may be specified relative to a particular track and this may be the same track for each representation. Usually this will be the video track. This allows the client to identify exactly the next video frame when it is switching representations.

Care may be taken during presentation to maintain a strict relationship between track timescales and presentation time, to ensure smooth playout and maintenance of audio/video synchronization despite the above issue.

Two specific example of a box that contains a segment map are provided below, one referred to as time index box ('TIDX') and one referred to as ('SIDX'). The definition follows the box structure according to the ISO base media file format. Other designs for such boxes to define similar syntax and with the same semantics and functionality should be apparent to the reader.

6. Time Index Box

Definition

Box Type: 'tidx'

Container: File

Mandatory: No

Quantity: Any number zero or one

The Time Index Box may provide a set of time and byte offset indices that associate certain regions of the file with certain time intervals of the presentation. The Time Index Box may include a targettype field, which indicates the type of the referenced data. For example, a Time Index Box with targettype "moof" provides an index to the Media Fragments contained in the file in terms of both time and byte offsets. A Time Index Box with targettype of Time Index Box can be used to construct a hierarchical time index, allowing users of the file to quickly navigate to the required portion of the index.

The segment index may for example contain the following syntax:

```
aligned(8) class TimeIndexBox
extends FullBox('frai') {
unsigned int(32) targettype;
    unsigned int(32) time_reference_track_ID;
unsigned int(32) number_of_elements;
unsigned int(64) first_element_offset;
unsigned int(64) first_element_time;
for(i=1; i <= number_of_elements; i++)
{
  bit (1)     random_access_flag;
  unsigned int(31) length;
  unsigned int(32) deltaT;
}
}
```

Semantics targettype: is the type of the box data referenced by this Time Index Box. This can be either Movie Fragment Header ('moof') or Time Index Box ('tidx').

time-reference_track_id: indicates the track with respect to which the time offsets in this index are specified.

number_of_elements: the number of elements indexed by this Time Index Box.

first_element_offset: The byte offset from the start of the file of the first indexed element.

first_element_time: The start time of the first indexed element, using the timescale specified in the Media Header box of the track identified by the time_reference_track_id.

random_access_flag: One if the start time of the element is a random access point. Zero otherwise.

length: The length of the indexed element in bytes deltaT: The difference in terms of the timescale specified in the Media Header box of the track identified by the time_reference_track_id between the start time of this element and the start time of the next element.

7. Segment Index Box

The Segment Index Box ('sidx') provides a compact index of the movie fragments and other Segment Index Boxes in a segment. There are two loop structures in the Segment Index Box. The first loop documents the first sample of the subsegment, that is, the sample in the first movie fragment referenced by the second loop. The second loop provides an index of the subsegment. The container for 'sidx' box is the file or segment directly. The syntax might be as follows:

```
aligned(8) class SegmentIndexBox extends
FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32)     track_ID;
        if (version==0)
        {
           unsigned int(32)     decoding_time;
        } else
        {
           unsigned int(64)     decoding_time;
        }
    }
    for(i=1; i <= reference_count; i++)
    {
        bit (1)              reference_type;
        unsigned int(31)     reference_offset;
        unsigned int(32)     subsegment_duration;
        bit(1)               contains_RAP;
        unsigned int(31)     RAP_delta_time;
    }
}
```

Semantics:

reference_track_ID provides the track_ID for the reference track.

track_count: the number of tracks indexed in the following loop (1 or greater);

reference_count: the number of elements indexed by second loop (1 or greater);

track_ID: the ID of a track for which a track fragment is included in the first movie fragment identified by this index; exactly one track_ID in this loop is equal to the reference_track_ID;

decoding_time: the decoding time for the first sample in the track identified by track_ID in the movie fragment referenced by the first item in the second loop, expressed in the timescale of the track (as documented in the timescale field of the Media Header Box of the track);

reference_type: when set to 0, indicates that the reference is to a movie fragment ('moof') box; when set to 1, indicates that the reference is to a segment index ('sidx') box;

reference_offset: the distance in bytes from the first byte following the containing Segment Index Box, to the first byte of the referenced box;

subsegment_duration: when the reference is to Segment Index Box, this field carries the sum of the subsegment_duration fields in the second loop of that box; when the reference is to a movie fragment, this field carries the sum of the sample durations of the samples in the reference track, in the indicated movie fragment and subsequent movie fragments up to either the first movie fragment documented by the next entry in the loop, or the end of the subsegment, whichever is earlier; the duration is expressed in the timescale of the track (as documented in the timescale field of the Media Header Box of the track);

contains_RAP: when the reference is to a movie fragment, then this bit may be 1 if the track fragment within that movie fragment for the track with track_ID equal to reference_track_ID contains at least one random access point, otherwise this bit is set to 0; when the reference is to a segment index, then this bit is set to 1 only if any of the references in that segment index have this bit set to 1, and 0 otherwise;

RAP_delta_time: if contains_RAP is 1, provides the presentation (composition) time of a random access point (RAP); reserved with the value 0 if contains_RAP is 0. The time is expressed as the difference between the decoding time of the first sample of the subsegment documented by this entry and the presentation (composition) time of the random access point, in the track with track_ID equal to reference_track_ID.

8. Differences between TIDX and SIDX

The SIDX and the SIDX provide the same functionality with respect to indexing. The first loop of the SIDX provides in addition global timing for the first movie fragment, but the global timing may as well be contained in the movie fragment itself, either absolute or relative to the reference track.

The second loop of the SIDX implements the functionality of the TIDX. Specifically, the SIDX permits to have a mixture of targets for the reference for each index referred to by reference_type, whereas the TIDX only references either only TIDX or only MOOF. The number of elements in TIDX corresponds to the reference_count in SIDX, the time-reference_track_id in TIDX corresponds to reference_track_ID in SIDX, the tfirst_element_offset in TIDX corresponds to the reference_offset in the first entry of the second loop, the first_element_time in TIDX corresponds to the decoding_time of the reference_track in the first loop, the random_access_flag in TIDX corresponds to the contains_RAP in the SIDX with the additional freedom that in the SIDX the RAP may not necessarily be placed at the start of the fragment, and therefore requiring the RAP_delta_time, the length in TIDX corresponds to the reference_offset in SIDX and finally the deltaT in TIDX corresponds to the subsegment_duration in SIDX. Therefore the functionalities of the two boxes are equivalent.

9. Variable Block Sizing and Sub-GoP Blocks

For video media, the relationship between video encoding structure and the block structure for requests can be important. For example, if each block begins with a seek point, such as a Random Access Point ("RAP"), and each block represents an equal period of video time, then the positioning of at least some seek points in the video media is fixed and seek points will occur at regular intervals within the video encoding. As is well known to those of skill in the art of video encoding, compression efficiency may be improved if seek points are placed according to relationships between video frames, and in particular, if they are placed at frames that have little in common with previous frames. This requirement that blocks represent equal amounts of time thus places a restriction on the video encoding, such that compression may be sub-optimal.

It is desirable to allow the position of seek points within a video presentation to be chosen by the video encoding system, rather than requiring seek points at fixed positions. Allowing the video encoding system to choose the seek points results in improved video compression and thus a higher quality of video media can be provided using a given available bandwidth, resulting in an improved user experience. Current block-request streaming systems can require that all blocks be of the same duration (in video time), and that each block must begin with a seek point and this is thus a disadvantage of existing systems.

A novel block-request streaming system that provides advantages over the above is now described. In one embodiment, the video encoding process of a first version of the video component may be configured to choose the positions of seek points in order to optimize compression efficiency, but with a requirement that there is a maximum on the duration between seek points. This latter requirement does restrict the choice of seek points by the encoding process and thus reduces compression efficiency. However, the reduction in compression efficiency is small compared to that incurred if regular fixed positions is required for the seek points, provided the maximum on the duration between seek points is not too small (for example, greater than around a second). Furthermore, if the maximum on the duration between seek points is a few seconds, then the reduction in compression efficiency compared to completely free positioning of seek points is generally very small.

In many embodiments, including this embodiment, it may be that some RAPs are not seek points, i.e., there may be a frame that is a RAP that is between two consecutive seek points that is not chosen to be a seek point, for example because the RAP is too close in time to the surrounding seek points, or because the amount of media data between the seek point preceding or following the RAP and the RAP is too small.

The position of seek points within all other versions of the media presentation may be constrained to be the same as the seek points in a first (for example, the highest media data rate) version. This may reduce the compression efficiency for these other version compared to allowing the encoder free choice of seek points.

The use of seek points typically required a frame to be independently decodable, which generally results in a low compression efficiency for that frame. Frames that are not required to be independently decodable can be encoded with reference to data in other frames, which generally increases compression efficiency for that frame by an amount that is dependent on the amount of commonality between the frame to be encoded and the reference frames. Efficient choice of seek point positioning preferentially chooses as a seek point frame a frame that has low commonality with previous frames and thereby minimizes the compression efficiency penalty incurred by encoding the frame in a way that is independently decodable.

However, the level of commonality between a frame and potential reference frames is highly correlated across different representations of the content, since the original content is the same. As a result, the restriction of seek points in other variants to be the same positions as the seek points in the first variant may not make a large difference in compression efficiency.

The seek point structure preferably is used to determine the block structure. Preferably, each seek point determines the start of a block, and there may be one or more blocks that encompass the data between two consecutive seek points. Since the duration between seek points is not fixed for encoding with good compression, not all blocks are required to have the same playout duration. In some embodiments, blocks are aligned between versions of the content—that is, if there is a block spanning a specific group of frames in one version of the content, then there is a block spanning the same group of frames in another version of the content. The blocks for a given version of the content do not overlap and every frame of the content is contained within exactly one block of each version. In other embodiments, only blocks that contain seek points are aligned across different versions.

An enabling feature that allows the efficient use of variable durations between seek points, and thus variable duration GoPs, is the segment indexing or segment map that can be included in a segment or provided by other means to a client, i.e., this is metadata associated with this segment in this representation that may be provided comprising the start time and duration of each block of the presentation. The client may use this segment indexing data when determining the block at which to start the presentation when the user has requested that the presentation start at a particular point that is within a segment. If such metadata is not provided, then presentation can begin only at the beginning of the content, or at a random or approximate point close to the desired point (for example by choosing the starting block by dividing the requested starting point (in time) by the average block duration to give the index of the starting block).

In one embodiment, each block may be provided as a separate file. In another embodiment, multiple consecutive blocks may be aggregated into a single file to form a segment. In this second embodiment, metadata for each version may be provided comprising the start time and duration of each block and the byte offset within the file at which the block begins. This metadata may be provided in response to an initial protocol request, i.e., available separately from the segment or file, or may be contained within the same file or segment as the blocks themselves, for example at the beginning of the file. As will be clear to those of skill in the art, this metadata may be encoded in a compressed form, such as gzip or delta encoding or in binary form, in order to reduce the network resources required to transport the metadata to the client.

FIG. 22 shows an example of segment indexing where the blocks are variable size, and where the scope of blocks is a partial GoP, i.e., a partial amount of the media data between one RAP and the next RAP. In this example, the seek points are indicated by the RAP indicator, wherein a RAP indicator value of 1 indicates that the block starts with or contains a RAP, or seek point, and wherein a RAP indicator of 0 indicates that the block does not contain a RAP or seek point. In this example, the first three blocks, i.e., bytes 0 through 157, 033, comprise the first GoP, which has a presentation duration of 1.623 seconds, with a presentation time running from 20 seconds into the content to 21.623 seconds. In this example, the first of the three first blocks comprises 0.485 seconds of presentation time, and comprises the first 50,245 bytes of the media data in the segment. In this example, blocks 4, 5, and 6 comprise the second GoP, blocks 7 and 8 comprise the third GoP, and blocks 9, 10 and 11 comprise the fourth GoP. Note that there may be other RAPs in the media data that are not designated as seek points, and are thus not signaled as RAPs in the segment map.

Referring again to FIG. 22, if the client or receiver wants to access the content starting at time offset approximately 22 seconds into the media presentation, then the client could first use other information, such as the MPD described in more detail later, to first determine that the relevant media data is within this segment. The client can download the first portion of the segment to obtain the segment indexing, which in this case is just a few bytes, for example using an HTTP byte range request. Using the segment indexing, the client may determine that the first block that it should download is the first block with a time offset that is at most 22 seconds and that starts with a RAP, i.e., is a seek point. In this example, although block 5 has a time offset that is smaller than 22 seconds, i.e., its time offset is 21.965 seconds, the segment indexing indicates that block 5 does not start with a RAP, and thus instead, based on the segment indexing, the client selects to download block 4, since its start time is at most 22 seconds, i.e., its time offset is 21.623 seconds, and it starts with a RAP. Thus, based on the segment indexing, the client will make an HTTP range request starting at byte offset 157,034.

If segment indexing were not available then the client might have to download all previous 157,034 bytes of data before downloading this data, leading to a much longer start-up time, or channel zapping time, and to wasteful downloading of data that is not useful. Alternatively, if segment indexing were not available, the client might approximate where the desired data starts within the segment, but the approximation might be poor and it may miss the appropriate time and then requires the client to go backward, which again increases the start-up delay.

Generally, each block encompasses a portion of the media data that, together with previous blocks, can be played out by a media player. Thus, the blocking structure and the signaling of the segment indexing blocking structure to the client, either contained within the segment or provided to the client through other means, can significantly improve the ability of the client to provide fast channel zapping, and seamless playout in the face of network variations and disruptions. The support of variable duration blocks, and blocks that encompass only portions of a GoP, as enabled by the segment indexing, can significantly improve the streaming experience. For example, referring again to FIG. 22 and the example described above where the client wants to start playout at approximately 22 seconds into the presentation, the client may request, through one or more requests, the data within block 4, and then feed this into media player as soon as it is available to start playback. Thus, in this example, the playout begins as soon as the 41,011 bytes of block 4 are received at the client, thus enabling a fast channel zapping time. If instead the client needed to request the entire GoP before playout was to commence, the channel zapping time would be longer, as this is 144,211 bytes of data.

In other embodiments, RAPs or seek points may also occur in the middle of a block, and there may be data in the segment indexing that indicates where that RAP or seek point is within the block or fragment. In other embodiments, the time offset may be the decode time of the first frame within the block, instead of the presentation time of the first frame within the block.

Figure 23A:
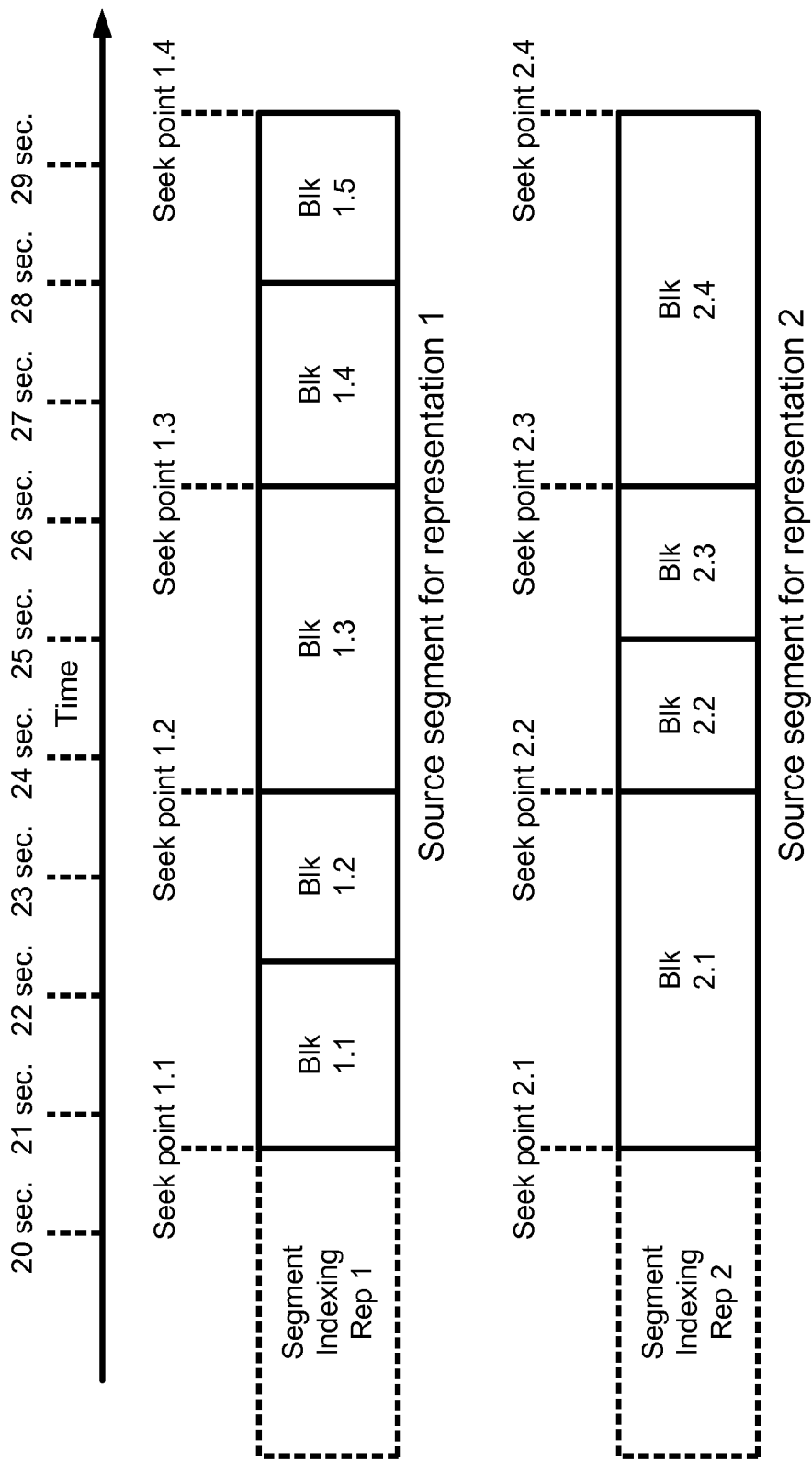
FIG. 23(a) illustrates variable block sizing with aligned seek points over a plurality of versions of a media stream.
Figure 23B:
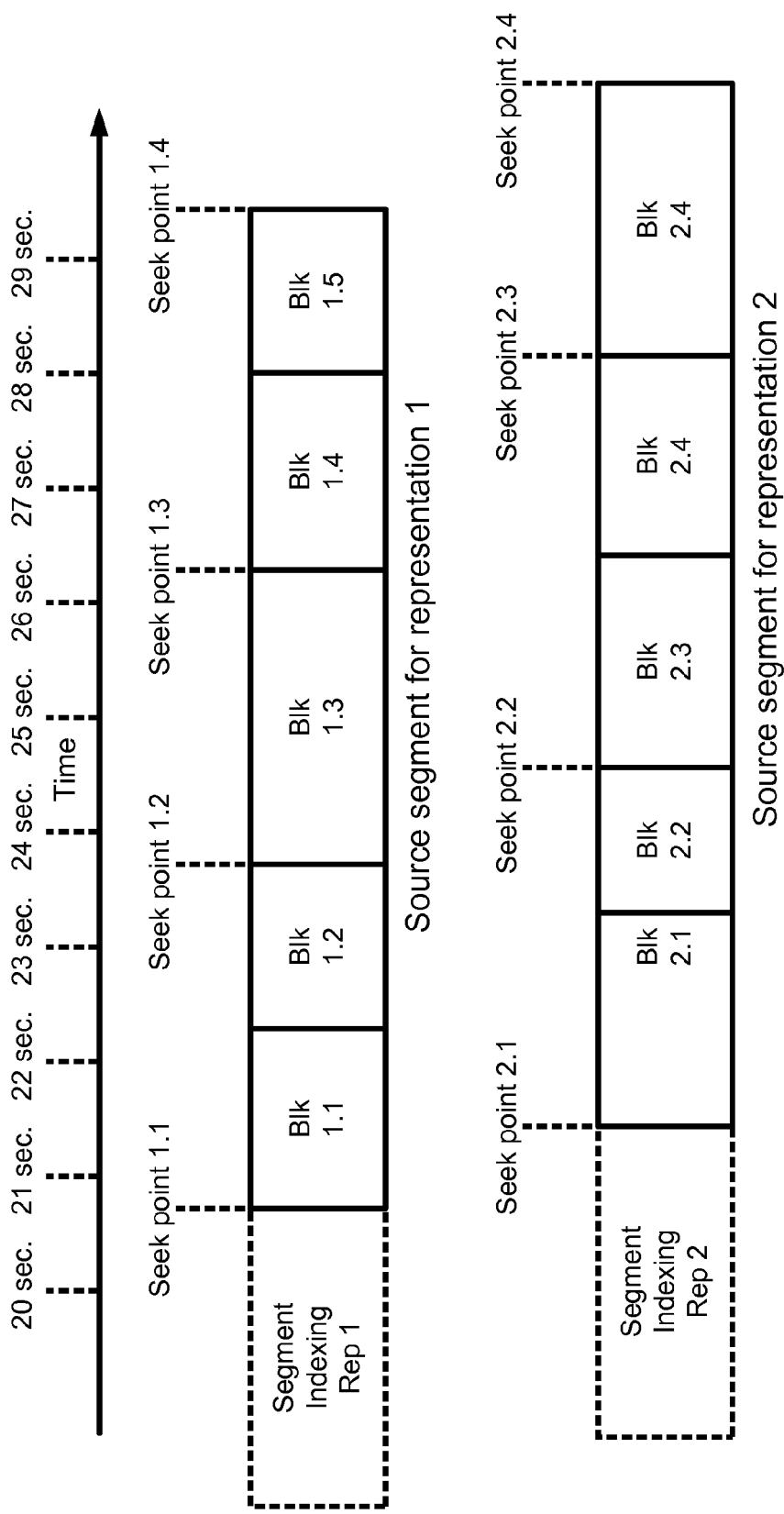
FIG. 23(b) illustrates variable block sizing with non-aligned seek points over a plurality of versions of a media stream.

FIGS. 23(*a*) and (*b*) illustrate an example of variable block sizing an aligned seek point structure across a plurality of versions or representations; FIG. 23(*a*) illustrates variable block sizing with aligned seek points over a plurality of versions of a media stream, while FIG. 23(*b*) illustrates variable block sizing with non-aligned seek points over a plurality of versions of a media stream.

Time is shown across the top in seconds, and the blocks and seek points of the two segments for the two representations are shown from left to right in terms of their timing with respect to this time line, and thus the length of each block shown is proportional to its playout time and not proportional to the number of bytes in the block. In this example, the segment indexing for both segments of the two representations would have the same time offsets for the seek points, but potentially differing numbers of blocks or fragments between seek points, and different byte offsets to blocks due to the different amounts of media data in each block. In this example, if the client wants to switch from representation 1 to representation 2 at presentation time approximately 23 seconds, then the client could request up through block 1.2 in the segment for representation 1, and start requesting the segment for representation 2 starting at block 2.2, and thus the switch could occur at the presentation time coinciding with seek point 1.2 in representation 1, which is at the same time as seek point 2.2 in representation 2.

As should be clear from the foregoing, the block-request streaming system described does not constrain the video encoding to place seek points at specific positions within the content and this mitigates one of the problems of existing systems.

In the embodiments described above it is organized so that the seek points for the various representations of the same content presentation are aligned. However, in many cases, it is preferable to relax this alignment requirement. For example, it is sometimes the case that encoding tools have been used to generate the representations that do not have the capabilities to generate seek point aligned representations. As another example, the content presentation may be encoded into different representations independently, without no seek point alignment between different representations. As another example, a representation may contain more seek points as it has lower rates and more commonly it needs to be switched or it contains seek points to support trick modes such fast forward or rewind or fast seeking. Thus, it is desirable to provide methods that make a block-request streaming system capable of efficiently and seamlessly dealing with non-aligned seek points across the various representations for a content presentation.

In this embodiment, the positions of seek points across representations may not align. Blocks are constructed such that a new block starts at each seek point, and thus there might not be alignment between blocks of different versions of the presentation. An example of such a non-aligned seek point structure between different representations is shown in FIG. 23(*b*). Time is shown across the top in seconds, and the blocks and seek points of the two segments for the two representations are shown from left to right in terms of their timing with respect to this time line, and thus the length of each block shown is proportional to its playout time and not proportional to the number of bytes in the block. In this example, the segment indexing for both segments of the two representations would have potentially different time offsets for the seek points, and also potentially differing numbers of blocks or fragments between seek points, and different byte offsets to blocks due to the different amounts of media data in each block. In this example, if the client wants to switch from representation 1 to representation 2 at presentation time approximately 25 seconds, then the client could request up through block 1.3 in the segment for representation 1, and start requesting the segment for representation 2 starting at block 2.3, and thus the switch would occur at the presentation coinciding with seek point 2.3 in representation 2, which is in the middle of the playout of block 1.3 in representation 1, and thus some of the media for block 1.2 would not be played out (although the media data for the frames of block 1.3 that are not played out may have to be loaded into the receiver buffer for decoding other frames of block 1.3 that are played out).

In this embodiment, the operation of block selector 1823 may be modified such that whenever it is required to select a block from a representation that is different from the previously selected version, the latest block whose first frame is not later than the frame subsequent to the last frame of the last selected block is chosen.

This last described embodiment may eliminate the requirement to constrain the positions of seek points within versions other than the first version and thus increases compression efficiency for these versions resulting in a higher quality presentation for a given available bandwidth and this an improved user experience. A further consideration is that video encoding tools which perform the function of seek point alignment across multiple encodings (versions) of the content may not be widely available and therefore an advantage of this latest described embodiment is that currently available video encoding tools may be used. Another advantage is that encoding of different versions of the content may proceed in parallel without any need for coordination between encoding processes for the different versions. Another advantage is that additional versions of the content may be encoded and added to the presentation at a later time, without having to provide the encoding tools with the lists of specific seek point positions.

Generally, where pictures are encoded as groups of pictures (GoPs), the first picture in the sequence can be a seek point, but that need not always be the case.

Media Presentation Data Model

Figure 24:
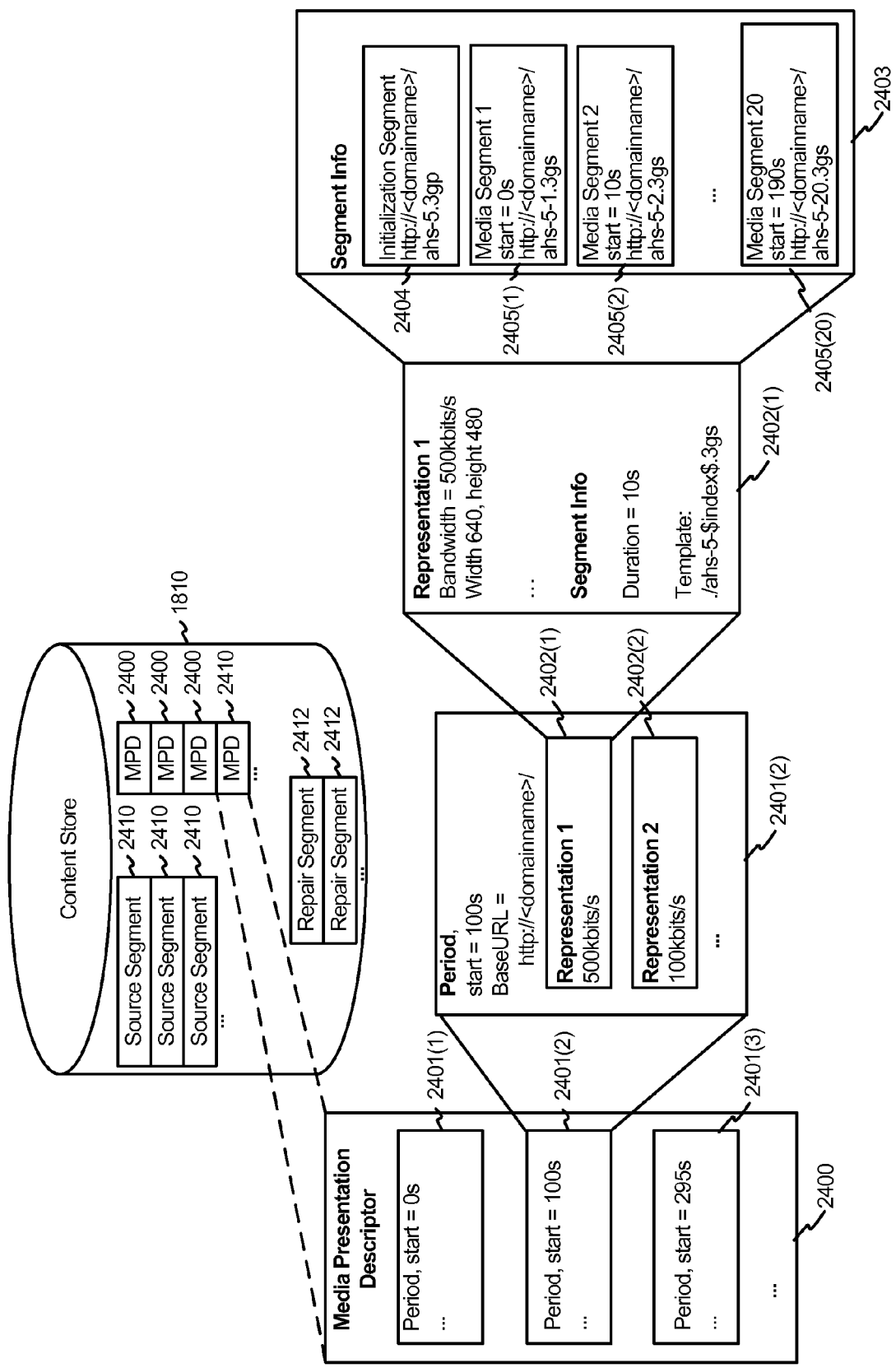
FIG. 24 illustrates possible structures of the content store shown in FIG. 18, including segments and media presentation descriptor ("MPD") files, and a breakdown of segments, timing, and other structure within an MPD file.

FIG. 24 illustrates possible structures of the content store shown in FIG. 18, including segments and media presentation description ("MPD") files, and a breakdown of segments, timing, and other structure within an MPD file. Details of possible implementations of MPD structures or files will now be described. In many examples, the MPD is described as a file, but non-file structures can be used as well.

As illustrated there, content store 1810 holds a plurality of source segments 2410, MPDs 2400 and repair segments 2412. An MPD might comprise period records 2401, which in turn might comprise representation records 2402, that contain segment information 2403 such as references to initialization segments 2404 and media segments 2405.

Figure 25:
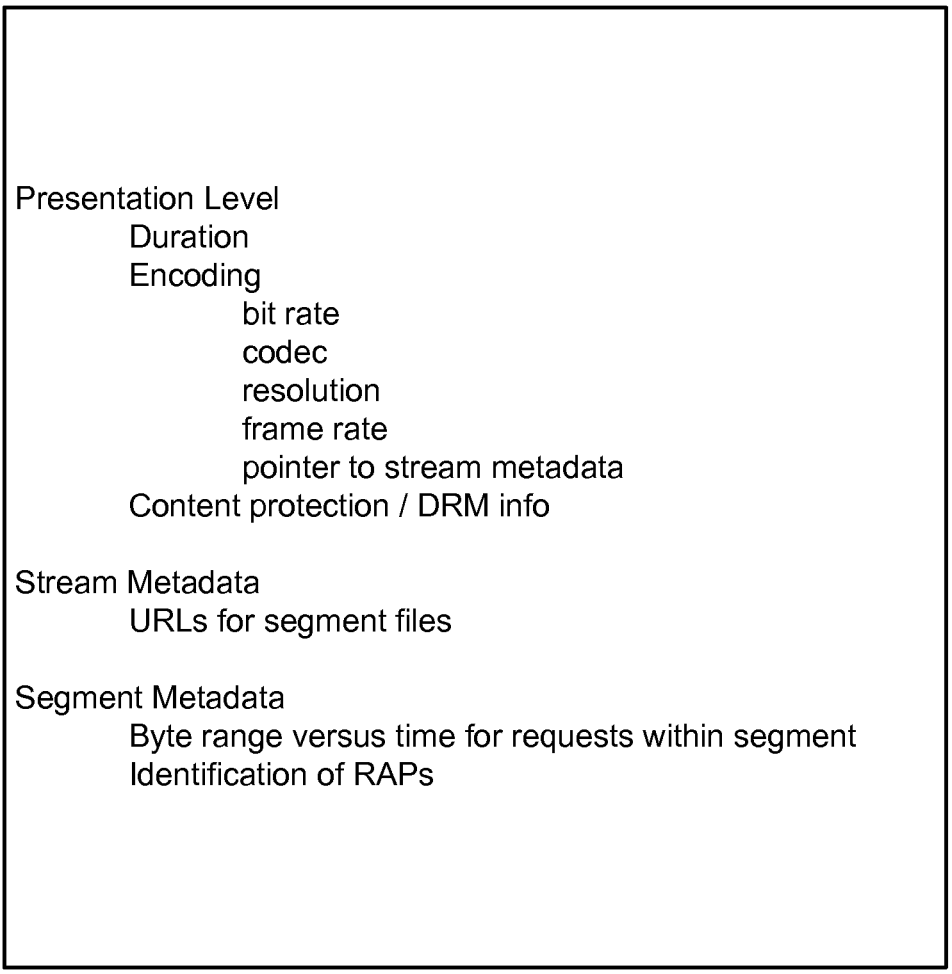
FIG. 25 illustrates a Metadata Table.
Figure 26:
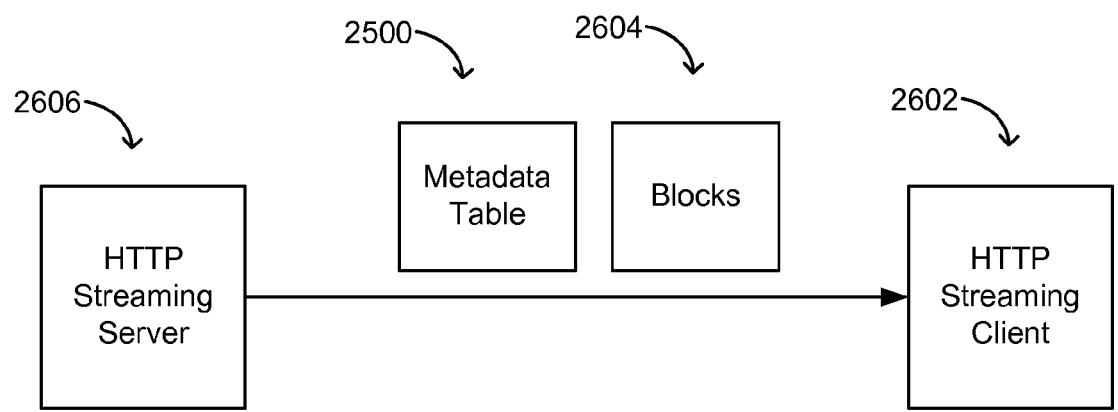
FIG. 26 illustrates the transmission of Blocks and Metadata Table from server to client.

FIG. 25 illustrates an example metadata table 2500, while FIG. 26 illustrates an example of how an HTTP streaming client 2602 obtains metadata table 2500 and media blocks 2604 over a connection to an HTTP streaming server 2606.

In the methods described herein, a "Media Presentation Description" is provided that comprises information regarding the representations of the media presentation that are available to the client. Representations may be alternatives in a sense that the client selects one out the different alternatives, or they may be complementary in a sense that the client selects several of the representations, each possibly also from a set of alternatives, and presents them jointly. The representations may advantageously be assigned to groups, with the client programmed or configured to understand that, for representations in one group, they are each alternatives to each other, whereas representations from different groups are such that more than one representation is to be presented jointly. In other words, if there are more than one representation in a group, the client picks one representation from that group, one representation from the next group, etc., to form a presentation.

Information describing representations may advantageously include details of the applied media codecs including profiles and levels of those codecs which are required to decode the representation, video frame rates, video resolution and data rates. The client receiving the Media Presentation Description may use this information to determine in advance whether a representation is suitable for decoding or presentation. This represents an advantage because if the differentiating information would only be contained in the binary data of the representation it would be necessary to request the binary data from all representations and to parse and extract the relevant information in order to discover information about its suitability. These multiple requests and the parsing annex extraction of the data may take some time which would result in a long start up time and therefore a poor user experience.

Additionally, the Media Presentation Description may comprise information restricting the client requests based on the time of day. For example for a live service the client may be restricted to requesting parts of the presentation which are close to the "current broadcast time". This represents an advantage since for live broadcast it may be desirable to purge data from the serving infrastructure for content that was broadcast more than a provided threshold before the current broadcast time. This may be desirable for the reuse of storage resources within the serving infrastructure. This may also be desirable depending on the type of service offered, e.g., in some cases a presentation may be made available only live because of a certain subscription model of receiving client devices, whereas other media presentations may be made available live and on-demand, and other presentations may be made available only live to a first class of client devices, only on-demand to a second class of client devices, and a combination of either live or on-demand to a third class of client devices. The methods described in the Media Presentation Data Model (below) allow the client to be informed of such policies so that the client can avoid making requests and adjusting the offerings to the user, for data that may not be available in the serving infrastructure. As an alternative, for example, the client may present a notification to the user that this data is not available.

In a further embodiment of the invention the media segments may be compliant to the ISO Base Media File Format described in ISO/IEC 14496-12 or derived specifications (such as the 3GP file format described in 3GPP Technical Specification 26.244). The Usage of 3GPP File Format section (above) describes novel enhancements to the ISO Base Media File Format permitting efficient use of the data structures of this file format within a block-request streaming system. As described in this reference, information may be provided within the file permitting fast and efficient mapping between time segments of the media presentation and byte ranges within the file. The media data itself may be structured according to the Movie Fragment construction defined in ISO/IEC 14496-12. This information providing time and byte offsets may be structured hierarchically or as a single block of information. This information may be provided at the start of the file. The provision of this information using an efficient encoding as described in the Usage of 3GPP File Format section results in the client being able to retrieve this information quickly, for example using an HTTP partial GET requests, in the case that the file download protocol used by the block request streaming system is HTTP, which results in a short start up, seek or stream switch time and therefore in an improved user experience.

The representations in a media presentation are synchronized in a global timeline to ensure seamless switching across representations, typically being alternatives, and to ensure synchronous presentation of two or more representations. Therefore, sample timing of contained media in representations within an adaptive HTTP streaming media presentation can be related to a continuous global timeline across multiple segments.

A block of encoded media containing media of multiple types, for example audio and video, may have different presentation end times for the different types of media. In a block request streaming system, such media blocks may be played out consecutively in such a way that each media type is played continuously and thus media samples of one type from one block may be played out before media samples of another type of the preceding block, which is referred to herein as "continuous block splicing." As an alternative, such media blocks may be played out in such a way that the earliest sample of any type of one block is played after the latest sample of any type of the preceding block, which is referred to herein as "discontinuous block splicing." Continuous block splicing may be appropriate when both blocks contain media from the same content item and the same representation, encoded in sequence, or in other cases. Typically, within one representation continuous block splicing may be applied when splicing two blocks. This is advantageous as existing encoding can be applied and segmentation can be done without needing to align media tracks at block boundaries.

1. Media Presentation Description

A media presentation may be viewed as a structured collection of files on an HTTP-Streaming server. The HTTP-Streaming client can download sufficient information to present the streaming service to the user. Alternative representations may comprise of one or more 3GP files or parts of 3GP files conforming to the 3GPP file format or at least to a well-defined set of data structures that can be easily converted from or to a 3GP file.

A media presentation may be described by a media presentation description. The Media Presentation Description (MPD) may contain metadata that the client can use to construct appropriate file requests, for example HTTP GET requests, to access the data at appropriate time and to provide the streaming service to the user. The media presentation description may provide sufficient information for the HTTP streaming client to select the appropriate 3GPP files and pieces of files. The units that are signaled to the client to be accessible are referred to as segments.

Among others, a media presentation description may contain elements and attributes as follows.

2. MediaPresentationDescription Element

An Element encapsulating metadata used by the HTTP Streaming Client to provide the streaming service to the end user. The MediaPresentationDescription Element may contain one or more of the following attributes and elements.

Version: Version number for protocol to ensure extensibility.

PresentationIdentifier: Information such that the presentation may be uniquely identified among other presentations. May also contain private fields or names.

UpdateFrequency: Update frequency of the media presentation description, i.e. how often the client may reload the actual media presentation description. If not present, the media presentation may be static. Updating the media presentation may mean that the media presentation cannot be cached.

MediaPresentationDescriptionURI: URI for dating the media presentation description.

Stream: Describes the type of the Stream or media presentation: video, audio, or text. A video stream type may contain audio and may contain text.

Service: Describes the service type with additional attributes. Service types may be live and on-demand. This may be used to inform the client that seeking and access beyond some current time is not permitted.

MaximumClientPreBufferTime: A maximum amount of time the client may pre-buffer the media stream. This timing may differentiate streaming from progressive download if the client is restricted to download beyond this maximum pre-buffer time. The value may not be present indicating that no restrictions in terms of pre-buffering may apply.

SafetyGuardIntervalLiveService: Information on the maximum turn-around time of a live service at the server. Provides an indication to the client what of information already accessible at the current time. This information may be necessary if the client and the server are expected to operate on UTC time and no tight time synchronization is provided.

TimeShiftBufferDepth: Information on how far back the client may move in a live service relative to the current time. By the extension of this depth, time-shift viewing and catch-up services may be permitted without specific changes in service provisioning.

LocalCachingPermitted: This flag indicates if the HTTP Client can cache the downloaded data locally after it has been played.

LivePresentationInterval: Contains time intervals during which the presentation may be available by specifying Start-Times and EndTimes. The StartTime indicates the start time of the services and the EndTime indicates the end-time of the service. If the EndTime is not specified, then the end time is unknown at current time and the UpdateFrequency may ensure that the clients gets access to the end-time before the actual end-time of the service.

OnDemandAvailabilityInterval: The presentation interval indicates the availability of the service on the network. Multiple presentation intervals may be provided. The HTTP Client may not be able to access the service outside any specified time window. By the provisioning of the OnDemand Interval, additional time-shift viewing may be specified. This attribute may also be present for a live service. In case it is present for a live service, the server may ensure that the client can access the service as OnDemand Service during all provided availability intervals. Therefore, the LivePresentationInterval may not overlap with any OnDemandAvailabilityInterval.

MPDFileInfoDynamic: Describes the default dynamic construction of files in the media presentation. More details are provided below. The default specification on MPD level may save unnecessary repetition if the same rules for several or all alternative representations are used.

MPDCodecDescription: Describes the main default codecs in the media presentation. More details are provided below. The default specification on MPD level may save unnecessary repetition if the same codecs for several or all representations are used.

MPDMoveBoxHeaderSizeDoesNotChange: A flag to indicate if the MoveBox Header changes in size among the individual files within the entire media presentation. This flag can be used to optimize the download and may only be present in case of specific segment formats, especially those for which segments contain the moov header.

FileURIPattern: A pattern used by the Client to generate Request messages for files within the media presentation. The different attributes permit generation of unique URIs for each of the files within the media presentation. The base URI may be an HTTP URI.

Alternative Representation: Describes a List of Representations.

1. AlternativeRepresentation Element:

An XML Element that encapsulates all metadata for one representation. The AlternativeRepresentation Element may contain the following attributes and elements.

RepresentationID: A unique ID for this specific Alternative Representation within the media presentation.

FilesInfoStatic: Provides an explicit list of the starting times and the URI of all files of one alternative presentation. The static provisioning of the list of files may provide the advantage of an exact timing description of the media presentation, but it may not be as compact, especially if the alternative representation contains many files. Also, the file names may have arbitrary names.

FilesInfoDynamic: Provides an implicit way to construct the list of the starting times and the URI of one alternative presentation. The dynamic provisioning of the list of files may provide the advantage of a more compact representation. If only the sequence of starting times are provided, then the timing advantages also hold here, but the file names are to be constructed dynamically based in the FilePatternURI. If only the duration of each segment is provided then the representation is compact and may be suited for use within live services, but the generation of the files may be governed by global timing.

APMoveBoxHeaderSizeDoesNotChange: A flag that indicates if the MoveBox Header changes in size among the individual files within the Alternative Description. This flag can be used to optimize the download and may only be present in case of specific segment formats, especially those for which segments contain the moov header.

APCodecDescription: Describes the main codecs of files in the alternative presentation.

Media Description Element

MediaDescription: An element that may encapsulate all metadata for the media that is contained in this representation. Specifically it may contain information about the tracks in this alternative presentation as well as recommended grouping of tracks, if applicable. The MediaDescription Attribute contains the following attributes:

TrackDescription: An XML attribute that encapsulates all metadata for the media that is contained in this representation. The TrackDescription Attribute contains the following attributes:

TrackID: A unique ID for the track within the alternative representation. This may be used in case the track is part of a grouping description.

Bitrate: The bitrate of the track.

TrackCodecDescription: An XML attribute that contains all attributes on the codec used in this track. The TrackCodecDescription Attribute contains the following attributes:

MediaName: An attribute defining the media type. The media types include "audio", "video", "text", "application", and "message".

Codec: CodecType including profile and level.

LanguageTag: LanguageTag if applicable.

MaxWidth, MaxHeight: For video, Height and Width of contained video in pixel.

SamplingRate: For audio, sampling rate

GroupDescription: An attribute that provides recommendation to the client for appropriate grouping based on different parameters.

GroupType: A type based on which the client may decide how to group tracks.

The information in a media presentation description is advantageously used by an HTTP streaming client to perform requests for files/segments or parts thereof at appropriate times, selecting the segments from adequate representations that match its capabilities, for example in terms of access bandwidth, display capabilities, codec capabilities, and so on as well as preferences of the user such as language, and so on. Furthermore, as the Media Presentation description describes representations that are time-aligned and mapped to a global timeline, the client may also use the information in the MPD during an ongoing media presentation for initiating appropriate actions to switch across representations, to present representations jointly or to seek within the media presentation.

1. Signaling Segment Start Times

A representation may be split, timewise, into multiple segments. An inter-track timing issue exists between the last fragment of one segment and the next fragment of the next segment. In addition, another timing issue exists in the case that segments of constant duration are used.

Using the same duration for every segment may have the advantage that the MPD is both compact and static. However, every segment may still begin at a Random Access Point. Thus, either the video encoding may be constrained to provide Random Access Points at these specific points, or the actual segment durations may not be precisely as specified in the MPD. It may be desirable that the streaming system does not place unnecessary restrictions on the video encoding process and so the second option may be preferred.

Specifically, if the file duration is specified in the MPD as d seconds, then the n-th file may begin with the Random Access Point at or immediately following time (n−1)d.

In this approach, each file may include information as to the exact start time of the segment in terms of global presentation time. Three possible ways to signal this include:

(1) First, restrict the start time of each segment to the exact timing as specified in the MPD. But then the media encoder may not have any flexibility on the placement of the IDR frames and may require special encoding for file streaming (2) Second, add the exact start time to the MPD for each segment. For the on-demand case, the compactness of MPD may be reduced. For the live case, this may require a regular update of the MPD, which may reduce scalability.

(3) Third, add the global time or the exact start time relative to the announced start time of the representation or the announced start time of the segment in the MPD to the segment in a sense that the segment contains this information. This might be added to a new box dedicated to adaptive streaming. This box may also include the information as provided by the "TIDX" or "SIDX" box. A consequence of this third approach is that when seeking to a particular position near the beginning of one of the segments the client may, based on the MPD, choose the subsequent segment to the one containing the required seek point. A simple response in this case may be to move the seek point forward to the start of the retrieved segment (i.e., to the next Random Access Point after the seek point). Usually, Random Access Points are provided at least every few seconds (and often there is little encoding gain from making them less frequent) and so in the worst case the seek point may be moved to be a few seconds later than specified. Alternatively, the client could determine in retrieving the header information for the segment that the requested seek point is in fact in the previous segment and request that segment instead. This may result in an occasional increase in the time required to execute the seek operation.

2. Accessible Segments List

The media presentation comprises a set of representations each providing some different version of encoding for the original media content. The representations themselves advantageously contain information on the differentiating parameters of the representation compared to other parameters. They also contain, either explicitly or implicitly, a list of accessible segments.

Segments may be differentiated in time-less segments containing metadata only and media segments that primarily contain media data. The Media Presentation Description ("MPD") advantageously identifies and assigns different attributes to each of the segments, either implicitly or explicitly. Attributes advantageously assigned to each segment comprise the period during which a segment is accessible, the resources and protocols through which the segments are accessible. In addition, media segments are advantageously assigned attributes such as the start time of the segment in the media presentation, and the duration of the segment in the media presentation.

Where the media presentation is of type "on-demand", as advantageously indicated by an attribute in the media presentation description such as the OnDemandAvailabilityInterval, then the media presentation description typically describes the entire segments and also provides indication when the segments are accessible and when the segments are not accessible. The start times of segments are advantageously expressed relative to the start of the media presentation such that two clients starting the play-back of the same media presentations, but at different times, can use the same media presentation description as well as the same media segments. This advantageously improves the ability to cache the segments.

Where the media presentation is of type "live", as advantageously indicated by an attribute in the media presentation description such as the attribute Service, then the segments comprising the media presentation beyond the actual time of day are generally not generated or at least not accessible despite the segments are fully described in the MPD. However, with the indication that the media presentation service is of type "live", the client may produce a list of accessible segments along with the timing attributes for a client internal time NOW in wall-clock time based on the information contained in the MPD and the download time of the MPD. The server advantageously operates in a sense that it makes resource accessible such that a reference client operating with the instance of the MPD at wall-clock time NOW can access the resources.

Specifically, the reference client produces a list of accessible segments along with the timing attributes for a client internal time NOW in wall-clock time based on the information contained in the MPD and the download time of the MPD. With time advancing, the client will use the same MPD and will create a new accessible segment list that can be used to continuously playout the media presentation. Therefore, the server can announce segments in an MPD before these segments are actually accessible. This is advantageous, as it reduces frequent updating and downloading of the MPD.

Assume that a list of segments, each with start time, tS, is described either explicitly by a play list in elements such as FileInfoStatic or implicitly by using an element such as FileInfoDynamic. An advantageous method to generate a segment list using FileInfoDynamic is described below. Based on this construction rule, the client has access to a list of URIs for each representation, r, referred to herein as FileURI(r,i), and a start time tS(r,i) for each segment with index i.

The use of information in the MPD to create the accessible time window of segments may be performed using the following rules.

For a service of type "on-demand", as advantageously indicated by an attribute such as Service, if the current wall-clock time at the client NOW is within any range of the availability, advantageously expressed by an MPD element such as OnDemandAvailabilityInterval, then all described segments of this On-Demand presentation are accessible. If the current wall-clock time at the client NOW is outside any range of the availability, then none of the described segments of this On-Demand presentation are accessible.

For a service of type "live", as advantageously indicated by an attribute such as Service, the start time tS(r,i) advantageously expresses the time of availability in wall-clock time. The availability start time may be derived as a combination of the live service time of the event and some turn-around time at the server for capturing, encoding, and publishing. The time for this process may, for example, be specified in the MPD, for example using a safety guard interval tG specified for example specified as SafetyGuardIntervalLiveService in the MPD. This would provide the minimum difference between UTC time and the availability of the data on the HTTP streaming server. In another embodiment, the MPD explicitly specifies the availability time of the segment in the MPD without providing the turn-around time as a difference between the event live time and the turn-around time. In the following descriptions, it is assumed that any global times are specified as availability times. One or ordinary skill in art of live media broadcasting can derive this information from suitable information in the media presentation description after reading this description.

If the current wall-clock time at the client NOW is outside any range of the live presentation interval, advantageously expressed by an MPD element such as LivePresentationInterval, then none of the described segments of this live presentation are accessible. If the current wall-clock time at the client NOW is within the live presentation interval then at least certain segments of the described segments of this live presentation may be accessible.

The restriction of the accessible segments is governed by the following values:

The wall-clock time NOW (as available to the client).

The permitted time-shift buffer depth tTSB for example specified as TimeShiftBufferDepth in the media presentation description.

A client at relative event time $t_1$ may only be allowed to request segments with start times tS(r, i) in the interval of (NOW-tTSB) and NOW or in an interval such that the end time of the segment with duration d is also included resulting in an interval of (NOW-tTSB-d) and NOW.

3. Updating the MPD

In some embodiments, the server does not know in advance the file or segment locator and start times of the segments as for example the server location will change, or the media presentation includes some advertisement from a different server, or the duration of the media presentation is unknown, or the server wants to obfuscate the locator for the following segments.

In such embodiments, the server might only describe segments that are already accessible or get accessible shortly after this instance of the MPD has been published. Furthermore, in some embodiments, the client advantageously consumes media close to the media described in the MPD such that the user experiences the contained media program as close as possible to the generation of the media content. As soon as the client anticipates that it reaches the end of the described media segments in the MPD, it advantageously requests a new instance of the MPD to continue continuous play-out in the expectation that the server has published a new MPD describing new media segments. The server advantageously generates new instances of the MPD and updates the MPD such that clients can rely on the procedures for continuous updates. The server may adapt its MPD update procedures along with the segment generation and publishing to the procedures of a reference client that acts as a common client may act.

If a new instance of the MPD only describes a short time advance, then the clients need to frequently request new instances of MPD. This may result in scalability problems and unnecessary uplink and downlink traffic due to unnecessary frequent requests.

Therefore, it is relevant on the one hand to describe segments as far as possible into the future without necessarily making them accessible yet, and on the other hand to enable unforeseen updates in the MPD to express new server locations, permit insertion of new content such as advertisements or to provide changes in codec parameters.

Furthermore, in some embodiments, the duration of the media segments may be small, such as in the range of several seconds. The duration of media segments is advantageously flexible to adjust to suitable segment sizes that can be optimized to delivery or caching properties, to compensate for end-to-end delay in live services or other aspects that deal with storage or delivery of segments, or for other reasons. Especially in cases where the segments are small compared to the media presentation duration, then a significant amount of media segment resources and start times need to be described in the media presentation description. As a result, the size of the media presentation description may be large which may adversely affect the download time of the media presentation description and therefore affect the start-up delay of the media presentation and also the bandwidth usage on the access link. Therefore, it is advantageous to not only permit the description of a list of media segments using playlists, but also permit the description by using templates or URL construction rules. Templates and URL construction rules are used synonymously in this description.

In addition, templates may advantageously be used to describe segment locators in live cases beyond the current time. In such cases, updates of the MPD are per se unnecessary as the locators as well as the segment list are described by the templates. However, unforeseen events may still happen that require changes in the description of the representations or the segments. Changes in an adaptive HTTP streaming media presentation description may be needed when content from multiple different sources is spliced together, for example, when advertising has been inserted. The content from different sources may differ in a variety of ways. Another reason, during live presentations, is that it may be necessary to change the URLs used for content files to provide for fail-over from one live origin server to another.

In some embodiments, it is advantageous that if the MPD is updated, then the updates to the MPD are carried out such that the updated MPD is compatible with the previous MPD in the following sense that the reference client and therefore any implemented client generates an identically functional list of accessible segments from the updated MPD for any time up to the validity time of the previous MPD as it would have done from the previous instance of the MPD. This requirement ensures that (a) clients may immediately begin using the new MPD without synchronization with the old MPD, since it is compatible with the old MPD before the update time; and (b) the update time need not be synchronized with the time at which the actual change to the MPD takes place. In other words, updates to the MPD can be advertised in advance and the server can replace the old instance of the MPD once new information is available without having to maintain different versions of the MPD.

Two possibilities may exist for media timing across an MPD update for a set of representations or all representations. Either (a) the existing global timeline continues across the MPD update (referred to herein as a "continuous MPD update"), or (b) the current timeline ends and a new timeline begins with the segment following the change (referred to herein as a "discontinuous MPD update").

The difference between these options may be evident when considering that the tracks of a Media Fragment, and hence of a Segment, generally do not begin and end at the same time because of the differing sample granularity across tracks. During normal presentation, samples of one track of a fragment may be rendered before some samples of another track of the previous fragment, i.e., there is some kind of overlap between fragments although there is may not be overlap within a single track.

The difference between (a) and (b) is whether such overlap may be enabled across an MPD update. When the MPD update is because of splicing of completely separate content, such overlap is generally difficult to achieve as the new content needs new encoding to be spliced with the previous content. It is therefore advantageous to provide the ability for discontinuously updating the media presentation by restarting the timeline for certain segments and possibly also define a new set of representations after the update. Also, if the content has been independently encoded and segmented, then it is also avoided to adjust timestamps to fit within the global timeline of the previous piece of content.

When the update is for lesser reasons such as only adding new media segments to list of described media segments, or if the location of the URLs is changed then overlap and continuous updates may be allowed.

In the case of a discontinuous MPD update, the timeline of the last segment of the previous representation ends at the latest presentation end time of any sample in the segment. The timeline of the next representation (or, more accurately, the first presentation time of the first media segment of the new part of the media presentation, also referred to as new period) typically and advantageously begins at this same instant as the end of the presentation of the last period such that seamless and continuous playout is ensured.

The two cases are illustrated in the FIG. 27.

It is preferred and advantageous to restrict MPD updates to segment boundaries. The rationale for restricting such changes or updates to segment boundaries is as follows. First, changes to the binary metadata for each representation, typically the Movie Header, may take place at least at segment boundaries. Second, the Media Presentation Description may contain the pointers (URLs) to the segments. In a sense the MPD is the "umbrella" data structure grouping together all the segment files associated with the media presentation. To maintain this containment relationship, each segment may be referenced by a single MPD and when the MPD is updated, it advantageously only updated at a segment boundary.

Segment boundaries are not generally required to be aligned, however for the case of content spliced from different sources, and for discontinuous MPD updates generally, it makes sense to align the segment boundaries (specifically, that the last segment of each representation may end at the same video frame and may not contain audio samples with a presentation start time later than the presentation time of that frame). A discontinuous update may then start a new set of representations at a common time instant, referred to as period. The start time of the validity of this new set of representations is provided, for example by a period start time. The relative start time of each representation is reset to zero and the start time of the period places the set of representations in this new period in the global media presentation timeline.

For continuous MPD updates, segment boundaries are not required to be aligned. Each segment of each alternative representation may be governed by a single Media Presentation Description and thus the update requests for a new instances of the Media Presentation Description, generally triggered by the anticipation that no additional media segments are described in the operating MPD, may take place at different times depending on the consumed set of representations including the set of representations that are anticipated to be consumed.

To support updates in MPD elements and attributes in a more general case, any elements not only representations or set of representations may be associated with a validity time. So, if certain elements of the MPD need to be updated, for example where the number of representations is changed or the URL construction rules are changed, then these elements may each be updated individually at specified times, by providing multiple copies of the element with disjoint validity times.

Validity is advantageously associated with the global media time, such that the described element associated with a validity time is valid in a period of the global timeline of the media presentation.

As discussed above, in one embodiment, the validity times are only added to a full set of representations. Each full set then forms a period. The validity time then forms the start time of the period. In other words, in a specific case of the using the validity element, a full set of representations may be valid for a period in time, indicated by a global validity time for a set of representations. The validity time of a set of representations is referred to as a period. At the start of a new period, the validity of the previous set representation is expired and the new set of representations is valid. Note again that the validity times of periods are preferably disjoint.

As noted above, changes to the Media Presentation Description take place at segment boundaries, and so for each representation, the change an element actually takes place at the next segment boundary. The client may then form a valid MPD including a list of segments for each instant of time within the presentation time of the media.

Discontinuous block splicing may be appropriate in cases where the blocks contain media data from different representations, or from different content, for example from a segment of content and an advertisement, or in other cases. It may be required in a block request streaming system that changes to presentation metadata take place only at block boundaries. This may be advantageous for implementation reasons because updating media decoder parameters within a block may be more complex than updating them only between blocks. In this case, it may advantageously be specified that validity intervals as described above may be interpreted as approximate, such that an element is considered valid from the first block boundary not earlier than the start of the specified validity interval to the first block boundary not earlier than the end of the specified validity interval.

An example embodiment of the above describes novel enhancements to a block-request streaming system is described in the later presented section titled Changes to Media Presentations.

4. Segment Duration Signaling

Discontinuous updates effectively divide the presentation into a series of disjoint intervals, referred to as period. Each period has its own timeline for media sample timing. The media timing of representation within a period may advantageously be indicated by specifying a separate compact list of segment durations for each period or for each representation in a period.

An attribute, for example referred to as period start time, associated to elements within the MPD may specify the validity time of certain elements within the media presentation time. This attribute may be added to any elements (attributes that may get assigned a validity may be changed to elements) of the MPD.

For discontinuous MPD updates the segments of all representations may end at the discontinuity. This generally implies at least that the last segment before the discontinuity has a different duration from the previous ones. Signaling segment duration may involve indicating either that all segments have the same duration or indicating a separate duration for every segment. It may be desirable to have a compact representation for a list of segment durations which is efficient in the case that many of them have the same duration.

Durations of each segment in one representation or a set of representations may advantageously be carried out with a single string that specifies all segment durations for a single interval from the start of the discontinuous update, i.e., the start of the period until the last media segment described in the MPD. In one embodiment, the format of this element is a text string conforming to a production that contains a list of segment duration entries where each entry contains a duration attribute dur and an optional multiplier mull of the attribute indicating that this representation contains <mult> of the first entry segments of duration <dur> of the first entry, then <mult> of the second entry segments of duration <dur> of the second entry and so on.

Each duration entry specifies the duration of one or more segments. If the <dur> value is followed by the "*" character and a number, then this number specifies the number of consecutive segments with this duration, in seconds. If the multiplier sign "*" is absent, the number of segments is one. If the "*" is present with no following number, then all subsequent segments have the specified duration and there may be no further entries in the list. For example, the string "30*" means all segments have a duration of 30 seconds. The string "30*12 10.5" indicates 12 segments of duration 30 seconds, followed by one of duration 10.5 seconds.

If segment durations are specified separately for each alternative representation, then the sum of segment durations within each interval may be the same for each representation. In the case of video tracks, the interval may end on the same frame in each alternative representation.

Those of ordinary skill in the art, upon reading this disclosure, may find similar and equivalent ways to express segment durations in a compact manner.

In another embodiment, the duration of a segment is signaled to be constant for all segments in the representation except for the last one by a signal duration attribute <duration>. The duration of the last segment before a discontinuous update may be shorter as long as the start point of the next discontinuous update or the start of a new period is provided, which then implies the duration of the last segment reaching up to the start of the next period.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. In some cases, the software components can be provided on tangible, non-transitory media for execution on hardware that is provided with the media or is separate from the media. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of signaling, in a media stream sent from a server to a client, for switching between representations for adaptive HTTP streaming, the method comprising:
    generating a segment map for one or more segments of a representation, the segment map including one or more temporal entry points and byte offset information for each of the one or more temporal entry points, the segment map further including one or more temporal exit points and byte offset information for each of the one or more temporal exit points, wherein a temporal entry point indicates an entry frame and a corresponding byte offset within the representation at which a switch from one or more other representations to the representation can be made and at which the representation can be played out to any subsequent temporal exit point of the representation, wherein a temporal exit point indicates an exit frame and a corresponding byte offset within the representation at which a switch from the representation can be made to the one or more other representations, and wherein play out can start at any entry point of the representation previous to the temporal exit point and played out to the temporal exit point; and
    associating the segment map with the one or more segments of the representation.

2. A method of formatting content that is streamed as a plurality of representations, wherein each of the plurality of representations is an alternative for an item of content, the method comprising:
    organizing a first representation of the plurality of representations as a plurality of segments, wherein a segment comprises data relating to a portion of a representation that has a temporal order among other segments for the representation, and wherein a segment is usable by a receiver that does not have access to prior segments;
    generating a segment map for one or more segments of the first representation, the segment map including one or more temporal entry points and byte offset information for each of the one or more temporal entry points, the segment map further including one or more temporal exit points and byte offset information for each of the one or more temporal exit points, wherein a temporal entry point indicates an entry frame and a corresponding byte offset within the first representation at which a switch from one or more other representations to the first representation can be made and at which the first representation can be played out to any subsequent temporal exit point of the first representation, wherein a temporal exit point indicates an exit frame and a corresponding byte offset within the first representation at which a switch from the first representation can be made to the one or more other representations, and wherein play out can start at any entry point of the first representation previous to the temporal exit point and played out to the temporal exit point; and
    aligning the one or more temporal entry points and the one or more temporal exit points of the first representation with one or more temporal entry points and one or more temporal exit points of a second representation, wherein aligning results in a presentation time for a temporal entry point for a segment in the first representation matching a presentation time for a temporal exit point for a segment in the second representation.

3. The method of claim 2, further comprising:
determining, for each segment, a filename; and
storing content of each segment as a plurality of files using the filename of each segment so stored.

4. The method of claim 3, further comprising:
determining, at a client consuming content, a content request, wherein the content request specifies at least one representation and a presentation time range;
determining a set of one or more URLs for one or more files in the plurality of files that represent one or more segments corresponding to the content request;
requesting the one or more segments using the set of one or more URLs;
receiving the one or more segments; and
providing content from the one or more segments to a content consumer at the client.

5. A method of requesting content using a client device configured to connect to a network, make requests over the network, and present content having a nonzero playout time, the method comprising:
determining a content request, wherein the content request specifies at least one representation and a presentation time range, the presentation time range defining at least a portion of the representation being requested;
reading, from a stored media representation dataset, a request format template, a segment time length and a variable segment range, the variable segment range defining a variation in presentation time range for segments, the variation being relative to the segment time length stored in the media representation dataset;
comparing a value of the segment time length to a temporal entry point corresponding to a start of the presentation time range to determine an initial segment index, the temporal entry point indicating an entry frame and a corresponding byte offset within the representation at which a switch from one or more other representations to the representation can be made and at which the representation can be played out to any subsequent temporal exit point of the representation, wherein a temporal exit point indicates an exit frame and a corresponding byte offset within the representation at which a switch from the representation can be made to the one or more other representations, and wherein play out can start at any entry point of the representation previous to the temporal exit point and played out to the temporal exit point;
evaluating the initial segment index, the variable segment range, and the segment time length to determine a desired segment index;
generating a file request corresponding to the content request based on the desired segment index and the request format template; and
requesting at least one file using the file request.

6. The method of claim 5, wherein the file request is a URL and requesting at least one file is performed using HTTP requests using the URL.

7. The method of claim 5, wherein the initial segment index is determined by dividing the temporal entry point by the segment time length and the desired segment index is determined as the initial segment index when a remainder from the dividing is less than the variable segment range and is determined as a segment index immediately prior to the initial segment when a remainder from the dividing is equal to or greater than the variable segment range.

8. The method of claim 5, further comprising repeating file requests until a segment is received that contains content with a temporal exit point corresponding to, or later than, an end of the presentation time range.

9. The method of claim 5, wherein the variation being relative to the segment time length is a time range such that a segment presentation time is between the segment time length and the segment time length plus the time range of the variation, inclusive.

10. The method of claim 5, wherein the variation being relative to the segment time length is a proportion, P, such that a segment presentation time is between 1.0 times the segment time length and 1+P times the segment time length, inclusive.

11. The method of claim 5, wherein the variation being relative to the segment time length is a time range such that a segment presentation time can be greater than or less than the segment time length ranging over the time range of the variation.

12. The method of claim 11, further comprising repeating file requests until a segment is received that contains content with a temporal exit point corresponding to, or later than, an end of the presentation time range.

13. The method of claim 5, wherein segments are requested from one of a plurality of representations, wherein each of the plurality of representations is an alternative for an item of content.

14. A client device configured to request content over a network and present the content retrieved over the network, the content having a nonzero playout time, the client device comprising:
a processing element capable of executing stored instructions;
memory capable of storing data;
memory capable of storing instructions;
program code for determining a content request, wherein the content request specifies at least one representation and a presentation time range, the presentation time range defining at least a portion of the presentation being requested;
program code for reading, from stored media representation dataset, a request format template, a segment time length and a variable segment range, the variable segment range defining a variation in presentation time range for segments, the variation being relative to the segment time length stored in the media representation dataset;
program code for comparing a value of the segment time length to a temporal entry point corresponding to a start of the presentation time range to determine an initial segment index, the temporal entry point indicating an entry frame and a corresponding byte offset within the representation at which a switch from one or more other representations to the representation can be made and at which the representation can be played out to any subsequent temporal exit point of the representation, wherein a temporal exit point indicates an exit frame and a corresponding byte offset within the representation at which a switch from the representation can be made to the one or more other representations, and wherein play out can start at any entry point of the representation previous to the temporal exit point and played out to the temporal exit point;
program code for evaluating the initial segment index, the variable segment range, and the segment time length to determine a desired segment index;

program code for generating a file request corresponding to the content request based on the desired segment index and the request format template;
a network interface for sending messages to the network and receiving messages from the network; and
program code for requesting at least one file using the file request.

15. The client device of claim 14, wherein the network interface is a wireless network interface.

16. The client device of claim 14, wherein the network interface is a wired network interface.

17. The client device of claim 14, wherein the file request is a URL and requests are HTTP requests using the URL.

18. The client device of claim 14, further comprising program code for repeating file requests until a segment is received that contains content with a temporal exit point corresponding to, or later than, an end of the presentation time range.

19. The client device of claim 14, wherein the variation being relative to the segment time length is a time range such that a segment presentation time is between the segment time length and the segment time length plus the time range of the variation, inclusive.

20. The client device of claim 14, wherein the variation being relative to the segment time length is a proportion, P, such that a segment presentation time is between 1.0 times the segment time length and 1+P times the segment time length, inclusive.

21. The client device of claim 14, wherein the variation being relative to the segment time length is a time range such that a segment presentation time can be greater than or less than the segment time length ranging over the time range of the variation.

* * * * *